(12) United States Patent
Kawaguri et al.

(10) Patent No.: US 7,215,393 B2
(45) Date of Patent: May 8, 2007

(54) REFLECTIVE PLATE AND DISPLAY DEVICE USING THE PLATE

(75) Inventors: Mariko Kawaguri, Moriguchi (JP); Seiji Nishiyama, Hirakata (JP); Naohide Wakita, Suita (JP); Taketoshi Nakao, Kyoto (JP); Yasuhiko Yamanaka, Hirakata (JP); Toshiyasu Oue, Nara (JP); Hirofumi Kubota, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 394 days.

(21) Appl. No.: 10/343,025

(22) PCT Filed: Jul. 30, 2001

(86) PCT No.: PCT/JP01/06539

§ 371 (c)(1),
(2), (4) Date: Feb. 25, 2003

(87) PCT Pub. No.: WO02/10806

PCT Pub. Date: Feb. 7, 2002

(65) Prior Publication Data

US 2004/0021810 A1    Feb. 5, 2004

(30) Foreign Application Priority Data

Jul. 28, 2000  (JP) ........................... 2000-228600
Feb. 28, 2001  (JP) ........................... 2001-053986

(51) Int. Cl.
    *G02F 1/1335* (2006.01)
(52) U.S. Cl. ........................................ 349/113; 349/38
(58) Field of Classification Search ............... 349/113, 349/114, 38, 39
    See application file for complete search history.

(56) References Cited

U.S. PATENT DOCUMENTS

| 5,418,635 | A |  | 5/1995 | Mitsui et al. ............... 359/70 |
| 6,163,405 | A | * | 12/2000 | Chang et al. ............... 359/599 |
| 6,262,783 | B1 | * | 7/2001 | Tsuda et al. ............... 349/39 |
| 6,266,111 | B1 |  | 7/2001 | Kataoka et al. ............ 349/113 |
| 6,380,995 | B1 | * | 4/2002 | Kim ........................... 349/113 |
| 6,400,437 | B1 | * | 6/2002 | Nagata et al. .............. 349/143 |
| 6,452,653 | B1 | * | 9/2002 | Yamanaka et al. ......... 349/113 |
| 6,476,890 | B1 | * | 11/2002 | Funahata et al. .......... 349/113 |
| 6,522,375 | B1 | * | 2/2003 | Jang et al. .................. 349/113 |
| 6,525,792 | B1 | * | 2/2003 | Fujioka et al. ............. 349/113 |
| 6,583,840 | B1 | * | 6/2003 | Inoue et al. ................ 349/141 |
| 6,727,965 | B1 | * | 4/2004 | Kubota ....................... 349/113 |
| 6,747,718 | B2 | * | 6/2004 | Kanou et al. ............... 349/113 |
| 2002/0191134 | A1 | * | 12/2002 | Funahata et al. .......... 349/113 |

FOREIGN PATENT DOCUMENTS

EP    0 495 679 A2    7/1992

(Continued)

*Primary Examiner*—Thoi V. Duong
(74) *Attorney, Agent, or Firm*—Steptoe & Johnson LLP

(57) ABSTRACT

A reflective plate comprises a substrate, a plurality of protrusions each formed on the substrate and having a curved surface, and a reflective film formed on the substrate having the protrusions, wherein a planar shape of each of the protrusions is indefinite, and when a frame line of the planar shape of each of the protrusions is divided into fine line segments, the line segments are pointed in all directions or in predetermined directions. This improves reflective properties such as dispersion properties.

34 Claims, 47 Drawing Sheets

FOREIGN PATENT DOCUMENTS

| | | |
|---|---|---|
| EP | 0 965 863 A2 | 12/1999 |
| JP | 6-27481 | 2/1994 |
| JP | 6-175126 | 6/1994 |
| JP | 9-80426 | 3/1997 |
| JP | 2698218 | 9/1997 |
| JP | 2756206 | 3/1998 |
| JP | 10-111509 | 4/1998 |
| JP | 11-259018 | 9/1999 |
| JP | 2000-19507 | 1/2000 |
| JP | 2000-29021 | 1/2000 |
| JP | 2000-321568 | 11/2000 |

* cited by examiner

Fig. 18F  Deep UV

Angle (degree) formed
by Substrate and Projection

REFLECTIVE PLATE AND DISPLAY DEVICE USING THE PLATE

TECHNICAL FIELD

The present invention relates to a reflective plate and a display device that displays images by having the reflective plate utilizing outside light.

BACKGROUND ART

These days, mobile information terminals, video recorders, and the like are being downsized and becoming more and more portable. This has presented a problem of how to reduce the power consumption of image display devices used in those terminals and recorders.

Image display devices capable of reducing power consumption include reflective type liquid crystal display devices and transflective type liquid crystal display devices.

Reflective type liquid crystal display devices display images by utilizing outside light such as sunlight and indoor lighting and controlling the amount of light reflected by a reflective plate. This makes a back light needless and realizes a reduction in power consumption. In addition, high visibility can be secured for the display screen even under strong outside light such as direct sunlight, and therefore, the display devices are often used in instruments for mobile phones.

Transflective type liquid crystal display devices display images by utilizing light both from outside and the back light. This enables it to turn off the back light when images are displayed in bright surroundings, and thus realizes a reduction in power consumption. Under strong outside light such as direct sunlight, high visibility can be especially secured by reflecting outside light. In dark surroundings, on the other hand, visibility can be secured by turning on the back light.

Reflective plates equipped in those two types of liquid crystal display devices are preferably without specularity. This is because if light is specular-reflected, a light source appears on a reflective plate and little light is reflected except in this place of appearance, making the display screen dark. In such a case, images are displayed brightly only when seen from the regularly reflected direction of light, and images are very dark when seen from other directions. That is to say, brightness can not be secured for displayed images except in the regularly reflected direction of light, and therefore, the display screen can not be viewed naturally. In view of this, it is indispensable for reflected light to be diffused.

There are mainly two methods to diffuse reflected light. 1) To form the surface of a reflective plate into fine protrusions and depressions.

2) To provide a diffusion film for light diffusion on the viewer's side of a liquid crystal display device.

In the method 1) among these methods, since reflective properties depend on protrusions and depressions on the surface of the reflective plate, the protrusions and depressions are extremely important elements to decide display properties of a liquid crystal display device.

However, even if a liquid crystal display device has a reflective plate with protrusions and depressions, there is a problem of a dark display screen in dark surroundings with extremely small outside light. Specifically, when outside light comes into the device, the light first passes through a liquid crystal layer in a liquid crystal cell. Then, the light is reflected by the surface of the reflective plate on the backside of the liquid crystal layer, and then passes through the liquid crystal layer again to be extracted as display light. That is to say, when outside light which has come inside the device goes out of the device, the amount of the light is decreased extremely. When the amount of outside light is inherently small, almost none of it is utilized as display light, thus making the display screen dark. Especially for a liquid crystal display device having a color filter to absorb light, the amount of light decreases considerably.

In view of this, for reflective type liquid crystal display devices, it is required to further increase the efficiency of light utilization. This is preferable also for transflective type liquid crystal display devices because power consumption is reduced.

One of methods to increase the efficiency of light utilization is to control the shape of a (diffusion) reflective plate so that incident light is reflected over an effective range. In SHARP TECHNICAL JOURNAL, vol. 74 (1999), on pages 41–45, there is disclosed an ideal distribution of tilt angles of protrusions provided on a reflective plate. FIG. 1 is a graph showing the relationship between tilt angles of protrusions and the presence probability of the tilt angles. A symbol (a) in the figure shows that there is almost no flat portions (where the tilt angle is 0 degrees) on the surface of the reflective plate, and protrusions having a tilt angle of up to about 8 degrees are provided on the surface. In addition, the presence probability of the protrusions increases up to 8 degrees, and no protrusions of more than 8 degrees of tilt angle exist. In such tilt angle distribution, light is designed to be reflected uniformly over a range of about 25 degrees from the regularly reflected direction, and the light is not dispersed outside the range.

The reflective properties of a reflective plate having the tilt angle distribution can be described as follows. FIG. 2 is a graph showing the relationship between an incident angle (degree) of incident light and the obtained gain. Gain is a value obtained such that the brightness of incident light with respect to an incident angle is divided by the brightness of the incident light with respect to a (diffusion) reflective plate. In the figure, reflective properties in the case of the ideal tilt angle distribution (corresponding to the symbol (a) in FIG. 1) are shown as a solid line (a). The viewer looks at the display screen mostly from the range of 25 degrees from the normal direction. Therefore, if brightness increases within this range, bright images are displayed, as in the case of the reflective properties shown as the solid line (a).

On the other hand, a dotted line (b) shows reflective properties in the case of a symbol (b) shown in FIG. 1, where tilt angle distribution is such that the presence probability of the protrusions peaks at 15 degrees of tilt angle. With such reflective properties, incident light angled by 50 degrees, for example, can be reflected towards the normal direction. In other words, incident light angled by various degrees is reflected to have widespread and almost uniform brightness. Therefore, such reflective properties provide high light diffusion properties. However, brightness towards the normal direction is lower than the solid line (a). Note that when tilt angle is 20 degrees for example, incident light is not released out of the display device.

In addition, a symbol (c) shown in FIG. 1 is the case where the peak of the presence probability of the protrusions is in the region of small tilt angles. In this case, regular reflection components increase and the reflective plate has specularity. Accordingly, obtained reflective properties are shown as a dotted line (c) in FIG. 2. Such reflective properties cause extremely large variations in brightness with respect to incident angles.

Thus, since the reflective properties of the reflective plate depend on the tilt angle distribution of the protrusions, it is important to control the tilt angle distribution of the protrusions in order to effectively utilize incident light.

There are various methods to produce a reflective plate, among which are to roughen the surface of a reflective metal film, and to pattern a resin layer to be protrusions and depressions by etching. When a resin layer is patterned to be protrusions and depressions, the use of a thermoplastic photo-resist makes it easy to form a uniform pattern. This is specified as follows. FIGS. 3A and 3B are cross sectional views illustrating the process of forming a protrusion. First, a photo resist layer is formed on a substrate 101 and exposed through a mask having a predetermined pattern, and then developed. By these steps, protrusions 102 each having a rectangle cross section are formed. Further, by heat-treatment, corner portions of each of the protrusions 102 are heat-fused, forming protrusions 103 each having a smoothly curved surface as shown in FIG. 3B. However, if there is a wide distance between the protrusions 103, a flat portion 104 is also formed. This provides specularity to the reflective properties of the obtained reflective plate.

In Japanese Unexamined Patent Application No. 6-27481A, there is disclosed a reflective plate that solves the problem of specularity. This publication discloses a reflective plate wherein wave-shaped picture element electrodes with their upper surfaces being continuous are formed on an insulative substrate. This reflective plate is fabricated as follows. A first polymeric resin layer is formed on the insulative substrate and patterned to form protrusions. Next, a second polymeric resin layer is formed over the insulative substrate having formed thereon the protrusions in order to fill gaps between the protrusions. Thereby, the second polymeric resin layer also becomes protrusion-depression shaped. However, the tilt angles of the second layer's protrusions are smaller than those of the protrusions of the first layer. In view of this, by reducing flat portions, regularly reflected light can be reduced. However, in the above-described method, since there is an extra step of coating the second polymeric resin layer and drying it, there arises a problem of increasing fabrication costs.

In order to solve the problem of increasing fabrication costs, the present inventors attempted a method to form a reflective plate having a protrusion-depression surface by forming protrusions without gaps using a single layer. Specifically, a photo-resist was coated on a substrate and light-exposed through a mask. A pattern of the mask was such that a gap between light shielding portions was set to be 5 μm or less. After the photo-resist was developed, protrusions each having a rectangle cross section were formed. Each gaps between the protrusions was 5 μm or less. Further, the rectangle protrusions were softened and deformed by heat treatment to fill the gaps therebetween. Among the gaps, gaps of 3 μm or less were filled up and adjacent protrusions bonded to each other, thus forming a flat portion. As a result, tilt angle distribution was different between a portion in which the protrusions were distant and a portion in which the protrusions bonded, causing non-uniform reflective properties on the same plane. As a result, there arose a problem that unevenness was recognized on the display screen. In addition, when a reflective layer made of Al, Ag, or the like is formed on a source electrode and a drain electrode, there is a danger of a shortcut between the source electrode and the reflective layer at a portion without a resist.

In addition, there is another method that the step of development is stopped halfway so that a part of a resist film (hereinafter referred to as a remaining film) remains between the protrusions of the resist. When this method is employed, since the protrusions originally form a continuous surface, a continuous protrusion-depression surface is formed by melting (heat-fusion). However, the amount of deformation during the melting step varies depending on the thickness of remaining films, and the amount of deformation decreases as the remaining films become thinner. Therefore, to control the tilt angles of the protrusions, it is required to precisely control the thickness of the remaining films. However, the developing speed of the resist film depends on many factors such as temperature, the ability of a developer, and how much the resist film is fatigued. This makes it difficult to stop the development halfway and have the same amount of remaining films to control the tilt angles.

Also in Japanese Patent No. 2698218, there is disclosed a method to form the protrusion-depression surface of the reflective plate. FIG. 4A is a plan view schematically showing a reflective plate disclosed in this publication. FIG. 4B is a cross section taken along the line A—A in FIG. 4A.

As shown in FIG. 4A, a multiplicity of protrusions 112 distant from one another are provided on a substrate 111, and a reflective film 113 is provided to cover the protrusions 112. By providing the protrusions 112, the reflective plate is provided with light dispersion properties, and the appearance of a light source on the display screen is reduced. However, in this prior art example, since the protrusions 112 are made distant from one another, gap portions 114 are flat. In addition, since the area of the gap portions 114 makes up much of the reflective plate as a whole, there is a peak for reflected light in the regularly reflected direction. As a result, a light source appears on the display screen, causing a problem of making the display screen dark.

In view of this, a reflective plate that has resolved this problem is disclosed in Japanese Patent No. 2756206. FIG. 5A is a plan view schematically showing the reflective plate disclosed in this publication. FIG. 5B is a cross sectional view taken along the line B—B in FIG. 5A. According to this publication, there are protrusions and depressions. A first film 122 having protrusions is provided on a substrate 121. To cover the first film 122, a second film 123 is formed. On the second film 123 is formed a reflective film 124. In such a configuration, the formation of the second film 123 smoothes the surface of the first film 122 and flat gap portions 125, realizing a smoothly curved surface in a protrusion-depression manner. This results in removal of flat portions that were considered as a problem in the foregoing example and realizes preferable light dispersion properties without a sharp peak in the regularly reflected direction.

However, in the latter prior art example, in the formation of the reflective plate, the step to form the first film 122 having the protrusions on the substrate 121, and the step to form the second film 123 by coating liquid over the first film 122 and hardening the liquid were required. That is to say, two steps were required to form the protrusion-depression shape, which was redundant.

DISCLOSURE OF THE INVENTION

The present invention has been accomplished in view of the foregoing problems, and it is a first object of the present invention to provide a reflective plate that comprises protrusions having an ideal tilt angle distribution with reduced flat portions and is excellent in reflective properties such as dispersion properties, and to provide a display device having the reflective plate. A second object of the present invention is to provide a fabricating method, wherein variations in reflective properties resulting from fabrication problems are inhibited to realize an improvement in yields, and a reflective plate having preferable reflective properties is fabricated.

(Reflective Plate)

In order to solve the foregoing problems, there is provided a reflective plate comprising a substrate, a plurality of protrusions each formed on the substrate and having a curved surface, and a reflective film formed on the substrate having the protrusions, wherein a planar shape of each of the protrusions is non-circular, and when a frame line of the planar shape of each of the protrusions is divided into fine line segments, the line segments are pointed in all directions or in predetermined directions.

In the above-described configuration, when the frame line of the planar shape of each of the protrusions is divided into fine line segments, the segments may be pointed in all directions or in predetermined directions. When the line segments are pointed in all directions, the surface of each of the protrusions is accordingly pointed in various directions. This is because the surface shape of each of the protrusions depends on the shape of the frame line of each of the protrusions. As a result, it is made possible to reflect and diffuse incoming light from an arbitrary direction in various directions, and to have a constant reflective strength of light irrespective of viewing directions. That is to say, dispersion properties are improved.

When the line segments are pointed in predetermined directions, it is made possible to control dispersion properties so that the reflective strength of light has its maximum in predetermined directions. In other words, in the above-described configuration, dispersion properties can be optimized according to application. Further, the above-described configuration makes it possible to easily control the shape of each of the protrusions only by changing the directions of the line segments, and this shape controlling is highly flexible. It should be noted that, in the present specification, a protrusion is not limited to a surface curved in a protrusion-like manner, but includes a surface curved in a depression-like manner and in a protrusion-depression-like manner.

In addition, in order to solve the foregoing problems, there is provided a reflective plate comprising a substrate, a plurality of protrusions each formed on the substrate and having a curved surface, and a reflective film formed on the substrate having the protrusions, wherein a planar shape of each of the protrusions is indefinite, and a shape of a gap portion between the protrusions comprises a curved line having a predetermined width and/or a broken line having a predetermined width.

When the planar shape of each of the protrusions is indefinite, it is made possible that the shape of the gap portion between the protrusions comprises a curved line and/or a broken line, both having a predetermined width. This enables to minimize the area of the gap portion, compared with the case where uniformly shaped protrusions are densely disposed. As a result, an increase in reflected light in the regularly reflected direction is inhibited, and an improvement in dispersion properties can be realized.

Here, a width of the gap portion may be uniform.

Further, the width of the gap portion is preferably in the range of 1 to 10 μm.

A maximum diameter of the planar shape of each of the protrusions is preferably in the range of 15 to 40 μm.

A height of each of the protrusions is preferably in the range of 1.2 to 4 μm.

A maximum diameter of the planar shape of each of the protrusions is preferably from 5 to 20 times larger than the height of each of the protrusions.

A contact angle formed by a surface of each of the protrusions and a surface of the substrate at a contact line is preferably in a range of 10 to 25 degrees.

The protrusions are preferably disposed 30 or less per area of $1 \times 10^4$ μm$^2$.

The protrusions may be provided in positions of meeting a relation of Fibonacci series (corresponding to regular spiral alignment).

On the other hand, the reflective plate may be such that the substrate is light-transmissive, and the gap portion is not coated with the reflective film and is a light transmission region. This configuration makes it possible for the reflective plate to be used as a transflective type reflective plate.

Further, the protrusions may be light-transmissive, and a low position portion of each of the protrusions is not coated with the reflective film.

The low position portion of each of the protrusions may be such that, when an angle between the substrate and a tangent line in contact with the surface of each of the protrusions is taken to be a tilt angle, the low position portion has a tilt angle of 15 degrees or more.

In the case where the reflective plate of the present invention is used as a transflective type reflective plate, a width of the gap portion is preferably in a range of 1 to 20 μm.

Similarly, in the case where the reflective plate of the present invention is used as a transflective type reflective plate, a contact angle is preferably in a range of 10 to 40 degrees.

Further, in the case where the reflective plate of the present invention is used as a transflective type reflective plate, the distribution of the protrusions is preferably such that the protrusions are provided 15 or less per area of $1 > 10^4$ μm$^2$.

In addition, in order to solve the foregoing problems, there is provided a reflective plate comprising a substrate, a plurality of protrusions each formed on the substrate and having a curved surface, and a reflective film formed on the substrate having the protrusions, wherein a shape of a frame line of each of the protrusions comprises a bay-like curved line or a peninsula-like curved line.

In this configuration, a border line (frame line) between each of the protrusions and a portion (gap portion) in which each of the protrusions is not formed can be pointed in various directions instead of predetermined directions. This realizes preferable reflective properties with high dispersion properties.

A planar shape of each of the protrusions may be indefinite, and at least a part of the gap portion between the protrusions may be provided in a mesh-like pattern or indefinite pattern.

A frame line of each of the protrusions may form at least one closed curved-line, and when a tangent line drawn along the curved line on the substrate is represented by an angle in which a predetermined direction is taken to be 0 degrees, the angle may change from increase to decrease or from decrease to increase at least three times when the curved line is circled.

Moreover, at least one of frame lines of the protrusions may form an indefinite two-dimensional closed region having a curved line or a straight line.

Furthermore, a frame line of each of the protrusions may comprise a curved line angled with respect to the signal line or a straight line angled with respect to the signal line.

In this configuration, the frame line of each of the protrusions can be pointed in various directions. This realizes preferable reflective properties having high dispersion properties.

(Fabricating Method of Reflective Plate)

In order to solve the foregoing problems, there is provided a method of fabricating a reflective plate, comprising: forming a layer of a resin on a substrate, a plurality of column-shaped portions each having a rectangle cross sectional shape by patterning the resin layer to be a predetermined shape so that a part of a surface of the substrate is exposed, imparting an affinity for the resin to the exposed part of the surface of the substrate by surface treatment, the exposed part being between the column-shaped portions, forming a plurality of protrusions each having a curved surface by heat treatment to the plurality of column-shaped portions so that the resin flows on the exposed part of the surface of the substrate, and forming a reflective film at least on the protrusions.

The above-described configuration prevents the column-shaped portions' trying to cohere by their surface tension instead of flowing on the substrate even after heat treatment is conducted to the column-shaped portions and thus the column-shaped portions are in readiness for heat deformation. In other words, the exposed part of the surface of the substrate between the column-shaped portions are given an affinity for the resin before conducting heat treatment to the column-shaped portions, so that the column-shaped portions can easily flow on the substrate. As a result, a gap between the protrusions is kept from becoming wide in the step of forming the protrusions, and thus an increase in specularity is inhibited. Furthermore, even if there are temperature variations on the substrate in the step of heat treatment, flowability variations of the resist on the surface of the substrate are inhibited. Thus, it is made possible to fabricate a reflective plate excellent in dispersion properties with improved yields.

In addition, in the above-described configuration, it is not necessary to provide another resin layer on the protrusions in order to have a protrusion-depression shaped surface of the reflective film. It is only necessary to form the protrusions to have the protrusion-depression shaped surface of the reflective film having fewer flat portions. This makes it possible to fabricate a thin reflective plate. In addition, since the number of steps is smaller than conventional fabricating methods, fabrication costs are reduced.

The step of imparting an affinity for resin to the exposed part of the surface of the substrate may be such that the exposed part of the surface of the substrate comes into contact with one functional group selected from functional groups shown in a general formula (1) below and a compound having a functional group that shows an affinity for the resin, so that a functional group having active hydrogen that exists on the exposed part reacts to the functional group selected from the functional groups shown in the general formula (1) below in order to form a film made of the compound.

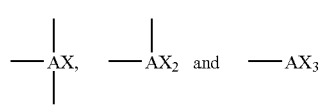
(1)

(In this formula, a symbol A denotes one atom selected from a group consisting of silicon, germanium, tin, titanium, and zirconium. A symbol X denotes one functional group selected from a group consisting of halogen, an alkoxy group, and an isocyanate group.)

The step of imparting an affinity may be such that the exposed part of the surface of the substrate is irradiated by an ultraviolet ray.

In order to solve the foregoing problems, there is provided a method of fabricating a reflective plate, comprising: forming a layer of a resin on a substrate, a plurality of column-shaped portions each having a rectangle cross sectional shape by patterning the layer of the resin to be a predetermined shape so that a part of a surface of the substrate is exposed, plasticizing the column-shaped portions by applying a plasticizer on the column-shaped portions, forming a plurality of protrusions each having a curved surface by heat treatment to the plurality of column-shaped portions so that the resin flows on the exposed part of the surface of the substrate, and forming a reflective film at least on the protrusions.

Because of variations in the heat properties of resin materials, they have variations in heat deformation temperature. In the above-described method, even when using a resin to be heat-deformed at a high temperature, the plasticizer is applied on the column-shaped portions to plasticize them, and this reduces the heat deformation temperature of the column-shaped portions. As a result, it is made easy for the column-shaped portions to flow on the substrate.

In order to solve the foregoing problems, there is provided a method of fabricating a reflective plate, comprising: forming a layer of a resin on a substrate, a plurality of column-shaped portions each having a rectangle cross sectional shape by patterning the layer of the resin to be a predetermined shape so that a part of a surface of the substrate is exposed, hardening surface layers of the column-shaped portions, forming a plurality of protrusions each having a curved surface by heat treatment to the plurality of column-shaped portions so that the resin flows on the exposed part of the surface of the substrate, and forming a reflective film at least on the protrusions.

The above-described method is useful when the heat properties of a resin show high flowability when the resin is in readiness for heat deformation. In this method, hardening of the surface layers of the column-shaped portions prevents an excessive flowage of the resin on the substrate. On the other hand, since the insides of the column-shaped portions inherently have flowability, the column-shaped portions are heat-deformed appropriately. This prevents the protrusions from binding together caused by the absence of gaps therebetween, and makes it possible to form a plurality of protrusions each having a predetermined angle. As a result, uneven reflective brightness on the surface of the substrate is prevented, and a reflective plate with preferable reflective properties is fabricated with improved yields.

The step of hardening the surface layers of the column-shaped portions may be such that the column-shaped portions are irradiated by an ultraviolet ray having a dominant wavelength of 300 nm or less.

The step of hardening the surface layers of the column-shaped portions may be such that an alkaline solution is applied on the column-shaped portions.

In addition, in order to solve the foregoing problems, there is provided a method of fabricating a reflective plate having a gap portion comprising a curved line and/or a broken line between a plurality of protrusions, the curved line and the broken line having a predetermined width, comprising: forming a photosensitive resin layer on a substrate, light-exposing the photosensitive resin layer through a mask having a pattern wherein a shape of a light shielding portion or a light transmitting portion comprises a curved line having a predetermined width and/or a broken line having a predetermined width, forming a plurality of column-shaped portions by developing the light-exposed photosensitive resin layer so that a part of a surface of the substrate is exposed, forming the plurality of protrusions each having a curved surface by heat treatment to the plurality of column-shaped portions, and forming a reflective film at least on the protrusions.

The above-described mask may have a pattern such that a width of the light shielding portion or the light transmitting portion is 3 µm or less.

In addition, in order to solve the foregoing problems, there is provided a method of fabricating a reflective plate, comprising: forming a layer of a photosensitive resin on a substrate, light-exposing the layer of the photosensitive resin through a mask having a light shielding portion having a predetermined pattern or a light transmitting portion having a predetermined pattern, forming a plurality of column-shaped portions by developing the light-exposed photosensitive resin layer so that a part of a surface of the substrate is exposed, imparting an affinity for the photosensitive resin to the exposed part of the surface of the substrate by heat treatment, the exposed part being between the column-shaped portions, forming a plurality of protrusions each having a curved surface by heat treatment to the plurality of column-shaped portions so that the photosensitive resin flows on the exposed part of the surface of the substrate, and forming a reflective film at least on the protrusions, wherein, as the mask, such a mask is used that a planar shape of the light shielding portion or the light transmitting portion is non-circular, and when a frame line of the planar shape of the light shielding portion or the light transmitting portion is divided into fine line segments, the line segments are pointed in all directions or in predetermined directions.

(Display Device)

The reflective plates described in the above configurations can be applied to display devices such as reflective type liquid crystal display devices and transflective type liquid crystal display devices.

Specifically, there is provided a display device comprising a substrate having a plurality of nonlinear elements and wirings formed on the substrate, a plurality of protrusions each formed on the substrate and having a curved surface, and a reflective film formed on the substrate having the protrusions, wherein a planar shape of each of the protrusions is non-circular, and when a frame line of the planar shape of each of the protrusions is divided into fine line segments, the line segments are pointed in all directions or in predetermined directions.

In the above-described configuration, when the line segments are pointed in all directions, incident light from an arbitrary direction is displayed after reflected and diffused in various directions. This makes it possible to have a constant brightness of the display screen, irrespective of viewing directions. When the line segments are pointed in predetermined directions, it is possible that the display screen is bright only when the screen is viewed from predetermined directions. That is to say, the above-described configuration enables it to provide a display device that provides appropriate reflective properties according to application.

In addition, in order to solve the foregoing problems, there is provided another display device comprising a substrate having a plurality of nonlinear elements and wirings formed on the substrate, a plurality of protrusions each formed on the substrate and having a curved surface, and a reflective film formed on the substrate having the protrusions, wherein a gap portion is provided between the protrusions, and a shape of the gap portion comprises a curved line having a predetermined width and/or a broken line having a predetermined width.

In this configuration, the occupancy area of the gap portion in the surface of the substrate is minimized. This prevents an increase in reflected light in the regularly reflected direction and reduces the appearance of a light source on the display screen. In addition, since the protrusions have reflective properties excellent in dispersion properties, it is made possible to provide a display device that displays images with a constant brightness, irrespective of viewing directions.

The above-described configuration may be such that, on the substrate, an auxiliary capacitor electrode electrically connected to the nonlinear elements is provided, and, above the auxiliary capacitor electrode, at least one of the protrusions is provided so that at least a part of the gap portion overlaps with a periphery of the auxiliary capacitor electrode.

A planar shape of the auxiliary capacitor electrode may be polygonal having at least one reentrant angle. This prevents the protrusion above the auxiliary capacitor electrode from becoming flat, and thus improves reflective properties.

The above-described configuration may be such that, on the substrate, an auxiliary capacitor electrode electrically connected to the nonlinear elements is provided, and width of a gap portion above the auxiliary capacitor electrode is narrower than widths of other gap portions. This reduces the area of flat portions and thus improves reflective properties.

The above-described configuration may be such that, on the substrate, an auxiliary capacitor electrode electrically connected to the nonlinear elements is provided, and a maximum diameter of one of protrusions above the auxiliary capacitor electrode is narrower than a maximum diameter of a rest the protrusions.

The above-described configuration may be such that the substrate is light-transmissive, and the gap portion is not coated with the reflective film and is a light transmission region. This makes the display device of the present invention a transflective type display device.

In addition, in order to solve the foregoing problems, there is provided another display device a substrate having a plurality of nonlinear elements and wirings formed on the substrate, a plurality of protrusions each formed on the substrate and having a curved surface, and a reflective film formed on the substrate having the protrusions, wherein a shape of a frame line of each of the protrusions comprises a bay-like curved line or a peninsula-like curved line.

In this configuration, a border line (frame line) between each of the protrusions and a portion (gap portion) in which each of the protrusions is not provided is pointed in various directions instead of predetermined directions. This provides the border line with reflective properties excellent in dispersion properties, making it possible to provide a display device that displays images with a constant brightness, irrespective of viewing directions.

The above-described configuration may be such that a planar shape of each of the protrusions is indefinite, and at least a part of the gap portion between the protrusions is provided in a mesh-like pattern or indefinite pattern.

The above-described configuration may be such that a frame line of each of the protrusions forms at least one closed curved-line, and when a tangent line drawn along the curved line on the substrate is represented by an angle in which a predetermined direction is taken to be 0 degrees, the angle changes from increase to decrease or from decrease to increase at least three times when the curved line is circled.

The above-described configuration may be such that at least one of frame lines of each of the protrusions forms an indefinite two-dimensional closed region having a curved line or a straight line.

The above-described configuration may be such that a frame line of each of the protrusions comprises a curved line or a straight line that is angled with respect to the signal lines.

In this configuration, the frame line of each of the protrusions can be pointed in various directions. This realizes good reflective properties having high dispersion properties.

(Protrusion-Depression Structure)

In order to solve the foregoing problems, there is provided a protrusion-depression structure comprising a substrate, a plurality of protrusions each formed on the substrate and having a curved surface, wherein a planar shape of each of the protrusions is non-circular, and when a frame line of the planar shape of each of the protrusions is divided into fine line segments, the line segments are pointed in all directions or in predetermined directions.

In the protrusion-depression structure having such a configuration, when the line segments are pointed in all directions, the structure can be applied to reflective plates excellent in dispersion properties. On the other hand, when the line segments are pointed in predetermined directions, the structure can be applied to condensing plates that condense light into predetermined directions.

The protrusion-depression structure may be such that a gap portion is provided between the protrusions, and a shape of the gap portion comprises a curved line having a predetermined width and/or a broken line having a predetermined width.

The protrusion-depression structure may be such that a shape of a frame line of each of the protrusions comprises a bay-like curved line or a peninsula-like curved line.

The protrusion-depression structure may be such that a planar shape of each of the protrusions is indefinite, and at least a part of the gap portion between the protrusions is provided in a mesh-like pattern or indefinite pattern.

The protrusion-depression structure may be such that a frame line of each of the protrusions forms at least one closed curved-line, and when a tangent line drawn along the curved line on the substrate is represented by an angle in which a predetermined direction is taken to be 0 degrees, the angle changes from increase to decrease or from decrease to increase at least three times when the curved line is circled.

The protrusion-depression structure may be such that at least one of frame lines of the protrusions forms an indefinite two-dimensional closed region having a curved line or a straight line.

BRIEF DESCRIPTION OF THE DRAWINGS

FIGS. 18A–18G are views illustrating the process of fabricating a reflective plate of Embodiment 8.

BEST MODE FOR CARRYING OUT THE INVENTION

Embodiment 1

An embodiment of the present invention will be described below.

Figure 1:
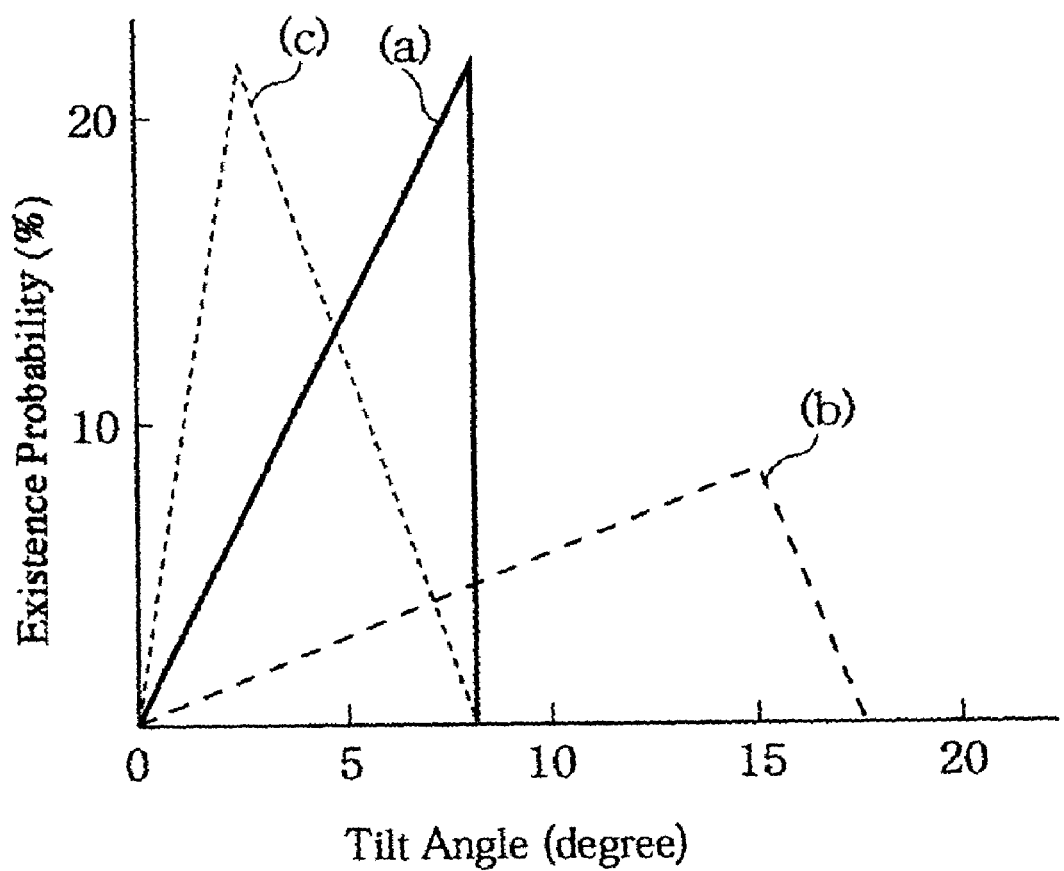
FIG. 1 is a graph showing the relationship between tilt angles of protrusions of a conventional reflective plate and the existence probability of the tilt angles.
Figure 2:
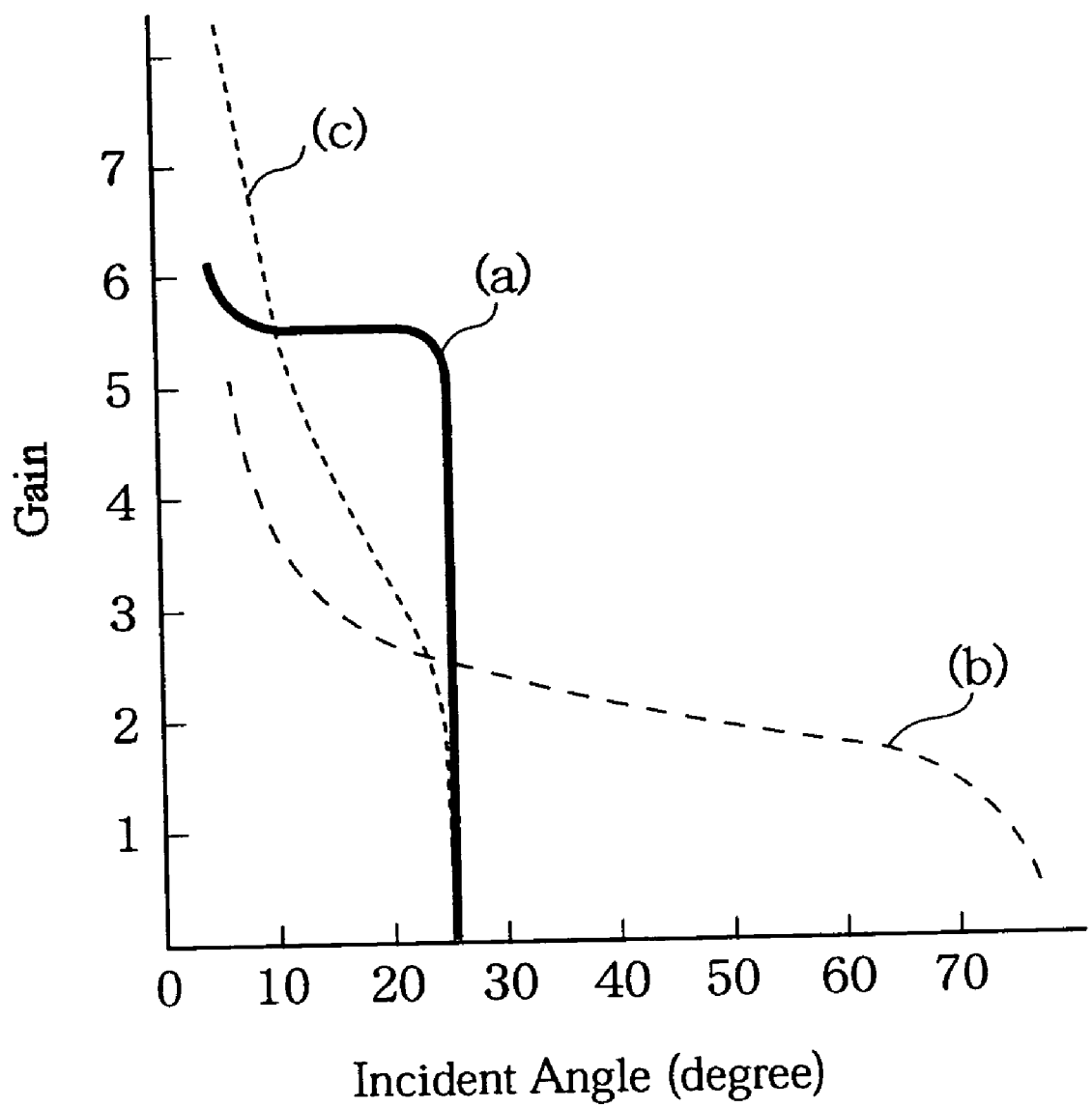
FIG. 2 is a graph showing the relationship between an incident angle (degree) of incident light in the reflective plate and the obtained gain.
Figure 3A:
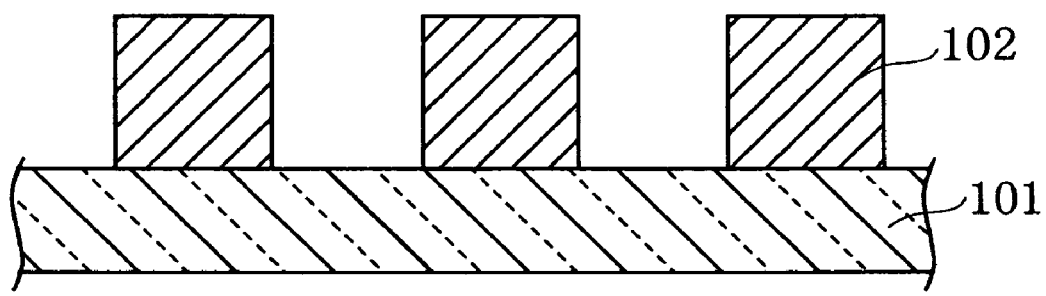
FIG. 3A is a cross sectional view of protrusions after the step of development to illustrate a method of fabricating a conventional reflective plate.
Figure 3B:
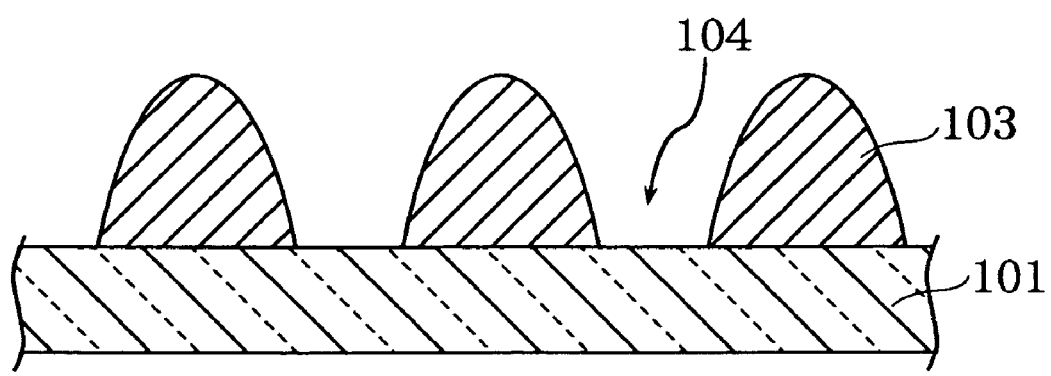
FIG. 3B is a cross sectional view of the protrusions after the step of heat fusion to illustrate a method of fabricating the reflective plate.
Figure 4A:
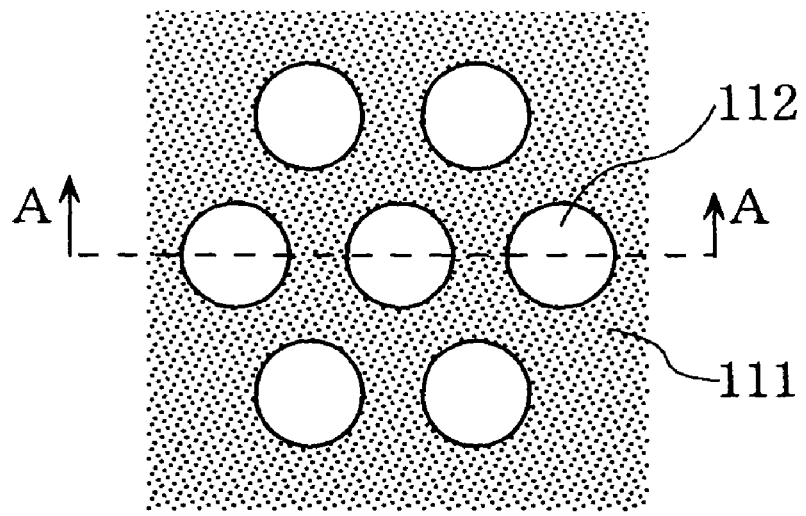
FIG. 4A is a schematic plan view of another conventional reflective plate.
Figure 4B:
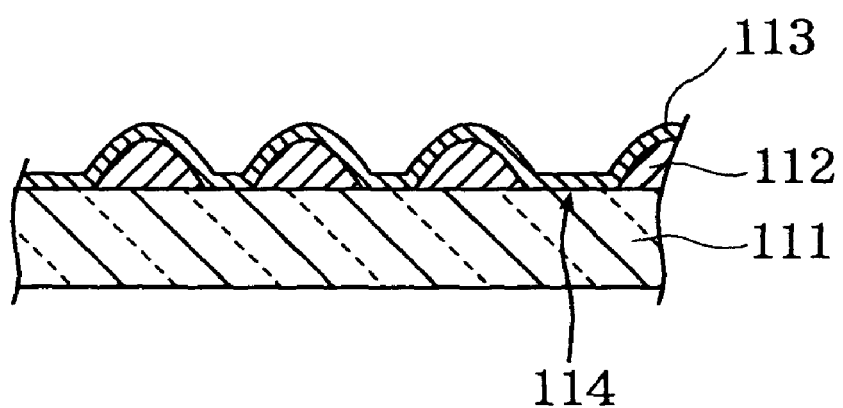
FIG. 4B is a cross sectional view taken along the line A—A shown in FIG. 4A.
Figure 5A:
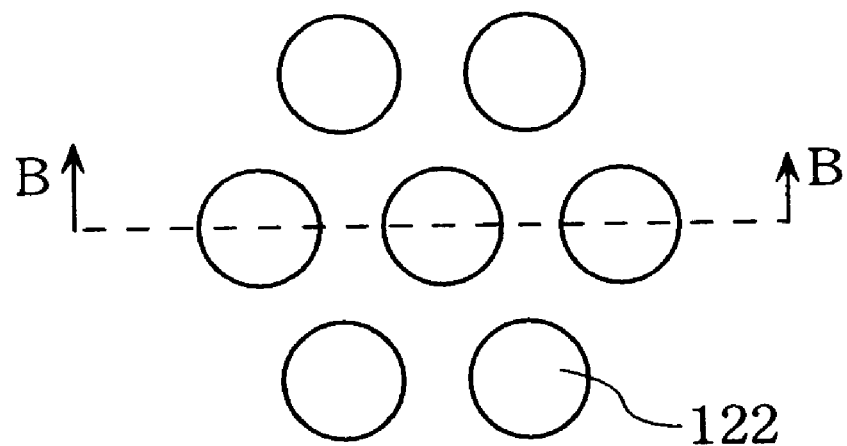
FIG. 5A is a schematic plan view of another conventional reflective plate.
Figure 5B:
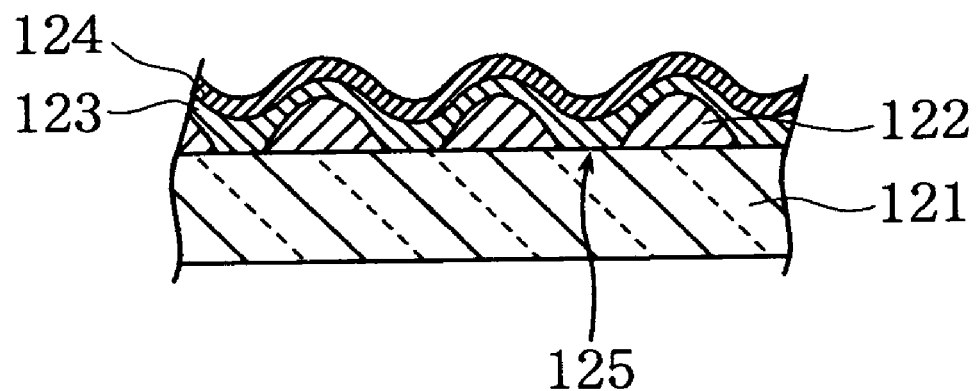
FIG. 5B is a cross sectional view taken along the line B—B shown in FIG. 5A.
Figure 6A:
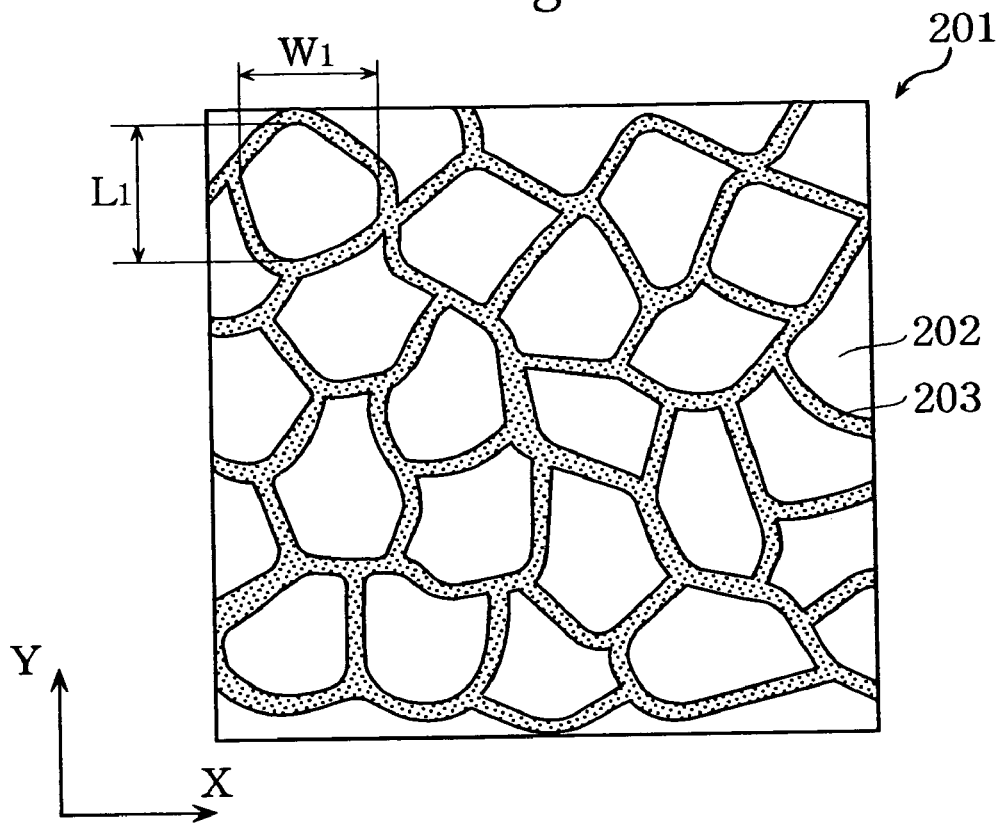
FIG. 6A is a plan view of a reflective plate of Embodiment 1 of the present invention.
Figure 6B:
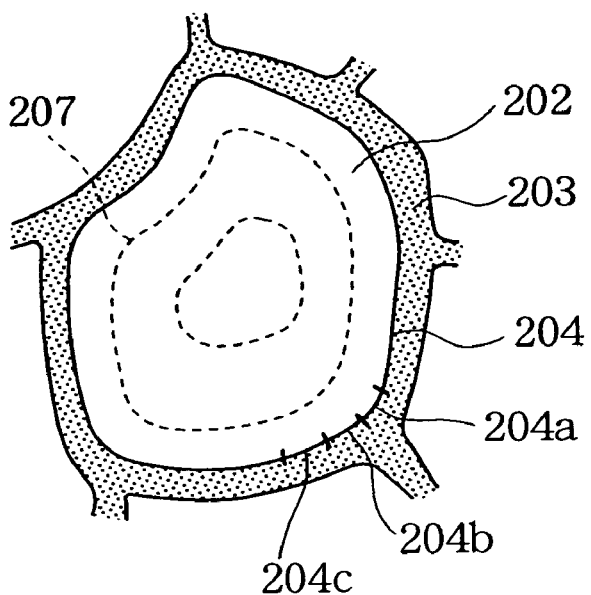
FIG. 6B is a plan view showing the essential part of the reflective plate.
Figure 6C:
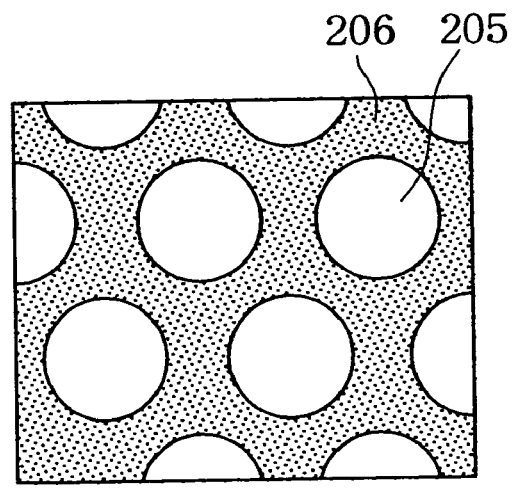
FIG. 6C is a plan view showing the essential part of a conventional reflective plate.
Figure 7:
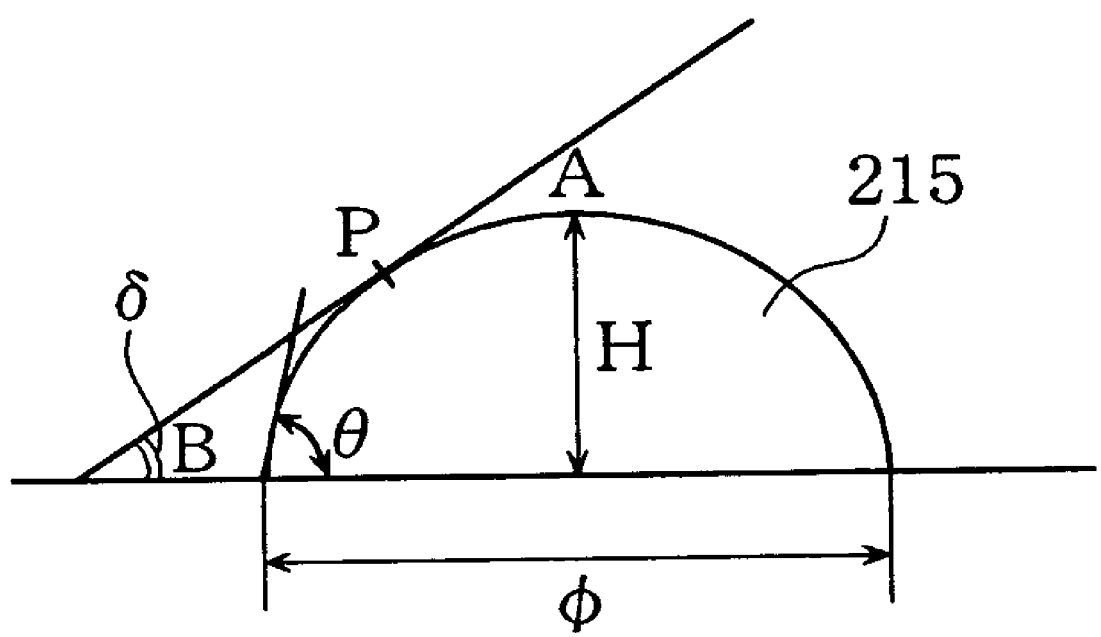
FIG. 7 is a view illustrating a contact angle and a tilt angle of a protrusion of Embodiment 1.

FIG. 6A is a plan view of a reflective plate of the present embodiment. FIG. 6B is a plan view showing the essential part of the reflective plate. FIG. 6C is a plan view showing the essential part of a conventional reflective plate. FIG. 7 is a view schematically showing a protrusion of the reflective plate.

As shown in FIG. 6A, a reflective plate 201 is composed of a substrate, a plurality of protrusions 202, and a reflective film provided to cover the protrusions 202 on the substrate.

As the substrate, an insulative material such as a glass may be used, for example.

Each of the protrusions 202 has a smooth curved surface, a non-circular shape, and an indefinitely planar shape. Also, the protrusions 202 are randomly disposed on the substrate and independent of one another. This prevents light interference caused by a repeated pattern in which the protrusions 202 are regularly aligned, and also prevents the coloring of incident light. In addition, more than two types of the planar shapes of the protrusions 202 are combined and randomly disposed by turning them around. Between a protrusion 202 and a protrusion 202, a gap portion 203 which is an exposed part of the surface of the substrate is formed. The gap portion 203 comprises a curved line and/or a broken line, both having a predetermined width.

A contour line 207 of each of the protrusions 202 is about identical to the shape of a border line (frame line) 204 between each of the protrusions 202 and the gap portion 203 in which each of the protrusions 202 is not provided. Corners of each of the protrusions 202 are smoothly heat-deformed along the frame line 204, and therefore the direction of the curved surface of each of the protrusions 202 depends on the frame line 204.

The planar shape of each of the protrusions 202 is not particularly limited. However, macroscopically, the shape is designed such that the ratio between the maximum length $W_1$ of a direction X (a lateral direction of the display screen) and the maximum length $L_1$ of a direction Y (a longitudinal direction of the display screen) is 1:1 (FIG. 6A). Reasons for making the planar shape of each of the protrusions 202 non-circular and indefinite are as follows.

If the planar shape of a protrusion 205 is circular as shown in FIG. 6C, the reflective plate shows ideal reflective properties when it is desired that light be reflected and diffused (dispersed) in all directions. However, when the circular protrusion 205 is plurally provided on the substrate, a flat gap portion 206 which is relatively large in area is formed between protrusions 205 no matter how densely the protrusions 205 are disposed. Contrarily, when the planar shape of each of the protrusions are indefinite as in the present embodiment, the shape of a gap portion 203 comprises a curved line having a predetermined width and/or a broken line having a predetermined width. In other words, the area of the flat gap portion is minimized. This reduces the regular reflection of light and inhibits the appearance of a light source on the display screen.

In addition to the prevention of regular reflection of light, the planar shape of each of the protrusions 202 is controlled for an improvement in dispersion properties. This is specifically described such that, as shown in FIG. 6B, the frame line 204 of the protrusion 205 is divided into fine line segments 204a, 204b, 204c, and the like. The line segments 204a, 204b, 204c, and the like are determined to approximately point uniformly in all directions instead of only in certain directions. When the fine line segments of the frame line are pointed in all directions, it is possible to have almost the same light diffusion properties as when the planar shape of the protrusion is circular. That is to say, the reflective plate of the present invention improves its uniform diffusion properties and disperses reflected light in all directions to have a constant brightness, irrespective of viewing directions.

It is to be noted that each of the line segments 204a, 204b, 204c, and the like is a divided segment that has enough length to be recognized as a straight line. This is because if a line segment is recognized as a straight line, its direction can be determined. Since the protrusions 202 are formed by exposure using a mask, the length of each of the line segments is determined according to exposure limits. Specifically, it is impossible to form a curved line with a length of less than 1 µm by patterning in the step of mask exposure. Therefore, when the protrusions 202 are formed by mask exposure, the frame line 204 is divided into line segments each with a length of about 1 µm so that each of the line segments is recognized as an approximate straight line. That is to say, the line segments 204a, 204b, 204c, and the like are obtained by dividing the frame line 204 every 1 µm.

The height H (µm) of each of the protrusions 202 is preferably in the range of 1.2–4 µm when the reflective plate is applied to liquid crystal display devices and a cell gap is in the range of 3–10 µm. In addition, the contact angle θ of each of the protrusions 202 is preferably in the range of 10–25 degrees. It is to be noted that the contact angle is an angle formed by the substrate and the surface of each of the protrusions 202 at a contact line (FIG. 7).

In each of the protrusions 202, the approximate ratio between the maximum length $L_1$ of a direction Y (a longitudinal direction of the display screen) and the maximum length $W_1$ of a direction X (a lateral direction of the display screen) is 1:1. In addition, the maximum diameter φ (µm) of each of the protrusions 202 is preferably in the range of 15–40 µm. A maximum diameter Φ of less than 15 µm causes inconvenience because the contact angle becomes large when the height of each of the protrusions 202 is 1.2 µm or more. Also, the maximum diameter Φ of more than 40 µm causes inconvenience because, when film thickness is 4.0 µm or less, the planar shape of each of the protrusions 202 becomes trapezoidal and the top of each of the protrusions 202 becomes flat.

The maximum diameter of each of the protrusions 202 is preferably from 5 to 20 times larger than the height of each of the protrusions 202. In addition, the protrusions 202 are preferably disposed 30 or less per area of $1\times10^4$ µm². When more than 30 of the protrusions 202 are disposed, the protrusions 202 start to have regularity in disposition, ending up with a repeated pattern. This causes light interference, and the coloring of reflected light is recognized, which is not preferable. In addition, when a TFT, a contact hole, and the like are required to be provided in one pixel, it is difficult to form the protrusions 202 independently of one another, if more than 30 of the protrusions 202 are disposed.

The width of the gap portion 203 is preferably from 1 to 10 µm, more preferably, it is in the range of 2–10 µm, and ever more preferably, it is in the range of 4–8 µm. The minimum width of the gap portion 203 is determined by exposure limits. On the other hand, when the width of the gap portion 203 is more than 10 µm, such inconvenience occurs as an increase in light to be regularly reflected and the appearance of a light source on the display screen.

The width of the gap portion 203 needs to be at least 1 µm, in consideration of temperature distribution in the step of heat treatment and the amount of heat deformation affected by the shape of the gap portion. When the area of the gap portion 203 is made large, the proportion of the flat portion increases. Therefore, to have a relatively small effect of the gap portion 203, the width of each of the protrusions 202 is made large. Specifically, when the maximum width of each of the protrusions 202 is more than 5 times larger than the width of the gap portion 203, the proportion of the flat portion decreases. However, when the maximum width of each of the protrusions 202 is more than 50 times larger than the width of the gap portion 203, the top of each of the protrusions 202 becomes flat and the distribution of small tilt angles increases. Therefore, the maximum width of each of the protrusions 202 is from 5 to 50 times larger than the width of the gap portion 203.

The reflective plate of the present embodiment is fabricated in the following manner.

Figure 8A:
FIGS. 8A–8E are cross sectional views illustrating a method of fabricating the reflective plate of Embodiment 1 of the present invention.
Figure 8B:
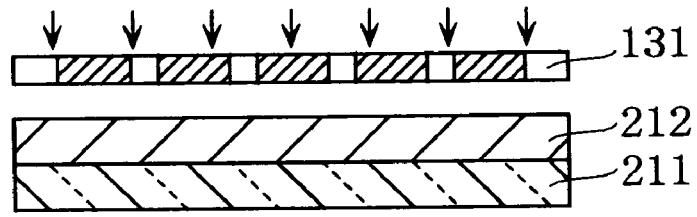
Figure 8C:
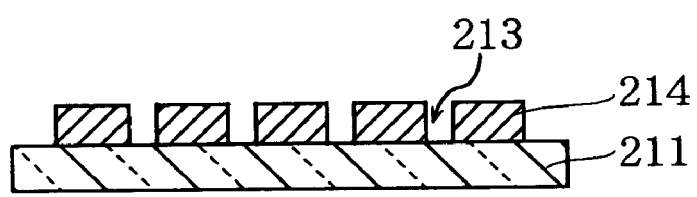
Figure 9A:
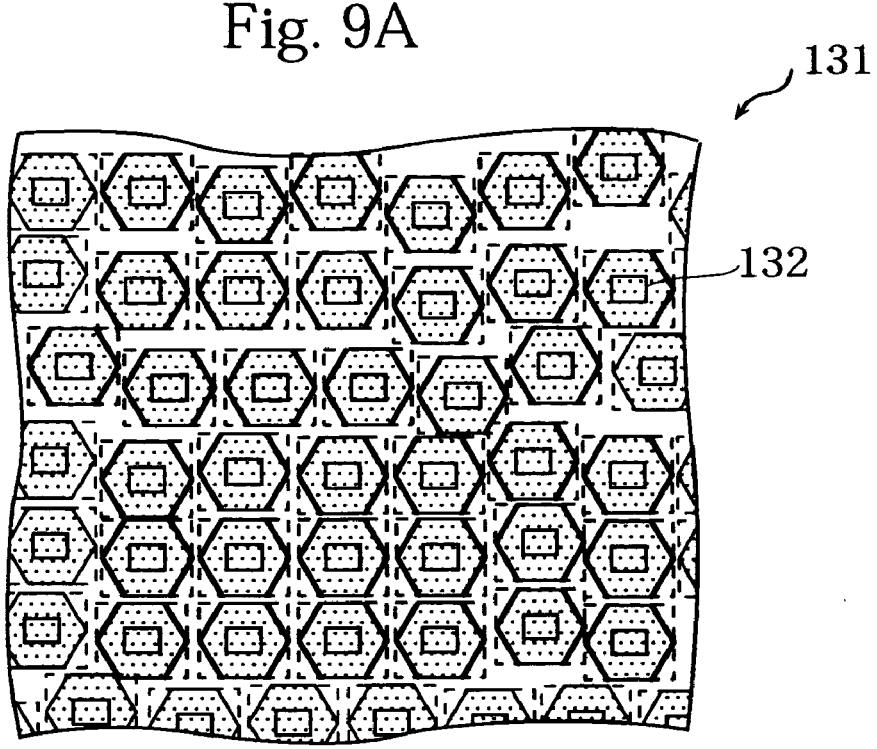
FIG. 9A is a plan view schematically showing a photo-mask used in the process of fabricating a conventional reflective plate.
Figure 9B:
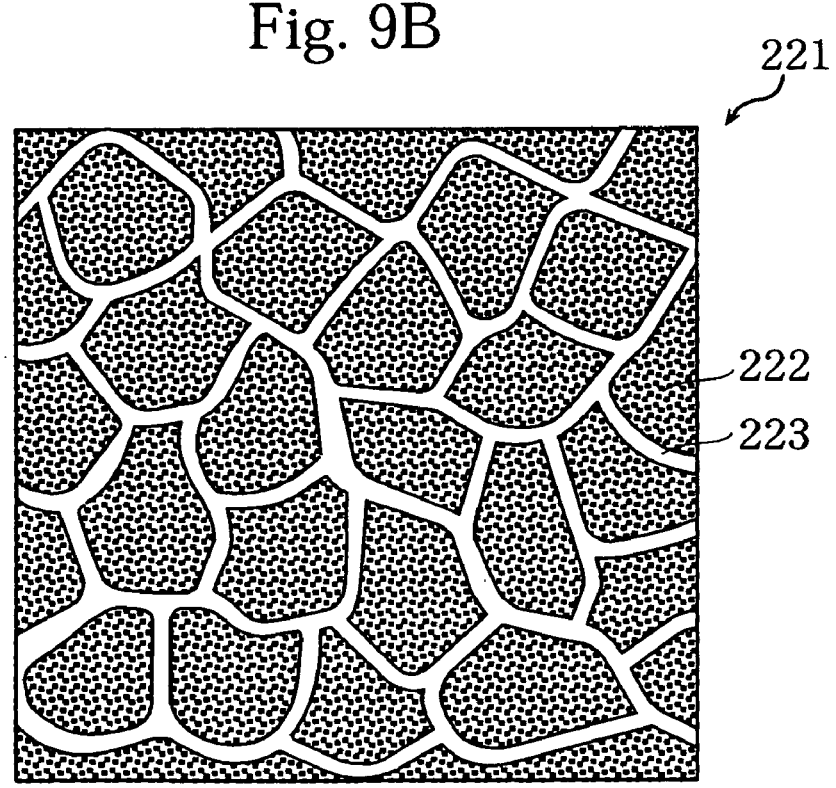
FIG. 9B is a plan view schematically showing a photo-mask used in the process of fabricating the reflective plate of Embodiment 1.
Figure 10:
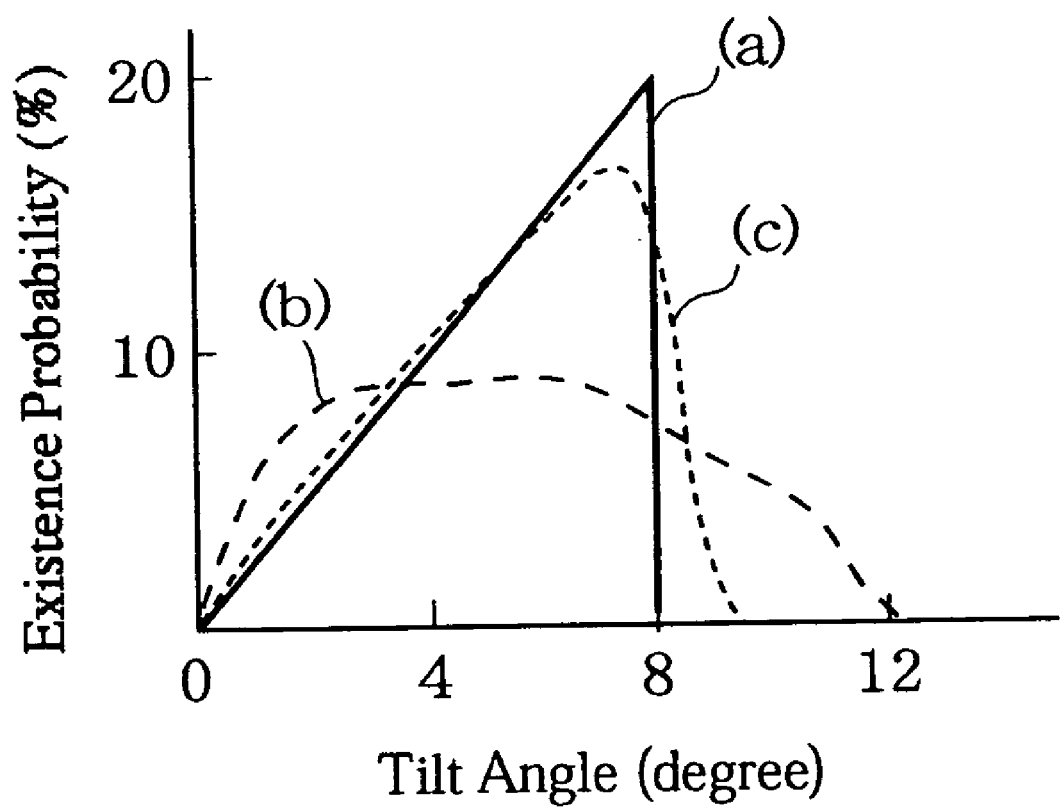
FIG. 10 is a graph showing the relationship between tilt angles of protrusions of the reflective plate and the existence probability of the tilt angles.

FIGS. 8A–8B illustrate the process of fabricating the reflective film of the present embodiment. FIG. 9A is a plan view schematically showing a photo-mask used in the process of fabricating a conventional reflective plate. FIG. 9B is a plan view schematically showing a photo-mask used in the process of fabricating the reflective plate of the present embodiment. FIG. 10 is a graph showing the relationship between tilt angles of protrusions of the reflective plate and the existence probability of the angles.

First, as shown in FIG. 8A, an acrylic p-type photo-resist (brand name: PC403, available from J.S.R.) is spin-coated on a glass substrate 211 to form a resist layer (resin layer) 212. In forming the resist layer 212, a printing method, a dip method, and the like may be used other than a spin coating method. The thickness of the resist layer 212 is made 2 µm, for example. This resist layer 212 is pre-baked on a hot plate for 2 minutes at 90° C.

Next, as shown in FIG. 8B, the resist layer 212 is light-exposed through a photo-mask 131. The photo-mask 131 has such a pattern that light shielding portions made of Cr are unevenly disposed as shown in FIG. 9A. The planar shape of each of the light shielding portions is a hexagon with a diameter of 7 µm. In addition, a gap between the light shielding portions 132 is in the range of 4 µm or less. It is to be noted that, although the mask having a pattern of the hexagonal light shielding portions is used as the photo-mask 131, the present invention is not limited to this, insofaras the planar shape of each of the light shielding portions does not have shape anisotropy in a specific direction. Specifically, a shape close to a circle such as a dodecagon may be employed.

Subsequently, the light-exposed resist layer 212 is developed to form a plurality of resist columns (column-shaped portions) 214 on the substrate 211. The height of each of the resist columns is approximately equal because they are developed at approximately the same speed. In this development, for example, NMD-3 (brand name), a developer available from Tokyo Ohka Kogyo Co., Ltd. may be used.

Figure 8D:
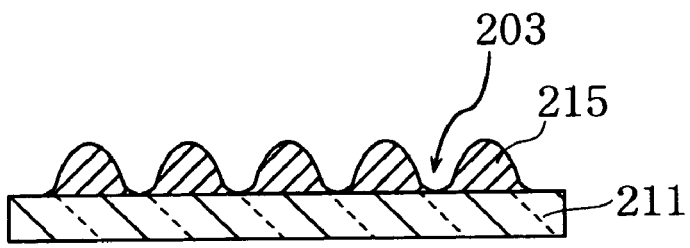
Figure 8E:
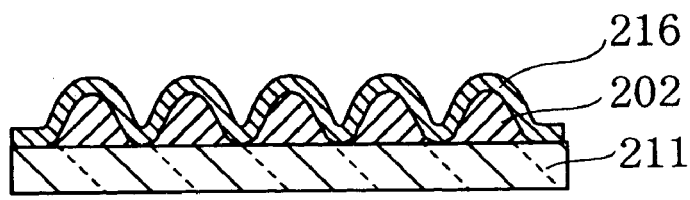

In a conventional fabricating method, the resist columns 214 were processed at 150° C. in the step of heat treatment. Thereby, as shown in FIG. 8D, corners of the tip of each of the resist columns 214 are heat-deformed so that the protrusions 202 each having a smooth curved surface are formed. In addition, to cover the protrusions 202, Al is deposited over the glass substrate 211 to form a reflective film 216 (FIG. 8E). Al may be formed by a sputtering method other than depositing. Other than Al, a reflective material may be Ag, Ni, or Ti, and also may be an alloy of Al/Ta and the like.

However, when the tilt angle distribution of the protrusions 202 formed by the conventional fabricating method was examined, such distribution was obtained as shown as a curved line (b) in FIG. 10. A reason for the high existence probability of tilt angles near 0 degrees is that gaps between the protrusions 202 were not sufficiently filled during heat deformation.

In view of this, a photo-resist material having high melting properties (flowability at the time of heat deformation) was used so that the photo-resist could flow between the resist columns 214. As a result, the existence probability of tilt angles near 0 degrees was reduced. However, when the gaps between the resist columns 214 were 3 µm or more, it was impossible to fill the gaps sufficiently only by heat fusion. This is presumably because there is a low affinity between the glass substrate 211 and the photo-resist. In addition, because of the low affinity, the photo-resist with flowability does not expand on the surface of the glass substrate, but extends in the thickness direction because of the surface tension of the photo-resist. As a result, the tilt angle of each of the obtained protrusions 202 became more than 13 degrees, which was high.

In order for the reflective plate to have an ideal reflective surface, it is preferable that the tilt angle distribution of the protrusions 202 is 8 degrees or less as shown as a solid line (a) in FIG. 10. When the tilt angle is more than 8 degrees, light that has come into a liquid crystal panel is reflected outside to draw an angle of high degrees, making it impossible to utilize the light as display light. Or else, the light is confined within the display panel and can not go outside. As a result, even if the protrusions are provided on the reflective plate, the protrusions do not effectively function to enhance reflective brightness. It is to be noted that the tilt angle is an angle formed by a tangent line that contacts with each of the protrusions 202 at a contact point P and the surface of the substrate as shown in FIG. 7.

Thus, to make the tilt angle of each of the protrusions 8 degrees or less and reduce the flat portion, it is necessary to do the following: Use a mask with such a pattern that gaps between the protrusions are each designed to be 3 µm or less; Reform the surface of the substrate so that the heat-fused photo-resist can easily flow on the substrate; Transform the photo-resist into a state to easily flow on the substrate.

In the conventional method of fabricating the reflective film, such a photo-mask 131 was used as to have a pattern in which the light shielding portions 132 each having a predetermined shape (hexagonal, for example) were randomly disposed. When using such a pattern, the disposed light shielding portions 132 are almost fully dense. Such a regular pattern causes a strong light interference and the coloring of the reflective plate.

In view of this, in the present embodiment, a photo-mask 221 shown in FIG. 9B is used in the step of exposure. The photo-mask 221 is composed of light shielding portions 222 each having an indefinite planar shape and light transmitting portions 223 provided between the light shielding portions 222. The light shielding portions 222 are provided randomly. The width of each of the light transmitting portions 223 is set to be 3 µm or less. The light transmitting portions 223 do not necessarily have a uniform width, which are determined appropriately according to the width of each of gaps between the protrusions of the reflective plate. The width of each of the light transmitting portions 223 is preferably 3 µm or less, and more preferably, it is from 1 to 2 µm.

Even a photo-resist that shows high flowability when it is heat-deformed does not expand only by heating. Therefore, if the width between the developed resist columns is 3 µm or more, the proportion of the flat portion increases. In addition, the width of each of the light transmitting portions is preferably 2 µm or less, considering that the exposure of the photo-resist might extend off the pattern of the photo-mask depending on exposure conditions, or the photo-resist might reduce its thickness in the step of development. As a result, gaps 213 between the resist columns 214 are reliably filled the by heat fusion. On the other hand, if the width of each of the light transmitting portions 223 is too small, the resist columns may not be sufficiently distant from one another depending on exposure and development conditions. Therefore, the width of each of the light transmitting portions 223 is preferably 1 µm or more.

Furthermore, in the pattern of the photo-mask, the widths of the gaps may be a mixture of two or more types of widths, for example, 1 µm and 2 µm. This further reduces light interference in the obtained reflective plate. In addition, two or more types of the shapes of the light shielding portions (or light transmitting portions) may be combined and randomly disposed by turning them around. This reduces the coloring of the reflective plate. It is to be noted that the tilt angle distribution of the reflective plate can be preferably designed also by selecting the shapes and sizes of the light shielding portions. However, since the surface of each of the light shielding portions is required to be provided with a tilt angle by heat fusion, each of the light shielding portions is limited in area or shape. Therefore, it is not preferable to make the light shielding portions too large in area.

Embodiment 2

In the present embodiment, a method of fabricating a reflective plate different from Embodiment 1 will be described.

The method of fabricating a reflective film of the present embodiment is different from that of Embodiment 1 in that the surface of the substrate is reformed so that the heat-fused photo-resist can easily flow on the substrate. This is detailed as follows.

FIGS. 11A–11F illustrate the process of fabricating the reflective plate of the present embodiment.

Figure 11A:
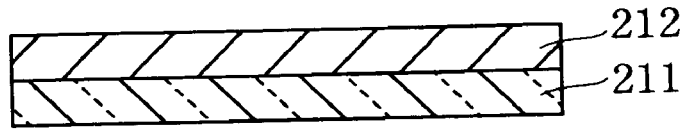
FIGS. 11A–11F are views illustrating the process of fabricating the reflective plate.

First, similarly to Embodiment 1, a p-type photo-resist (acrylic resin, brand name: PC403, available from J.S.R.) is spin-coated on a glass substrate 211 to form a resist layer 212 (FIG. 11A).

Figure 11B:
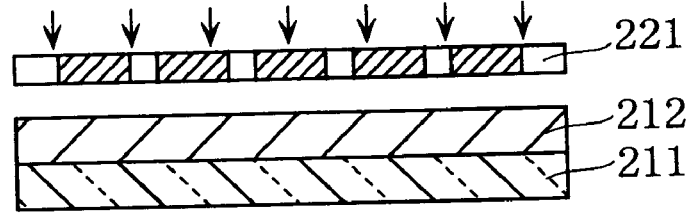

Next, as shown in FIG. 11B, the resist layer 212 is light-exposed through a photo-mask 221.

Figure 11C:
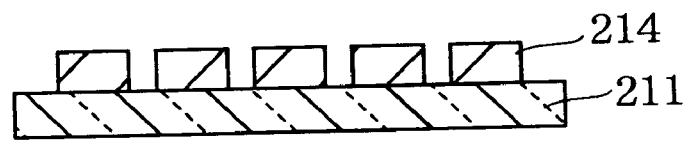

Subsequently, the light-exposed resist layer 212 is developed to form a plurality of resist columns 214 on the substrate 211 as shown in FIG. 11C.

Figure 11D:
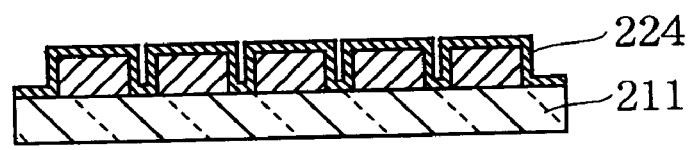

After the development, as shown in FIG. 11D, a treatment agent 224 which enhances the affinity of the substrate for the photo-resist is coated over the substrate, which has the plurality of resist columns 214 (a gap between a resist column 214 and a resist column 214 is about 4 µm).

The treatment agent 224 comprises a compound having at least one functional group selected from functional groups shown as a general formula (1) below.

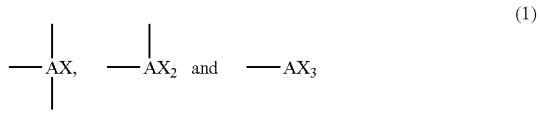

(1)

(In this formula, a symbol A denotes one atom selected from the group consisting of silicon, germanium, tin, titanium, and zirconium. A symbol X denotes one functional group selected from the groups consisting of halogen, an alkoxy group, and an isocyanate group.)

In addition, to enhance an affinity for the photo-resist, the compound has an affinity group such as a methyl group. If a treatment agent 217 is coated over the substrate 211, in gaps between the resist columns 214, the surface energy of the exposed part of the surface of the substrate changes.

The surface energy changes in the following manner. When a functional group represented by general formula (1) of the compound reacts to an OH group on the surface of the substrate, HX is removed and the compound is chemically absorbed to the surface of the substrate. As a result, a film is formed on the surface of the substrate at the gaps. On the other hand, since the compound absorbed to the surface of the substrate has an affinity group which shows an affinity for the photo-resist, the surface energy of the surface of the substrate changes.

The treatment agent 224 may be, for example, hexamethyldisilazane (trade name: OAP, available from Tokyo Ohka Kogyo Co., Ltd.), methyltrichlorosilane, or cyclohexyltrichlorosilane.

Figure 11E:
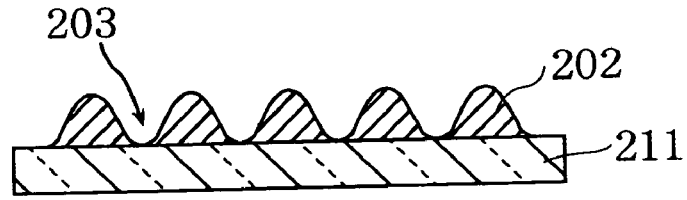

After coating the treatment agent 224, heat treatment is conducted to the resist columns 214 to form the protrusions 202 whose tips are roundly curved as shown in FIG. 11E. The gaps between the resist columns 214, which are the exposed parts of the surface of the substrate 211, have an enhanced affinity for the photo-resist. This enables the heat-fused photo-resist to flow and expand on the substrate 211 to fill the gaps. As a result, the gaps each having a width of about 4 μm are filled and the tilt angle of each of the protrusions 202 is made small, realizing almost ideal tilt angle distribution.

Figure 11F:
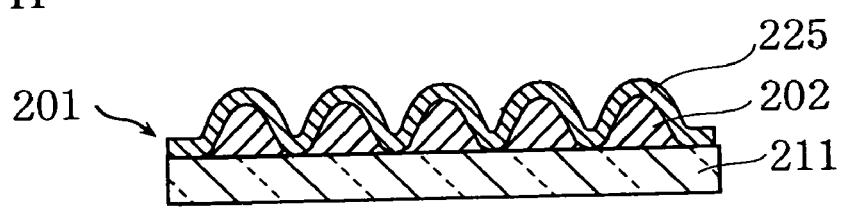

Finally, Al was deposited over the substrate 211 having thereon the plurality of protrusions 202 to form a reflective film 225 as shown in FIG. 11F. Other than depositing, a sputtering method may be used in forming the reflective film 225 using Al. In addition, other than Al, a reflective film material may be Ag, Ni, or Ti, and also may be an alloy of Al and Ta and the like.

If the reflective plate is fabricated in the above-described method, the resist columns 214 having the same volume are deformed by heat fusion. This enables it to form the protrusions in which tilt angles are controlled with good reproducibility only by setting heat treatment temperature. Furthermore, in the conventional method in which the development of the resist is stopped halfway so that the resist layer remains between the resist columns. However, in the present embodiment, parts of the resist layer that need to be removed are completely removed. Therefore, it is not necessary to precisely control conditions of exposure and development, insofaras such a condition is satisfied that parts of the resist layer that need to be removed are completely removed. That is to say, conditions of the fabrication of the reflective plate are relaxed.

Figure 12:
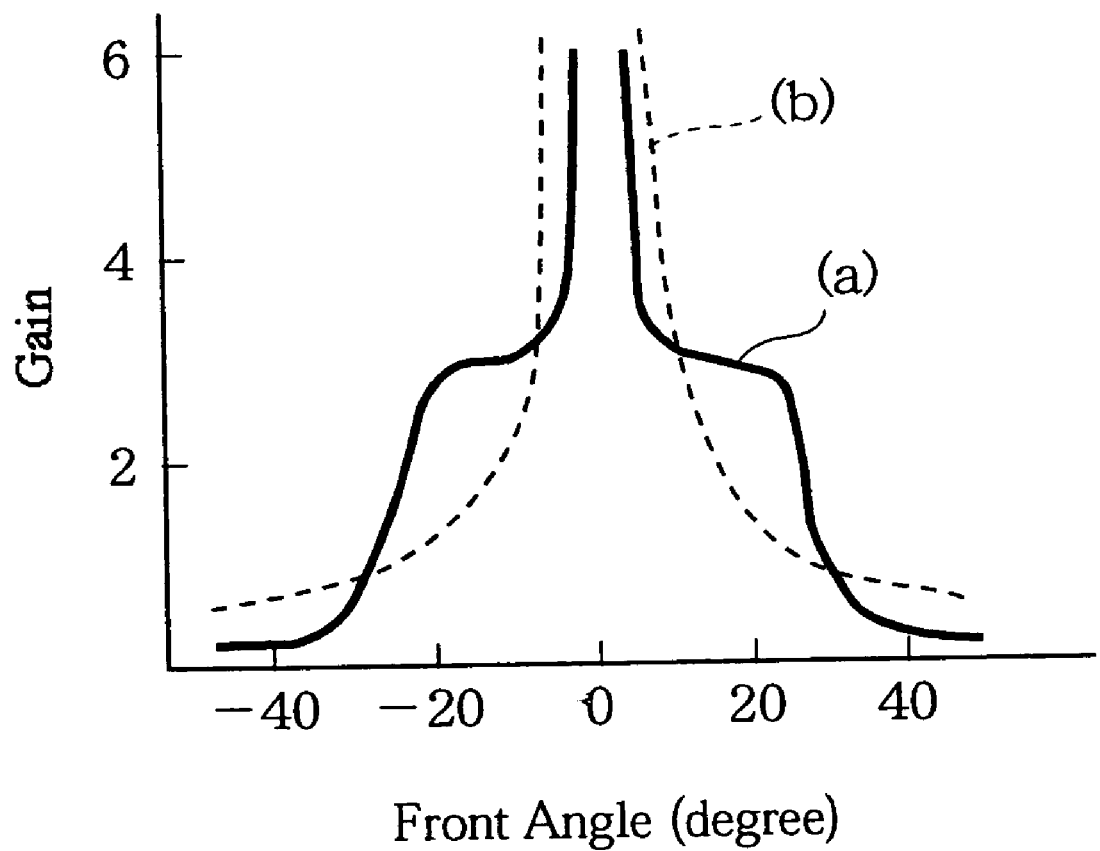
FIG. 12 is a graph showing the relationship between an incident angle of incident light in the reflective plate and the obtained gain.

In the reflective plate thus obtained, tilt angle distribution and reflective properties were studied. Tilt angle distribution was almost ideal as shown in FIG. 10 as a curved line (c). Reflective properties were studied in the following manner. A transparent layer having the same light transmissivity as a liquid crystal layer was provided on the reflective plate, and an ND filter having a 0.1 OD value was disposed on the transparent layer. Then, dispersion strength was measured when an incident angle of incident light with respect to the reflective plate is 0 degrees, that is, incident light comes in from the front of the reflective plate. The results are shown in FIG. 12. FIG. 12 is a graph showing the relationship between an incident angle and the obtained gain. It was recognized that the reflective plate of the present embodiment showed such reflective properties as shown as a curved line (a). Specifically, in the reflective properties shown as the curved line (a), gain showed more than a constant value when the incident angle was from minus 25 to 25 degrees, where the reflective plate reflects light brightly. It is to be noted that gain shown in FIG. 12 is a ratio when $BaSO_4$ reflective strength is taken to be 1.

For reference, the reflective properties of the conventional reflective plate described in Embodiment 1 are also shown in FIG. 12 (a curved line (b)). In the reflective properties shown as the curved line (b), high gain was recognized in the regularly reflected direction, which led to brightness. However, gain was extremely low in other ranges, which led to darkness. In addition, although the conventional reflective plate is brighter than that of the present embodiment when the incident angle was around ±40 degrees, there were no visual effects on the conventional reflective plate because it had inherently low gain at ±40 degrees.

Figure 13:
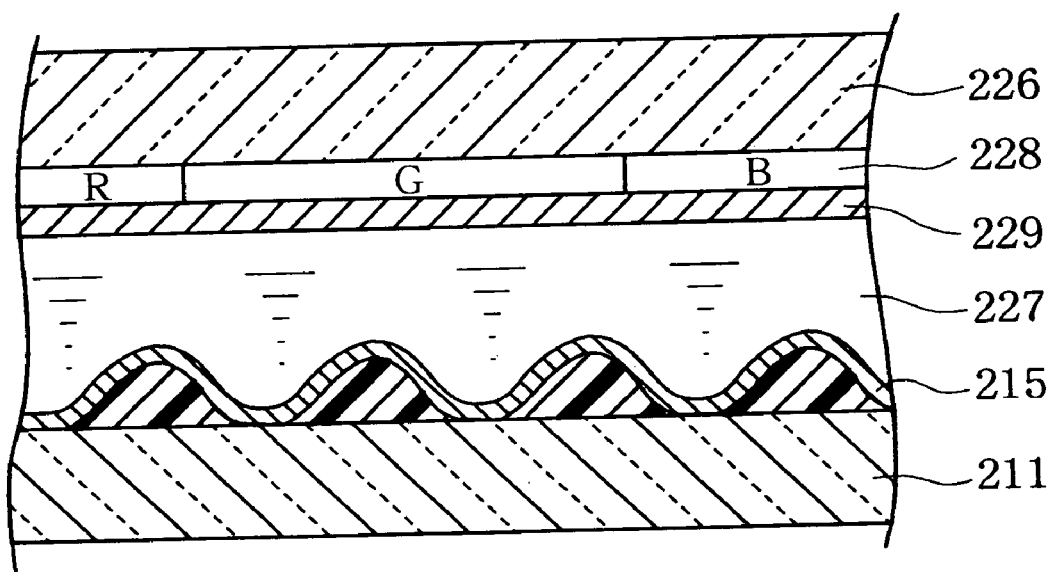
FIG. 13 is a cross sectional view showing a reflective type liquid crystal display device of Embodiment 2.

The reflective plate of the present embodiment can be applied to reflective type liquid crystal display devices. FIG. 13 is a cross sectional view of a reflective type liquid crystal display device of the present embodiment.

As shown in FIG. 13, the reflective type liquid crystal display device comprises a substrate 211, a counter substrate 226 (display screen side), and a liquid crystal layer 227 sandwiched between the substrate 211 and the counter substrate 226.

In the reflective plate of the present embodiment, the substrate 211 further comprises, TFTs and an alignment film and the like (not shown). A reflective film 215 also has a function as a pixel electrode.

On the inside of the counter substrate 226, a color filter 228 is provided. On the inside of the color filter 228, a transparent electrode 229 made of indium tin oxide (ITO) is provided. In addition, the counter substrate 226 is light-transmissive, and the liquid crystal layer 227 contains a predetermined liquid crystal material.

The reflective type liquid crystal display devices having the above-described configuration are in demand in the market of cellular phones and compact personal computers. However, since reflective properties required of each product are different, it is impossible to apply reflective type liquid crystal display devices having the same reflective properties uniformly to all products. For example, a cellular phone is free to change the angle of its display screen, and therefore needs to have high brightness rather than a wide viewing angle. On the other hand, like the display screen of a personal computer, a wide viewing angle is a necessary condition for a wide display screen. Therefore, the tilt angle distribution of the reflective surface needs to be redesigned according to application. These requirements resulting from product performance are effectively dealt with by the reflective type liquid crystal display device of the present embodiment, in which tilt angle distribution can be changed by adjusting the thickness of the resist layer and the size of each of the protrusions at the time of forming the protrusions.

In the present embodiment, the direct coating of OAP on the substrate was described as the step of imparting an affinity to the substrate. However, the present embodiment is not limited to this, and for example, it is possible to put the substrate 211 in vapor phase OAP.

Embodiment 3

A method of fabricating a reflective plate of the present embodiment is different from the method of fabricating the reflective plate of Embodiment 2 in that the surface of the substrate is exposed by an ultraviolet ray to soften the photo-resist and improve the affinity between the surface of the substrate and the photo-resist.

Specifically, the exposure of an ultraviolet ray breaks the crosslinked structure of the photo-resist so that the photo-resist lowers its heat deformation temperature. This enables higher flowability of the photo-resist when it is ready for heat deformation, compared with a photo-resist that is not exposed by an ultraviolet ray. In addition, since the exposure of an ultraviolet ray removes residues of the photo-resist between the resist columns, the affinity between the substrate and the photo-resist improves. As a result, the photo-resist can easily flow on the substrate in the step of heat treatment, making it possible to fabricate a reflective plate having preferable reflective properties.

It is preferable that an ultraviolet ray to be exposed to the photo-resist has a wavelength within a predetermined range, and the peak of the wavelength is around 365 nm. In addition, if the amount of an ultraviolet ray is enhanced to about 300 mJ/cm$^2$, the photo-resist can be discolored.

Embodiment 4

A method of fabricating a reflective plate of the present embodiment is different from the method of fabricating the reflective plate of Embodiment 2 in that a surfactant is used in place of OAP.

When a surfactant is coated over the substrate after the step of development, the surface energy of the surface of the substrate is reduced, making it possible to improve the affinity between the surface of the substrate and the photo-resist. When the resist-columns are heat-fused and their flowability is enhanced, the photo-resist promotes its spreading-wetting. As a result, gaps each having a width of 3 μm between the resist columns are filled.

The surfactant may be, for example, dioctyl-sulfosuccinate-sodium or butylnaphthalene-sulfonate-sodium.

Embodiment 5

A method of fabricating a reflective plate of the present embodiment is different from the method of fabricating the reflective plate of Embodiment 2 in that, instead of using OAP, the substrate is immersed in a solvent of the photo-resist.

The photo-resist is inherently soluble to the solvent. Therefore, when the photo-resist is in readiness for heat deformation, the surface layers of the resist-columns flow more easily on the surface of the substrate.

The solvent may be, for example, a solvent of the photo-resist such as diethylene glycol-ethyl-methyl-ether, ethyl-cellosolveacetate, or methyl-isobutyl-ketone.

The method of putting the solvent on the substrate includes immersion, spraying, and a method in which the substrate is disposed in an air-tight vessel having therein a solvent vapor.

Embodiment 6

In the present embodiment, the protrusions are also provided above an auxiliary capacitor electrode which is electrically connected to a TFT element (nonlinear element). When the width of each of the light shielding portions (or light transmitting portions) of the photo-mask was set to be uniformly 5 μm, the width of a part of a gap portion above the auxiliary capacitor electrode was 6 μm, showing a tendency to be wider than the rest part of the gap portion in other regions, which had a width of 4.5 μm. This is because a titanium layer is provided as the auxiliary capacitor electrode below the light shielding portions in the step of exposure. Specifically, since the titanium layer reflects exposure light, a region above the titanium layer is exposed more than other regions. As a result, it is presumed that the amount of development increased in the region above the titanium layer, thus widening the width of the part of the gap portion above the titanium layer.

In view of this, in a region of the pattern of the photo-mask that correspondeds to the auxiliary capacitor electrode, the width of the light shielding portion (or light transmitting portion) was made narrow to about 3 μm. As a result, the width of the part of the gap portion above the auxiliary capacitor electrode became 4 μm, making it possible to reduce a flat portion. This further improved dispersion properties.

Figure 14A:
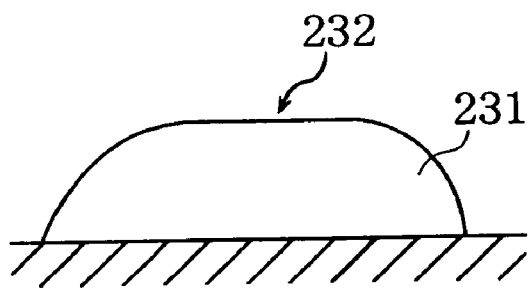
FIG. 14A is a schematic cross sectional view of a part of a protrusion above an auxiliary capacitor electrode.
Figure 14B:
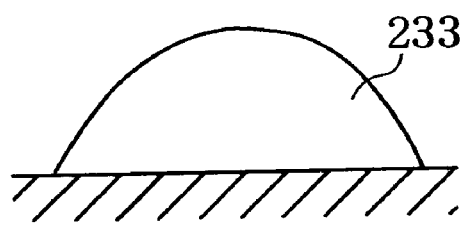
FIG. 14B is a schematic cross sectional view of the rest part of the protrusion outside the region in which the auxiliary capacitor electrode is provided.

Concerning to the shape of each of the protrusions, a comparison was conducted between a protrusion among the protrusions above the auxiliary capacitor electrode and the rest of the protrusions in other regions. As shown in FIG. 14A, a top portion 232 of a protrusion 231 above the auxiliary capacitor electrode was flat. On the other hand, a protrusion 233 in other regions was smoothly curved and had no flat regions as shown in FIG. 14B. In view of this, the maximum diameter of the part of the protrusion above the auxiliary capacitor electrode was made small from 30 μm to 25 μm. This enabled to prevent the top portion from becoming flat.

As the auxiliary capacitor electrode, titanium, molybdenum, aluminum, and the like may be used. Since these materials have different light reflectivity, the photo-mask needs to be designed according to each of their reflectivity. However, the use of any of these materials can not prevent an increase in the amount of exposure in the region where the auxiliary capacitor electrode is provided. Accordingly, to form a protrusion that is shaped for preferable reflective properties, the maximum diameter of a part of the protrusion is made smaller than that of the rest part of the protrusion in other regions, and the width of a part of a gap portion is made narrower than that of the rest part of the gap portion in other regions.

Embodiment 7

Figure 15:
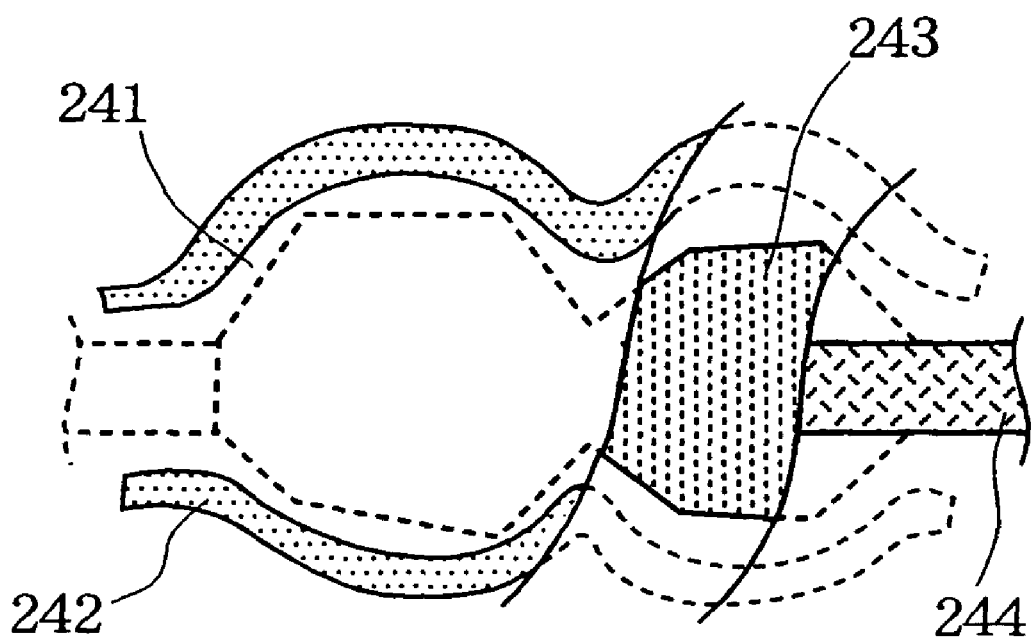
FIG. 15 is a plan view of the protrusion provided above the auxiliary capacitor electrode.
Figure 16:
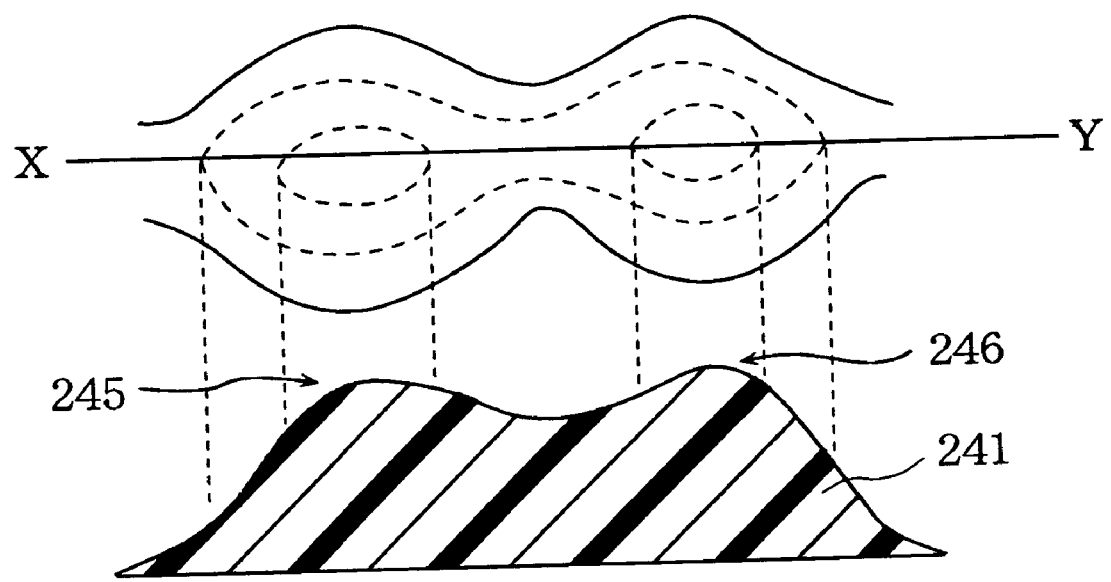
FIG. 16 is a plan view of the protrusion, and a schematic cross sectional view of the protrusion taken along the line X-Y.
Figure 17:
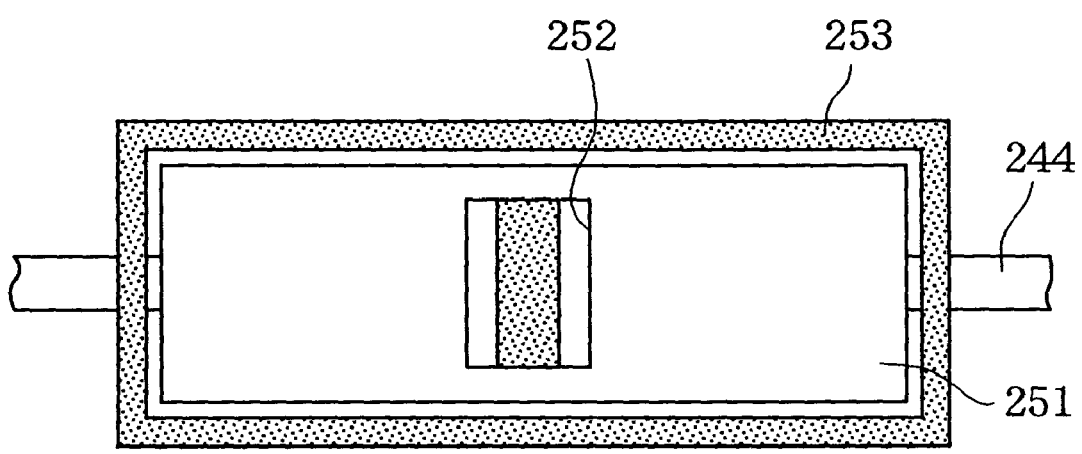
FIG. 17 is a plan view of another auxiliary capacitor electrode of the present embodiment.

In the present embodiment, one of the protrusions is provided above the auxiliary capacitor electrode so that at least a part of the gap portion overlaps with the periphery of the auxiliary capacitor electrode. FIG. 15 is a plan view of a protrusion provided above the auxiliary capacitor electrode. FIG. 16 is a plan view of the protrusion, and a schematic cross sectional view of the protrusion taken along the line X-Y. FIG. 17 is a plan view of another auxiliary capacitor electrode of the present embodiment.

As shown in FIG. 15, an auxiliary capacitor electrode 243 is provided to cover a signal line 244 through an insulative layer in order to form an auxiliary capacitor. The auxiliary capacitor electrode 243 is electrically connected to a TFT element (nonlinear element), which is not shown.

Above the auxiliary capacitor electrode 243, a protrusion 241 is provided. The protrusion 241 has two tip portions 245–246 as shown in FIG. 16. A gap portion 242 formed between the protrusion 241 and another protrusion is provided along the periphery of the auxiliary capacitor electrode 243.

The auxiliary capacitor electrode 243 is a polygon that looks like a combination of two polygons and has a reentrant angle in a certain portion. If the planar shape of the auxiliary capacitor electrode is quadrangular, the top of the protrusion formed above the auxiliary capacitor electrode becomes. flat. In the step of exposure, since the auxiliary capacitor electrode reflects exposure light, a region above the electrode is exposed more than other regions. If the planar shape of the auxiliary capacitor electrode is quadrangular, the amount of exposure uniformly increases in the region above the electrode. As a result, the top of the protrusion becomes flat, and the obtained protrusion has strong specularity.

However, in the present embodiment, the planar shape of the auxiliary capacitor electrode 243 has a reentrant angle, and the gap portion 242 is provided at the periphery of the electrode 243. This enables it to vary the height of the protrusion between the reentrant angle and a protruding angle, because the volume of the photo-resist varies between the reentrant angle and the protruding angle. As a result, the tip portions 245–246 are formed as shown in FIG. 16, making it possible to improve dispersion properties even above the auxiliary capacitor electrode 243.

In the above-described configuration, even if the cell gap is small, it is possible to keep the cell gap uniform throughout the substrate without forming a flat surface on the protrusion.

Specifically, when the protrusion is provided above the auxiliary capacitor electrode that is formed on a position higher than other portions in a direction perpendicular to the surface of the substrate, there appears a large difference in height between the protrusion and protrusions in other regions. This makes the cell gap uneven. On the other hand, when a low protrusion is provided above the auxiliary capacitor electrode, a flat surface is widened on the protrusion, resulting in strong specularity. However, in the reflective plate of the present embodiment, even if a low protrusion is provided, no flat surface is formed thereon. In addition, height difference between the protrusion and protrusions in other regions is not made large.

In addition, as shown in FIG. 17, an opening portion 252 may be provided inside an auxiliary capacitor electrode 251. A gap portion 253 is provided at the periphery of an auxiliary capacitor electrode 251. In this configuration, the protrusion is depressed towards the auxiliary capacitor electrode 251, and consequently, a curved surface is formed on the protrusion provided above the auxiliary capacitor electrode 251. This enables to further reduce a flat surface.

Embodiment 8

A method of fabricating a reflective plate of the present embodiment will be described below.

A method of fabricating the reflective plate of the present embodiment is different from the method of fabricating the reflective plate of Embodiment 1 in that the surface of the substrate is reformed so that the heat-fused photo-resist can easily flow on the substrate. This is detailed as follows.

FIGS. 18A–18G illustrate the fabricating process of a reflective plate of the present embodiment.

Figure 18A:
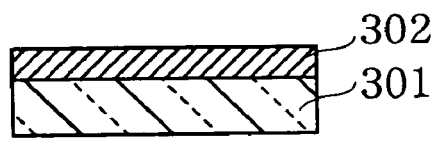

First, as shown in FIG. 18A, a p-type photo-resist (acrylic resin, brand name: PC403, available from J.S.R.) is spin-coated on a glass substrate 301 to form a resist layer (resin layer) 302. In forming the resist layer 302, a printing method, a dip method, and the like may be used other than a spin coating method. The thickness of the resist layer 302 is made 2 μm, for example. This resist layer 302 is pre-baked on a hot plate for 2 minutes at 90° C.

Figure 18B:
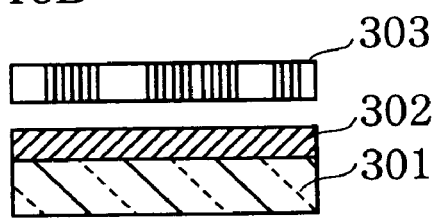
Figure 19:
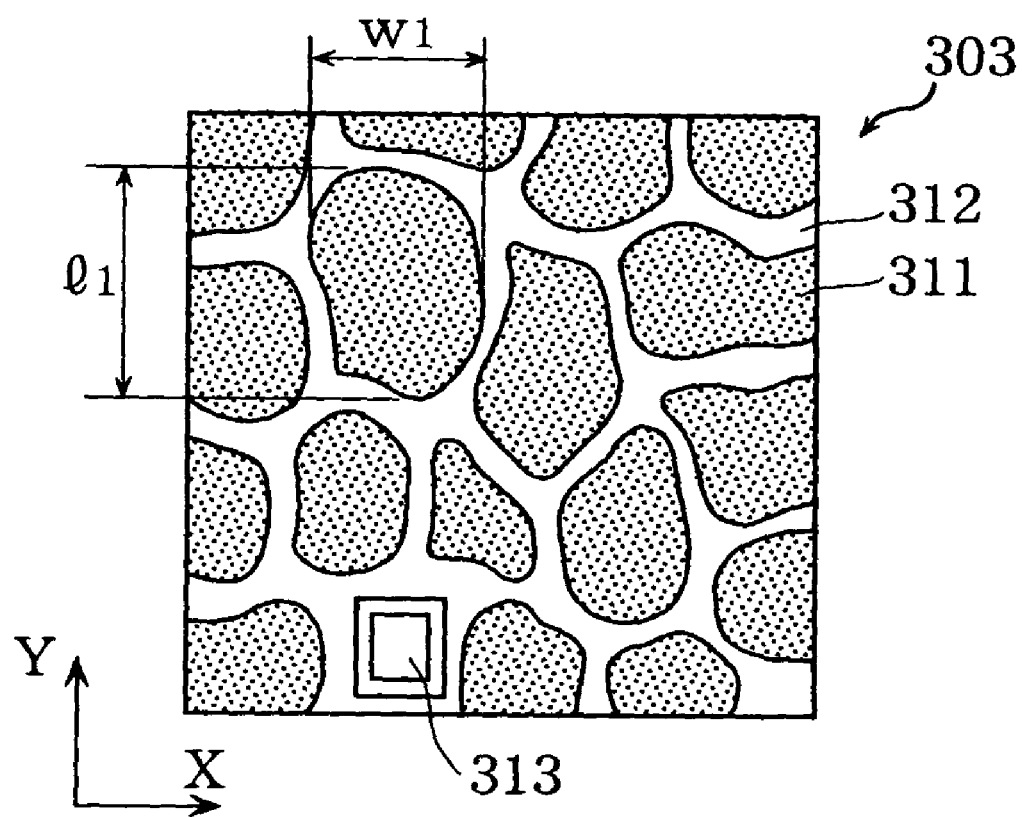
FIG. 19 is a plan view showing the essential part of a photo-mask used in Embodiment 8.

Next, as shown in FIG. 18B, the resist layer 302 is light-exposed through a photo-mask 303. The essential part of the photo-mask 303 is shown in FIG. 19. As shown in the figure, the photo-mask 303 is composed of light shielding portions 311 each having an indefinite planar shape and light transmitting portions 312 provided between the light shielding portions 311. In addition, the photo-mask 303 has a light transmitting portion 313 used for forming a contact hole on the resist layer 302. The light shielding portions 311 are composed of Cr and disposed randomly. Moreover, the light shielding portions 311 are provided so that the approximate ratio between the maximum length $l_1$ of a direction Y (a longitudinal direction of the display screen) and the maximum length $w_1$ of a direction X (a lateral direction of the display screen) is 1:1. The width of each of the light transmitting portions 312 is set to be about 3–5 μm.

Figure 18C:
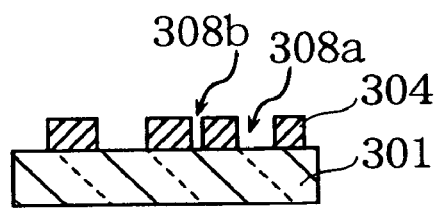

Subsequently, the light-exposed resist layer 302 is developed. Specifically, the substrate 301 having provided thereon the resist layer 302 is immersed in a developer for a predetermined period. Then, the substrate 301 is taken out of the developer and cleaned in water. As a result, as shown in FIG. 18c, a plurality of resist columns 304 are formed on the substrate 301. As a developer, for example, NMD-3 (brand name), available from Tokyo Ohka Kogyo Co., Ltd., may be used.

Figure 18D:
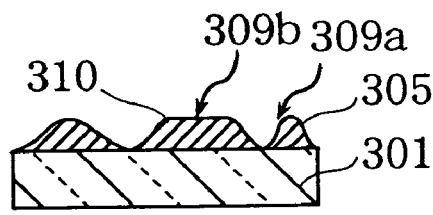
Figure 18E:
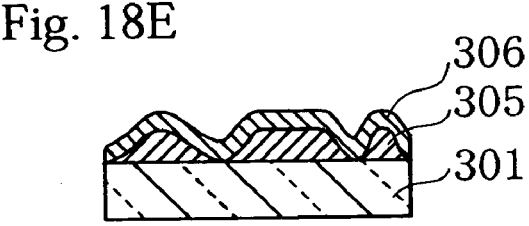
Figure 18E:
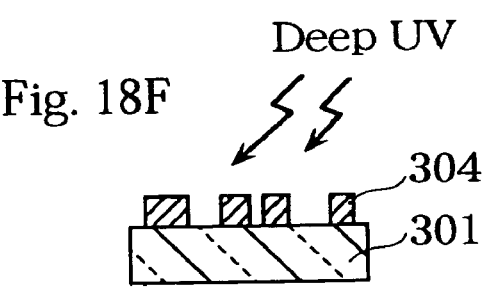

In the conventional fabricating method, water was removed by evaporation, and there was a step of heat treatment of the resist columns 304 at 150° C. Specifically, as shown in FIG. 18D, corners of top of each of the resist columns 304 were heat-deformed to form protrusions 305 each having a curved surface. Then, to cover the protrusions 305, aluminum was deposited to cover the glass substrate 301 to form a reflective film 306 (FIG. 18E). Al may be formed by a sputtering method other than depositing. Other than Al, a reflective material may be silver (Ag), nickel (Ni), or titanium (Ti), and also may be an alloy of Al/tantalum (Ta) and the like.

Here, two adjacent resist columns 304 beside a narrow gap 308a do not combine with each other by heat fusion. On the other hand, two adjacent resist columns 304 beside a wide gap 308b combine with each other by heat fusion, resulting in a protrusion 310 having different tilt angle distribution. Like the protrusion 310, if the reflective plate has a protrusion with tilt angle distribution different from that of other protrusions 305, reflective properties become uneven within the surface of the substrate. If a reflective plate in which reflective properties are uneven within the surface of the substrate is applied to a display device, uneven brightness is recognized on the display screen.

In view of this, in the present embodiment, the developed resist columns 304 are subjected to UV hardening to prevent the combining of the adjacent resist columns 304. Specifically, the resist columns 304 are irradiated by deep UV light (dominant wavelength: 254 nm).

Figure 18G:
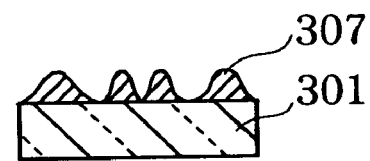

Photo-resist that consists the resist columns 304 is highly absorptive to deep UV. Therefore, after the irradiation of deep UV, the surface layer of each of the resist columns 304 are hardened. On the other hand, the internal of each of the resist columns 304 is not hardened, because deep UV has a short wavelength. That is to say, the internal of each of the resist columns 304 keeps its initial heat fusion properties, and there is a difference in fusion temperature between the surface layer and internal of each of the resist columns 304. If the resist columns 304 having such conditions are subjected to heat treatment, the surface layer of each of the resist columns 304 becomes smoothly curved by heat fusion. However, since the surface layer is hardened, it does not flow as far as the adjacent resist columns 304. This enables to form protrusions 307 that are independent of one another and have uniform tilt angle distribution, and to fabricate a reflective plate without uneven reflective brightness, as shown in FIG. 18G.

As a light source for the irradiation of deep UV a low pressure mercury lamp is used. Irradiation period is 2 minutes, for example. The heat fusion properties of the photo-resist in relation to irradiation period were studied. The result is that the longer the irradiation period was, the less the expansion amount of the resist columns 304 by heat fusion became. When irradiation period was more than 2 minutes, the expansion amount of the resist columns 304 became constant. In addition, the thinner the resist layer 302 was (or the lower the resist columns 304 were), the shorter the period of irradiation was before the expansion amount of the resist columns 304 became constant. Therefore, when irradiation is more than a predetermined amount, similarly shaped protrusions can be formed without depending on the amount of irradiation, if heat fusion temperature is the same.

Thus, when the irradiation period of deep UV is controlled in accordance with the thickness of the resist layer 302 (or the height of each of the resist columns 304), the formation of the protrusions having uneven tilt angle distribution is prevented, and the reflective plate having even reflective brightness is fabricated. In addition, the irradiation of deep UV with a low pressure mercury lamp also has a function of discoloring. Therefore, even if a colored photo-resist is used, the photo-resist is discolored to form transparent protrusions.

In the conventional method of fabricating a reflective plate, the protrusions were formed in the step of the first resist layer, and the second resist layer was further formed over the protrusions to have a smoothly curved surface for each of the protrusions. However, in the method of fabricating the reflective plate of the present embodiment, the reflective plate is fabricated without forming the second resist layer. As a result, the number of steps is reduced, realizing a reduction in fabrication costs.

Moreover, in the conventional method of fabricating a reflective plate, a mask was required in the step of forming the second resist layer in order to prevent the blockage of a contact hole which had been formed in the step of the first resist layer. However, in the method of fabricating the reflective plate of the present embodiment, since the contact hole is formed simultaneously with the protrusions in the step of the first resist layer, such a mask for the contact hole is not necessary, realizing a reduction in the number of masks.

Embodiment 9

A method of fabricating a reflective plate of the present embodiment will be described below.

The method of fabricating the reflective plate of the present embodiment is different from the method of fabricating the reflective plate of Embodiment 8 in that an alkaline solution is used in hardening the surfaces of the resist columns in place of deep V. This is detailed as follows.

In the present embodiment, a 0.8% of alkaline solution, TMAH (trimethyl-ammonium-hydro-oxide, brand name: NMD-3, available from Tokyo Ohka Kogyo Co., Ltd.) is used. NMD-3 is usually used as a developer at a concentration of 0.4 weight %.

The present inventors have found that by developing the resist layer using a 0.8 weight % of NMD-3, the expansion amount of the resist columns in a lateral direction is reduced in the step of heat fusion.

Specifically, when using a p-type photo-resist, the resist columns obtained on the substrate after the steps of exposure and development are regions which are not light-exposed. It is presumed that these non-light-exposed photo-resists came into contact with and reacted to the alkaline solution, and thus the surface layer of each of the resist columns were hardened. As a result of this hardening, heat deformation temperature at the surface layers of the resist columns was made high, and their flowability in readiness for heat deformation was inhibited.

Therefore, in the method of fabricating the reflective plate of the present embodiment, since the melting properties of the photo-resist are controlled only by the usual step of development, an increase in the number of fabricating steps is inhibited in comparison to Embodiment 8, realizing a reduction in fabricating costs.

Usually, an alkaline solution used in development has a pH of around 12. If the resist layer is immersed in an alkaline solution having a pH of 14, the expansion of the resist columns in a lateral direction is inhibited in following heat treatment. For example, when a gap between the resist columns was 5 μm, the gap was not filled.

In the present embodiment, although the increase of pH of the alkaline developer at the time of development was described as an example, such a method may be also employed that the alkaline solution is transformed into a vapor phase and the resist columns react to the vapor.

Embodiment 10

Figure 20:
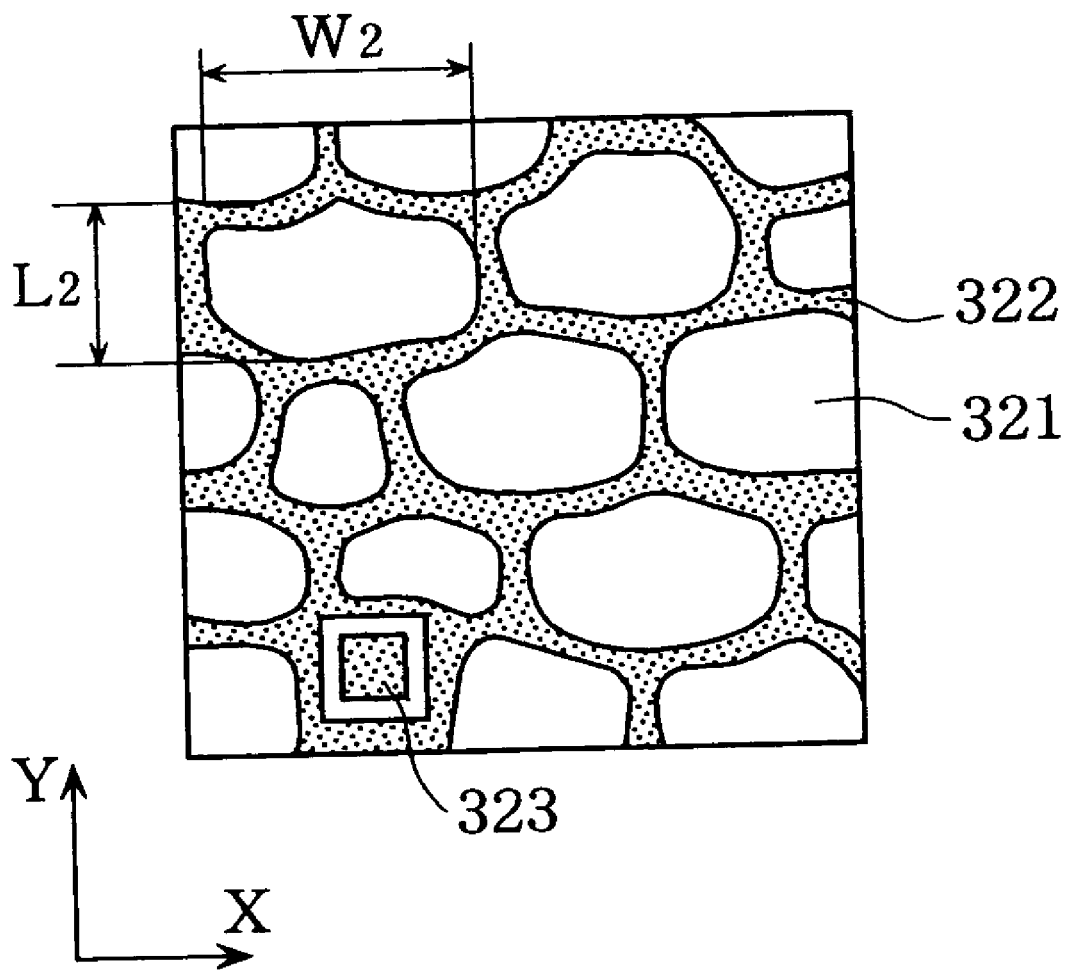
FIG. 20 is a plan view of a reflective plate of Embodiment 10.

A reflective plate of the present embodiment is different from the reflective plate of Embodiment 1 in the planar shape of each of the protrusions. Specifically, in Embodiment 1, each of the protrusions was described such that the approximate ratio between the maximum length $L_1$ of a longitudinal direction of the display screen and the maximum length $W_1$ of a lateral direction of the display screen was 1:1. On the other hand, in the present embodiment, the planar shape of a protrusion 321 is designed such that the ratio between the maximum length $L_2$ of a longitudinal direction (Y direction) of the display screen and the maximum length $W_2$ of a lateral direction (X direction) of the display screen is 1:2 as shown in FIG. 20.

Figure 21:
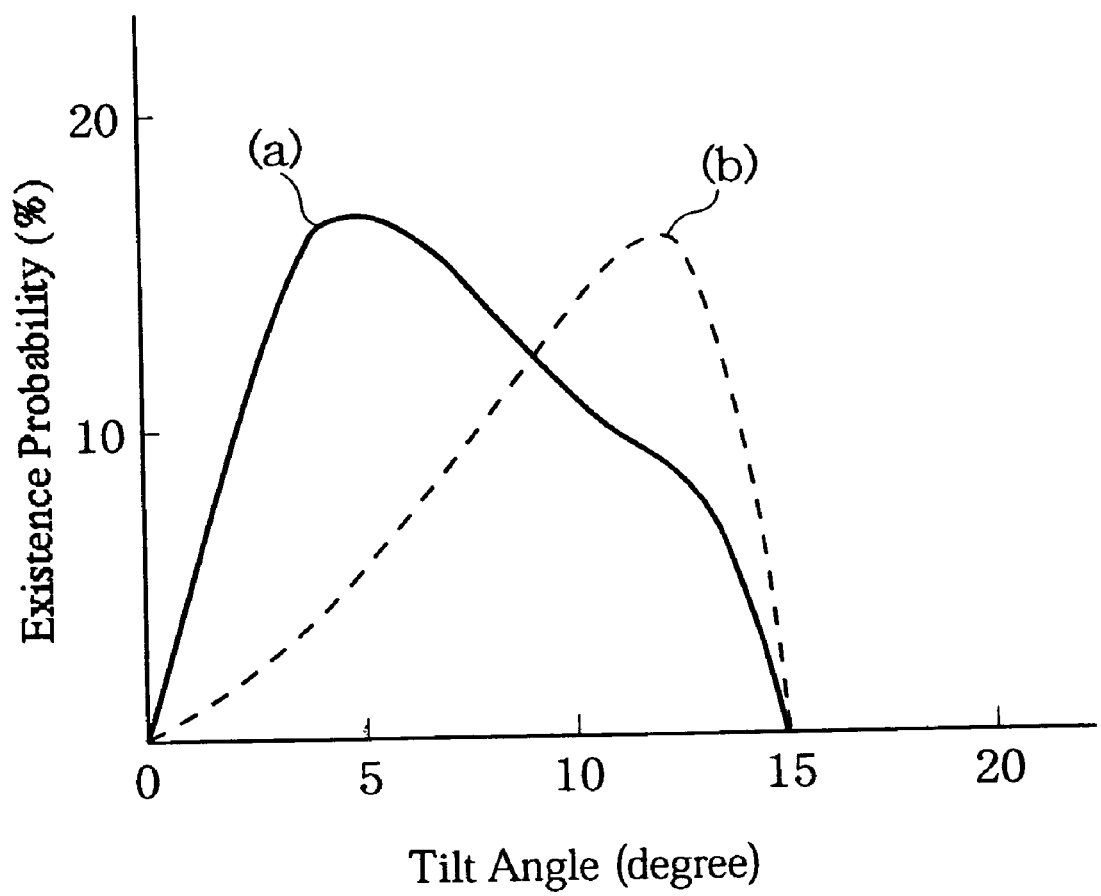
FIG. 21 is a graph showing the relationship between tilt angles (degree) of protrusions of the reflective plate and the existence probability (%) of the tilt angles.

When the maximum length of a longitudinal direction of the display screen and the maximum length of a lateral direction of the display screen are varied as mentioned above, the protrusion has such tilt angle distribution as shown in FIG. 21. FIG. 21 is a graph showing the relationship between the tilt angle (degree) of the protrusion and the existence probability (%) of the tilt angle. A solid line (a) in the figure denotes the tilt angle distribution of the protrusion in a lateral direction. A solid line (b) denotes the tilt angle distribution of the protrusion in a longitudinal direction. As clearly shown in the figure, the existence probability in a lateral direction has its peak at a lower tilt angle than the peak of the existence probability in a longitudinal direction. That is to say, it is recognized that, at a tilt angle in a lateral direction, light is reflected and dispersed in the normal direction of the panel.

Therefore, the reflective plate of the present embodiment increases the brightness of the display screen in a lateral direction, while decreases the brightness of the display screen in a longitudinal direction. This enables it to provide directivity to reflective properties.

Reflective type liquid crystal display devices having the reflective plate of the present embodiment is useful to mobile phones, for example. To mobile phones in which the viewing angle is wide in a longitudinal direction but narrow in a lateral direction, such a reflective plate is useful that is capable of collecting light by reflecting and dispersing ambient light. This is because the reflective plate of the present embodiment is capable of providing directivity to reflected and dispersed light. Specifically, the shape of each of the protrusions of the reflective plate is controlled such that the ratio of the maximum length of a longitudinal direction to the maximum length of a lateral direction is 1.5 or more to 1.

Figure 22:
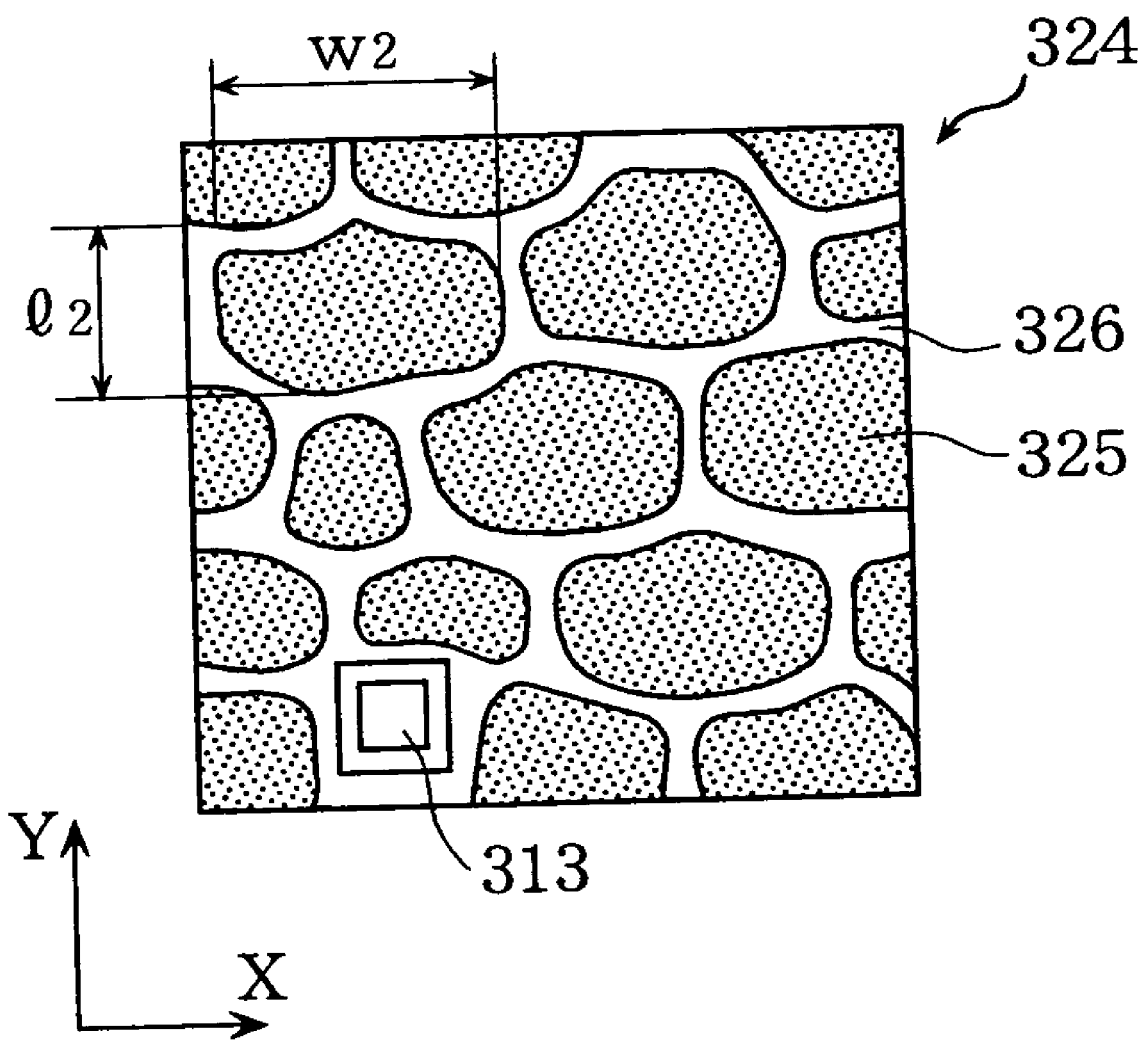
FIG. 22 is a plan view showing the essential part of a photo-mask used in Embodiment 10.

In the fabrication of the reflective plate of the present embodiment, a photo-mask shown in FIG. 22 is used in the step of exposure. As shown in the figure, a light shielding portion 325 is provided such that the approximate ratio between the maximum length $l_2$ of Y direction (a longitudinal direction of the display screen) and the maximum length $w_2$ of X direction (a lateral direction of the display screen) is 1:2. In addition, the width of a light transmitting portion 326 is 2–5 µm.

Embodiment 11

Figure 23:
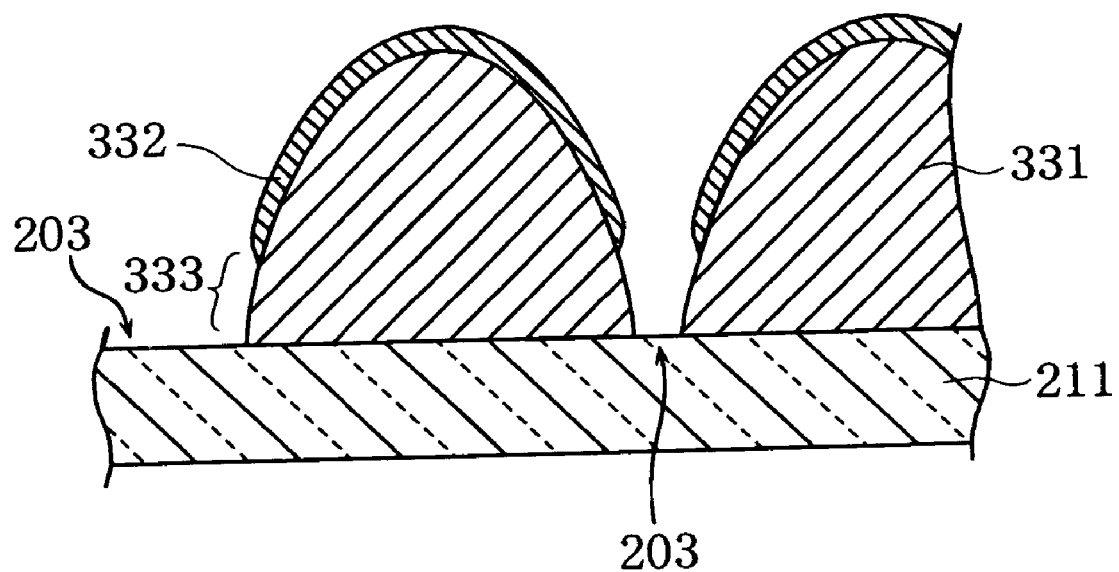
FIG. 23 is a plan view of a protrusion of a reflective type liquid crystal display device of Embodiment 12 of the present invention.

A reflective plate of the present embodiment is different from the reflective plate of Embodiment 1 in that the reflective plate of the present embodiment is a transflective reflective plate having light transmitting portions. FIG. 23 is a schematic cross sectional view of the transflective reflective plate of the present embodiment.

As shown in FIG. 23, a plurality of protrusions 331 made of a light-transmissive resist material are provided on a substrate 211. A gap portion 203 formed between the protrusions 331 has a function as a light transmitting portion to transmit light. In addition, a reflective film 332 is provided on the protrusions 331. The reflective film 332 is not provided on a low position 333 of each of the protrusions 331.

The low position 333 is a region at the foot of each of the protrusions 331 having a tilt angle of from 15 to 90 degrees. When light with an incident angle of 50 degrees or more reaches the curved surface of a protrusion among the protrusions having a tilt angle of 15 degrees or more, the light is reflected in a direction perpendicular to the substrate. Although this enables to reflect light having a wide incident angle in the normal direction, an optimum tilt angle of around 8 degrees (in this case, an incident angle of 25 degrees is reflected in a perpendicular direction) relatively reduces its existence probability. This reduces reflective properties throughout the surface of the substrate. That is to say, even if the reflective film is formed on the low position 333 having a tilt angle of 15 degrees or more, reflective properties are not improved. It is more likely that the low position 333 is used as a part of the light transmitting portion in order to have constant reflective brightness, irrespective of viewing directions.

In addition, the protrusions 331 are preferably disposed 15 or less per area of $1 \times 10^4$ µm². In a transflective type reflective plate, the gap portion 203 acting as the light transmitting portion constitutes more than 50% of the pixel region. This is why the protrusions 331 are preferably disposed 15 or less. When more than 15 of the protrusions 331 are disposed, the protrusions 331 start to have regularity in disposition, ending up with a repeated pattern. This causes light interference, and the coloring of reflected light are recognized, which is not preferable.

Embodiment 12

In the present embodiment, a study was conducted on how the shape of the photo-mask and the thickness of the resist layer effect on the shape of each of the protrusions. It is to be noted that, although a discussion is conducted using a protrusion whose planar shape is circular for convenience in the present embodiment, the following applies to a protrusion whose planar shape is indefinite.

Using a photo-mask having circular light shielding portions, protrusions respectively having a diameter of 10, 20, 30, 40, 50, and 60 µm were formed. The thickness of the resist layer was set to be 2 µm. A resist material that was used was the same as in Embodiment 1. Irradiation period of deep UV using a low pressure mercury lamp was 2 minutes in all the cases. The results are shown in FIG. 22.

Figure 24:
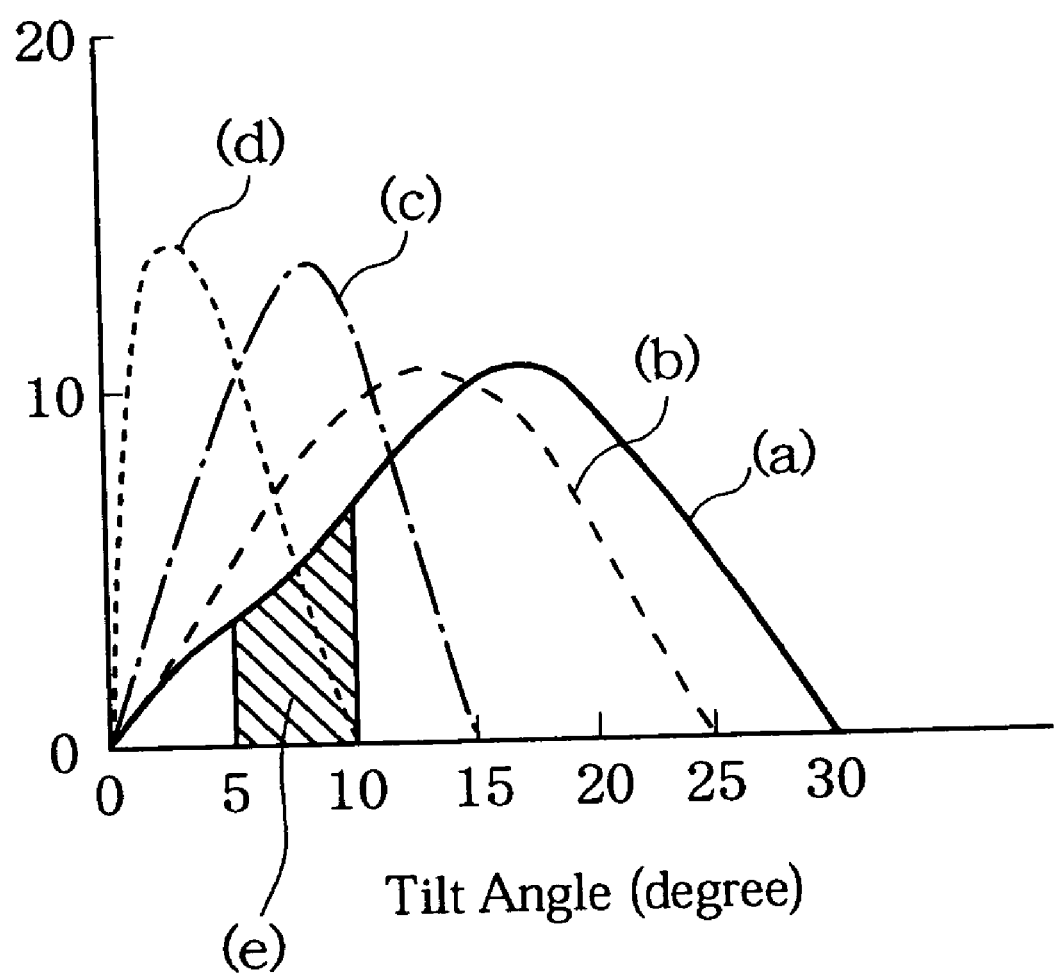
FIG. 24 is a graph showing the relationship between tilt angles of protrusions and the existence probability of the tilt angles.

FIG. 24 is a graph showing the relationship between the tilt angle of the protrusion and the existence probability of the tilt angle. In the graph, curved lines (a), (b), (c), and (d) are the existence probability of the tilt angle when the diameter of the protrusion is 5, 10, 30, and 60 µm, respectively. The graph clearly shows that as the diameter of the protrusion became larger, the peak of the tilt angle distribution of the protrusion shifted to lower tilt angles. Reflective properties increase in the range of ±25 degrees from the normal direction as the existence probability of the tilt angle in the range of 5 to 10 degrees becomes higher, in other words, as an area A (integral values when the tilt angle is in the range of 5 to 10 degrees) of an obliquely lined region (e) of the curved line (a) becomes larger.

Figure 25:
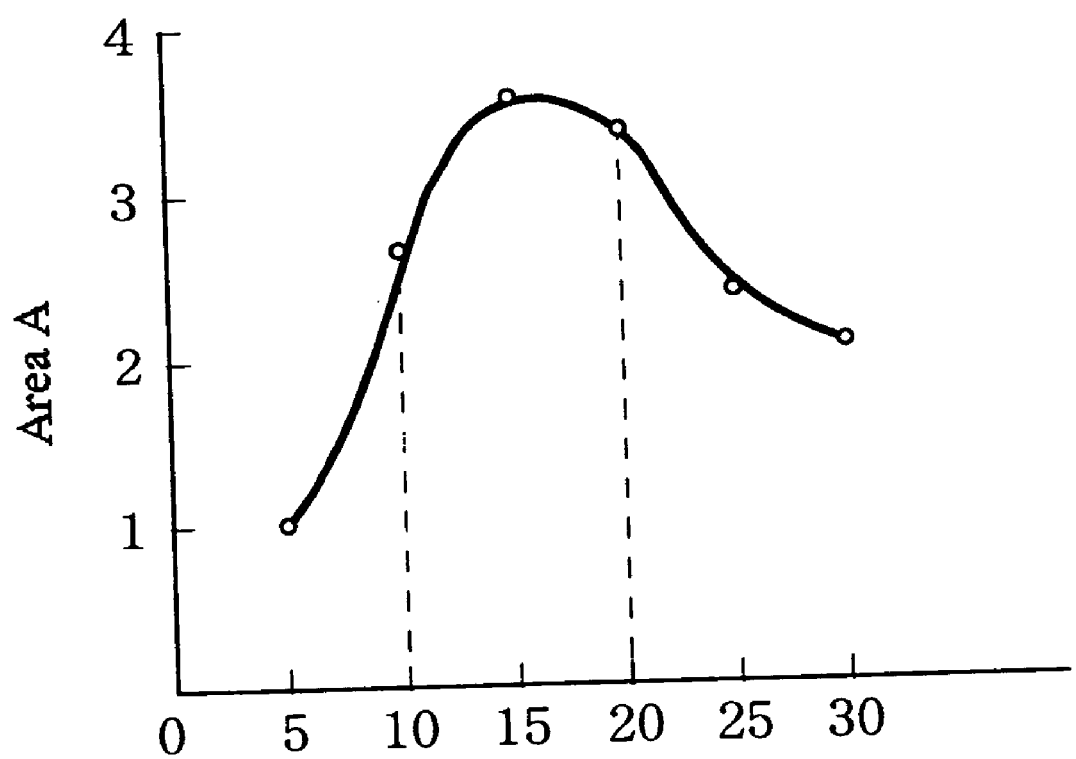
FIG. 25 is a graph showing the relationship between a contact angle of a protrusion and the integral value (area A) of the existence probability of the contact angle when tilt angles are in the range of 5 to 10 degrees.

Next, the contact angle of the protrusion was measured. The result is that the contact angle became smaller as the diameter of the protrusion became larger. In addition, the relationship between the contact angle and the area A was plotted to have a graph shown in FIG. 25. As clearly shown in the graph, it was found out that, when the contact angle of the protrusion was from 10 to 20 degrees, the area A became large, and reflective properties in the range of ±25 degrees from the normal direction became high. When the contact angle exceeded 20 degrees, the existence probability of the tilt angle at from 5 to 10 degrees, which are effective tilt angles, became low. These results show that the contact angle is an important determinant for the tilt angle distribution of the protrusion.

In the case of a transflective reflective plate, when an angle between the substrate and each of the protrusions was from 10 to 40 degrees, a reflective area was sufficiently adjusted, and reflective brightness was improved.

Figure 26:
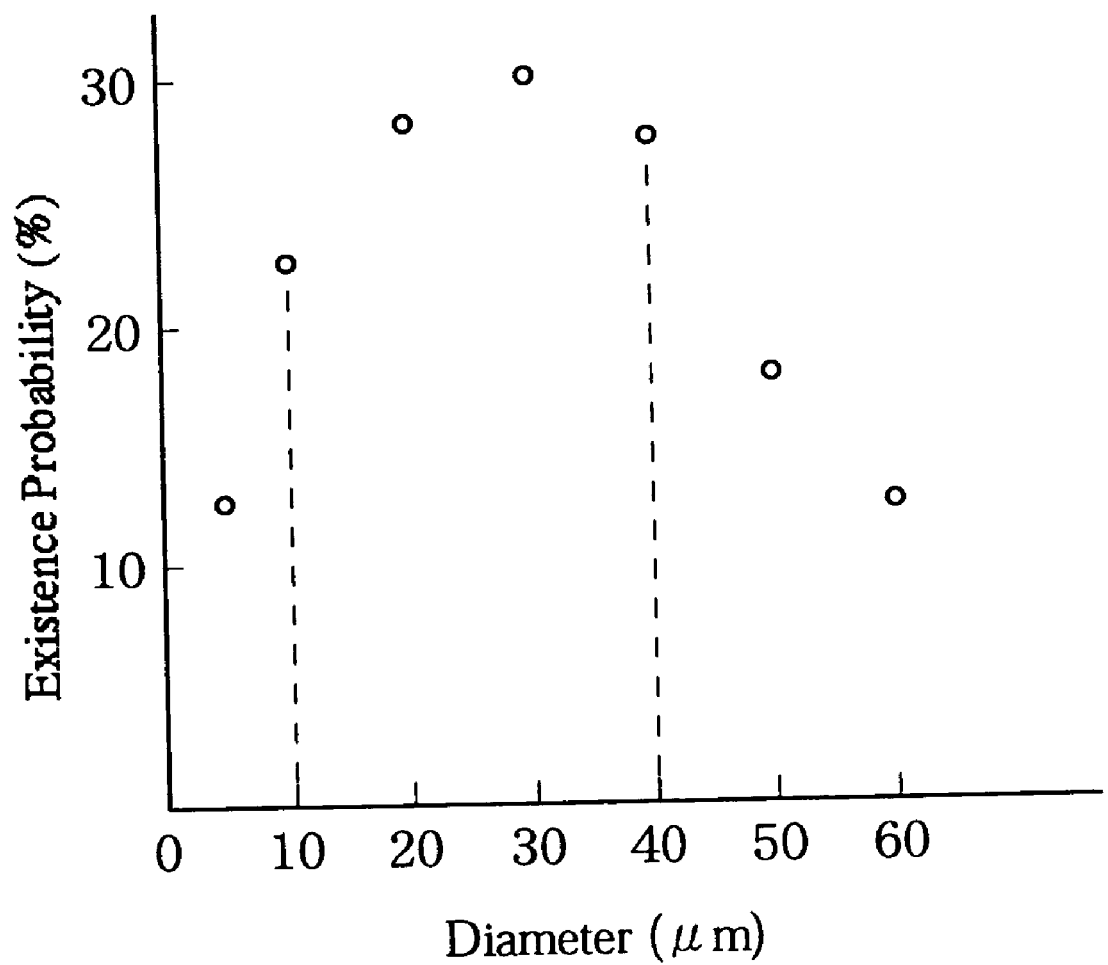
FIG. 26 is a graph showing the relationship between the maximum diameter (μm) of a protrusion and its existence probability when tilt angles are in the range of 5 to 10 degrees.

The contact angle can be controlled by the thickness of the resist layer, the maximum diameter of each of the protrusions, and heat properties of a resist material. FIG. 26 is a graph showing the relationship between the maximum diameter (µm) of each of the protrusions and the existence probability (%) of a tilt angle of from 5 to 10 degrees. As clearly shown in the figure, the existence probability became high when the maximum diameter of each of the protrusions was from 5 to 20 times larger than the thickness (2 µm) of the resist layer. When the maximum diameter was less than 5 times larger than the thickness of the resist layer, the contact angle exceeded 20 degrees, resulting in high diffusion properties. On the other hand, when the maximum diameter was more than 20 times larger than the thickness of the resist layer, the contact angle became 5 degrees or less and the protrusions became flat, resulting in high specularity.

Thus, it has been recognized that once the thickness of the resist layer is determined, it is only required to set the maximum diameter of each of the protrusions to be from 5 to 20 times larger than the thickness of the resist layer. In addition, when diffusion properties are emphasized, the magnification of the maximum diameter of each of the protrusions with respect to the thickness of the resist layer is lowered to the range of 5 to 10 times. When reflective brightness is emphasized, the magnification of the maximum diameter of each of the protrusions with respect to the thickness of the resist layer is made high within the range. Thus, any design is possible according to various performance conditions.

Embodiment 13

In the following, the present embodiment will be described.

Figure 27:
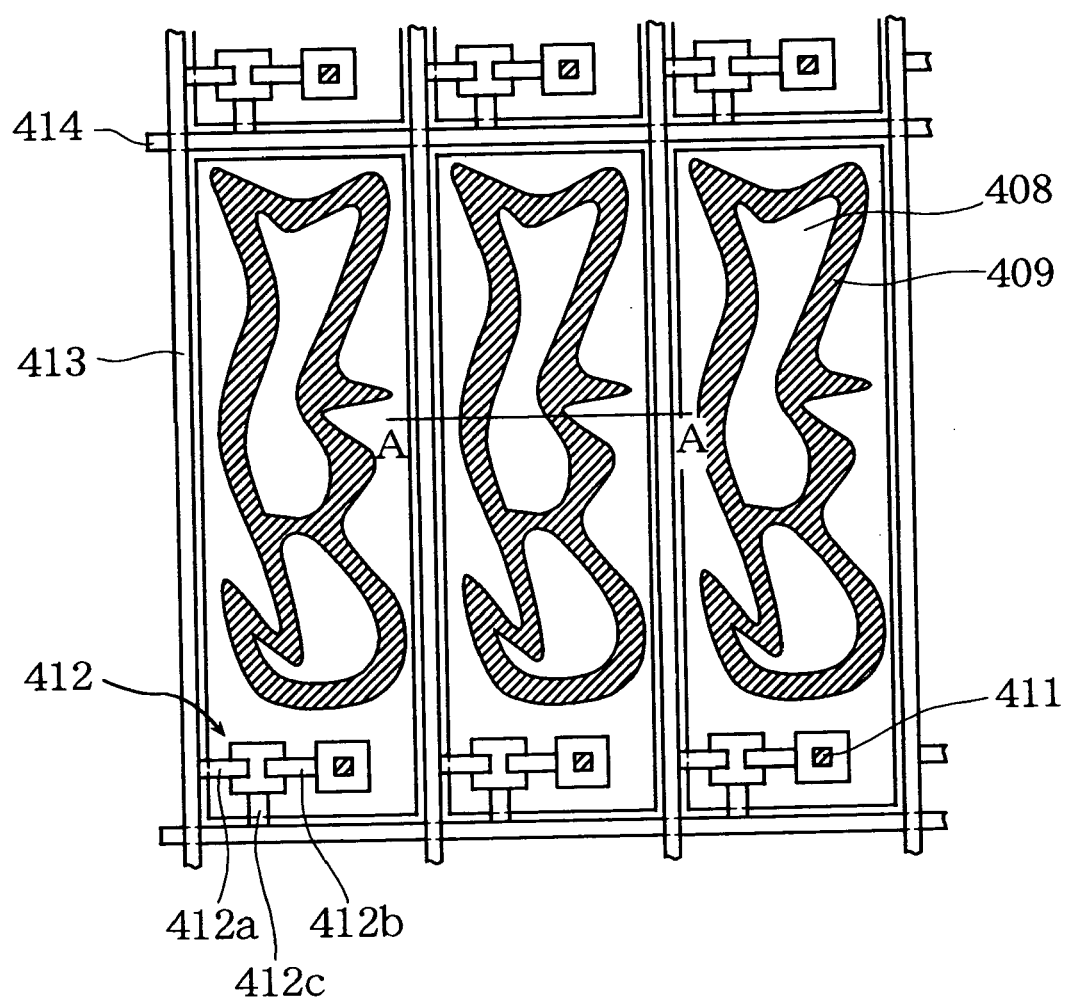
FIG. 27 is a plan view of a protrusion of a reflective type liquid crystal display device of Embodiment 12 of the present invention.
Figure 28:
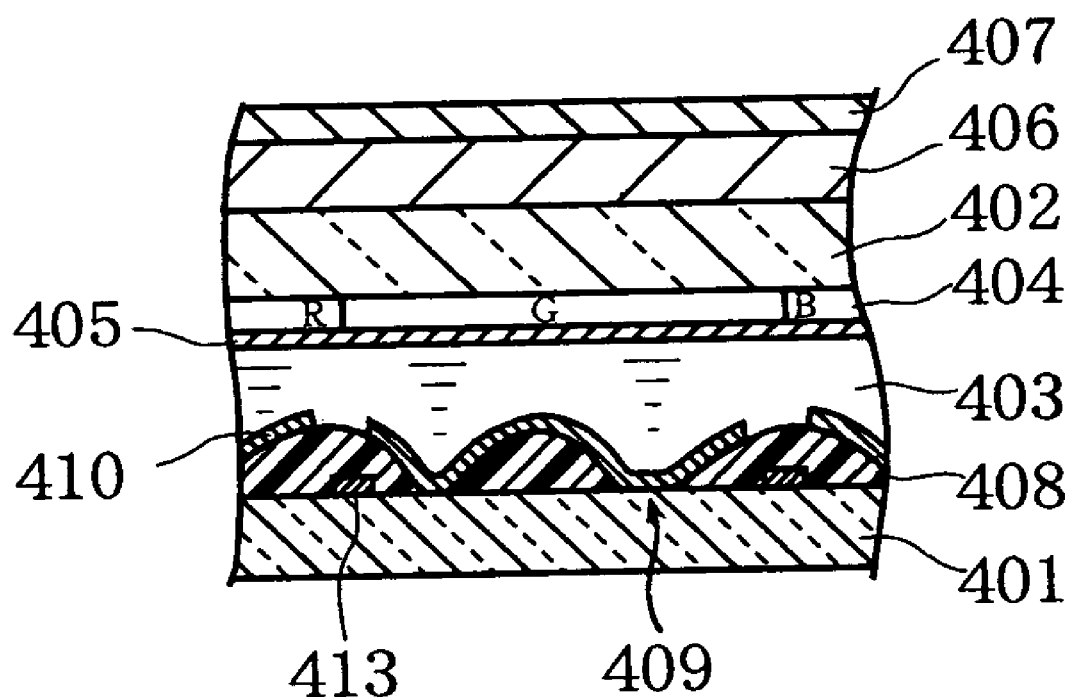
FIG. 28 is a cross sectional view of the reflective type liquid crystal display device take along the line A—A shown in FIG. 27.

FIG. 27 is a plan view showing protrusions of a reflective type liquid crystal display device of the present embodiment. Embodiment 13 employs a reflective type color liquid crystal display device using a system of single polarizing plate. FIG. 28 is a cross sectional view of the reflective type liquid crystal display device taken along the line A—A shown in FIG. 27.

As shown in FIGS. 27 and 28, the reflective type liquid crystal display device of the present embodiment is composed of a substrate 401 made of an insulative glass substrate, a counter substrate 402 to counter the substrate 401, and a liquid crystal layer 403 provided between the substrate 401 and the counter substrate 402. A cell gap between the substrate 401 and the counter substrate 402 has a predetermined spacing.

On the inside of the counter substrate 402, a color filter 404 is provided so that R (red)-G (green)-B (blue) respectively correspond to each pixel. On the inside of the color filter 404, a common electrode 405 made of a transparent conductive film is provided. On the outside of the counter substrate 402, an optical retardation plate 406 and a polarizing plate 407 are provided in this order.

On the substrate 401, a driving element 412, a plurality of source signal lines 413, a plurality of gate signal lines 414, and a plurality of protrusions 408 are provided.

The driving element 412 is connected to a source signal line 413 through a source terminal 412a. Also, the driving element 412 is connected to a gate signal line 414 through a gate terminal 412c.

The protrusions 408 are independent of one another, and between the protrusions 408, a part of the surface of the substrate 401 is exposed. Hereinafter, the exposed part of the surface of the substrate 401 is called a gap portion (bottom portion) 409. In addition, the protrusions 408 are made of a resin which is a photosensitive material. This resin has the property of melt flow. Melt flow is a property or a phenomenon in which a material is softened by heat, causing a change in shape such as a round surface of a film or the flow of the film on the substrate. This melt flow realizes the smooth curving of the surface of each of the protrusions 408 in a protrusion-depression manner. This enables it to reduce light that is reflected in the regularly reflected direction and inhibit the appearance of a light source on the display screen, realizing preferable reflective properties. It is to be noted that the protrusion-depression curving includes such a case where the surface of each of the protrusions 408 is only curved in a protrusion-like manner or a depression-like manner.

Above the substrate 401, a reflective film 410 is provided to cover the protrusions 408 and gap portions 409. This reflective film 410 is formed by depositing aluminum of 0.1 μm thick, which is a metal reflective film having high reflectivity. Other than Al, a reflective material may be Ag, Ni, or Ti, and also may be an alloy of Al/Ta and the like.

The reflective film 410 is independently provided for each pixel. In addition, the reflective film 410 is electrically connected to a drain terminal 412b of the driving element 412 through a contact hole 411, and acts as a pixel electrode. The contact hole 411 is provided in each of the protrusions 408. This configuration enables the driving element 412 on the substrate 401 to change a voltage applied between the reflective film 410 acting as a pixel electrode and the common electrode 405, and thus realizes display operation.

In FIG. 28, incident light from outside the polarizing plate 407 passes through the polarizing plate 407, the optical retardation plate 406, the counter substrate 402, the color filter 404, the common electrode 405, and the liquid crystal layer 403, and then is reflected by the reflective film 410 to pass in inverse order of them, so that the light finally reaches the viewer of the reflective type liquid crystal display device. During this while, a voltage applied on the liquid crystal layer 403 can be controlled by the driving element 412 to control light absorption and reflection.

Figure 29:
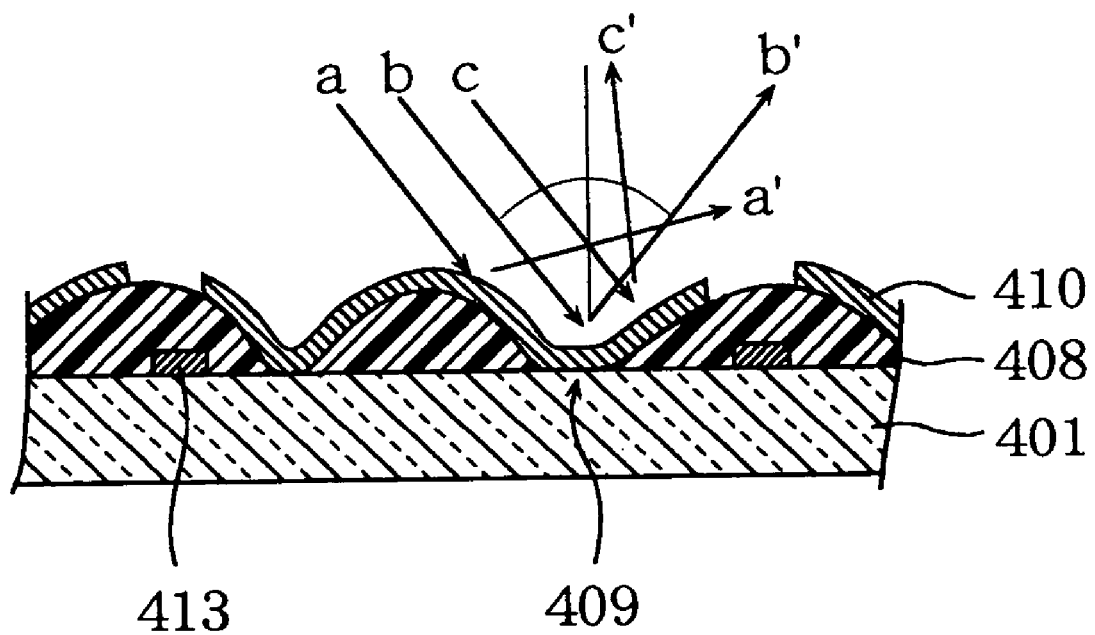
FIG. 29 is a cross sectional view schematically showing the way incident light comes into a reflective type liquid crystal display device and then is reflected.

In FIG. 29, how light is dispersed when seen in cross sectional view of the reflective type liquid crystal display device of the present invention is shown. FIG. 29 is a cross sectional view schematically showing the way incident light comes into the reflective type liquid crystal display device and then is reflected.

As shown in FIG. 29, when incident light a, b, and c come into the reflective type liquid crystal display device, the incident light a is widely back-dispersed to be a reflected light a'. The incident light b reaches the flat gap portion 409, and thus is regularly reflected to be a reflected light b'. The incident light c is forward-dispersed to be a reflected light c'. The incident light b which comes to the gap portion 409 in which the reflective film 410 is formed on the substrate 401 is regularly reflected at the surface of the substrate to be the reflected light b'. When the gap portion 409 is large in area, the proportion of regular reflection increases. Therefore, the area of the gap portion 409 preferably forms a small proportion of the substrate as a whole. The gap portion 409 is accordingly made small in area to secure reflective properties.

Figure 30:
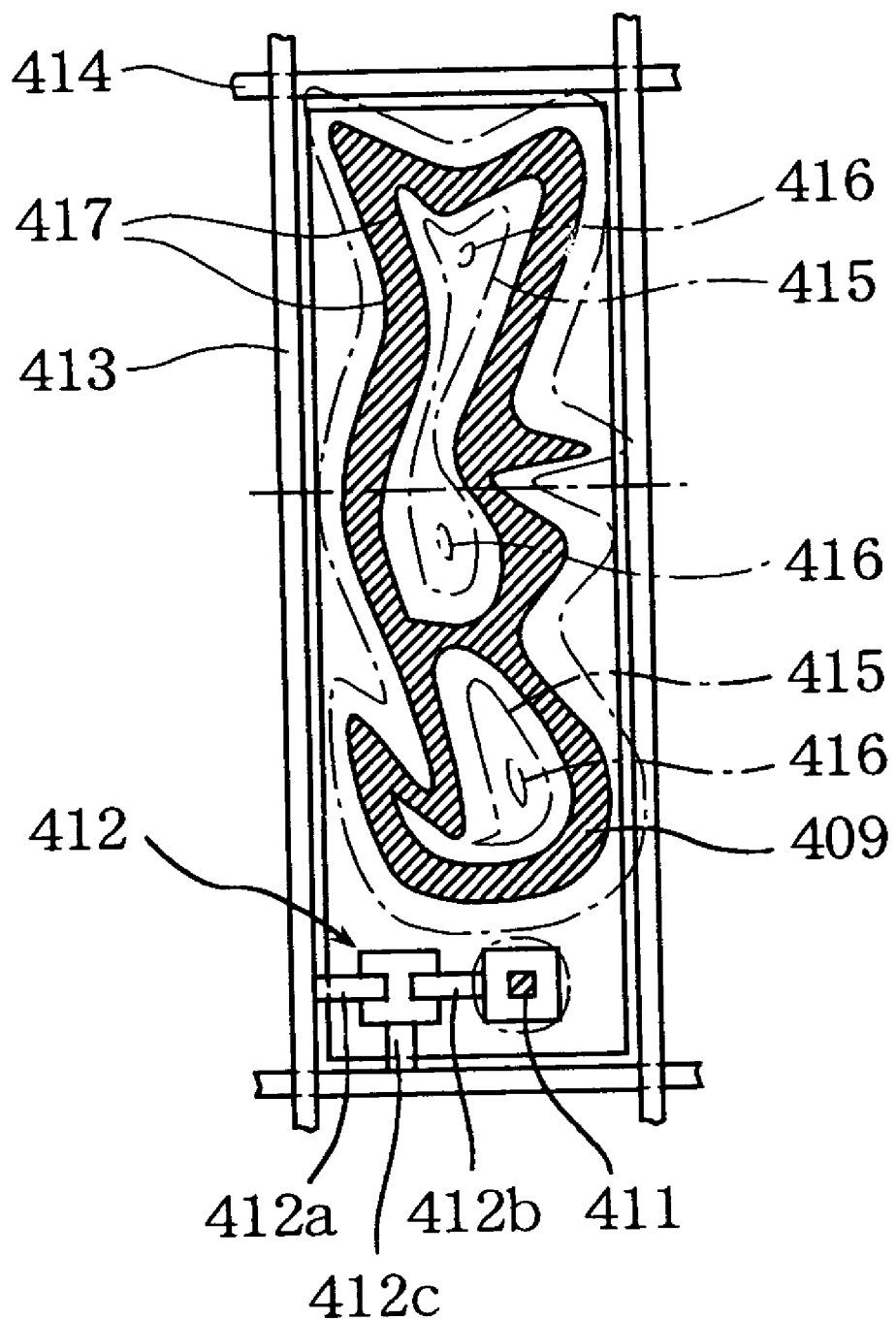
FIG. 30 is a plan view showing the height of a protrusion of Embodiment 13 from the surface of a substrate using contour lines.

FIG. 30 is a plan view showing the height of a protrusion 408 from the surface of the substrate 401 using contour lines 415 and 416. The contour line 416 is a higher position than the contour line 415. As shown in the figure, the contour lines of the protrusion 408 are about identical to the shape of a border line (frame line of the protrusion 408) 417 between the protrusion 408 and the gap portion 409 in which the protrusion 408 is not provided. The surface of the protrusion 408 that is arbitrarily and finely curved in a protrusion-depression manner is pointed in a direction perpendicular to the border line 417, that is to say, in a direction perpendicular to a tangent line of the border lines 417. The protrusion 408 has its surface deformed by a method such as melt flow. During this while, the surface is roundly deformed when seen in a cross sectional view along the border line 417 between the protrusion 408 and the gap portion 409, and therefore, the direction of the protrusion-depression curved surface depends on the border line 417.

Figure 31:
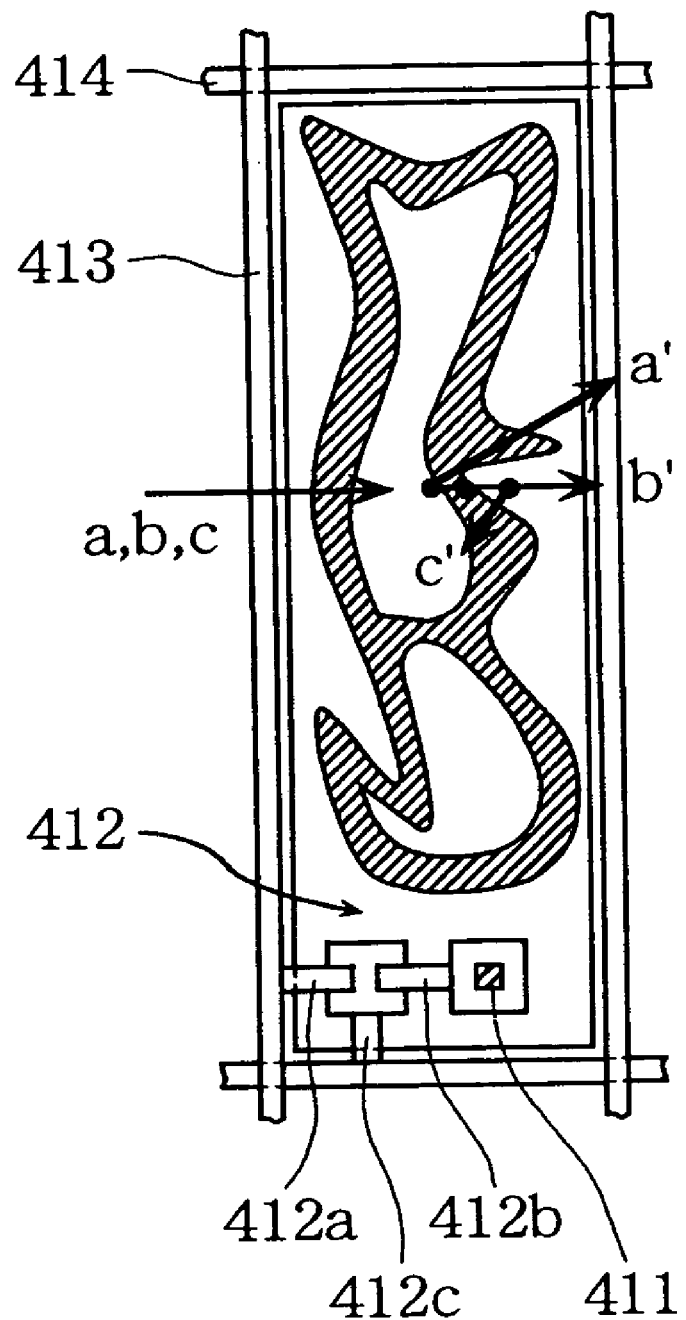
FIG. 31 is a plan view showing incident light a, b, and c incoming along the line A—A from the left (as viewed in FIG. 31), and showing the direction of movement of reflected light a', b', and c'.

FIG. 31 is a plan view showing the progress directions of reflected light when the incident light a, b, and c come from the left as viewed in the figure along the line A—A. A dotted symbol at the foot of each arrow stands for a position where each of the incident light reaches. As shown, the incident light is not reflected along the line A—A, but reflected and dispersed in directions a', b', and c'.

Figure 32:
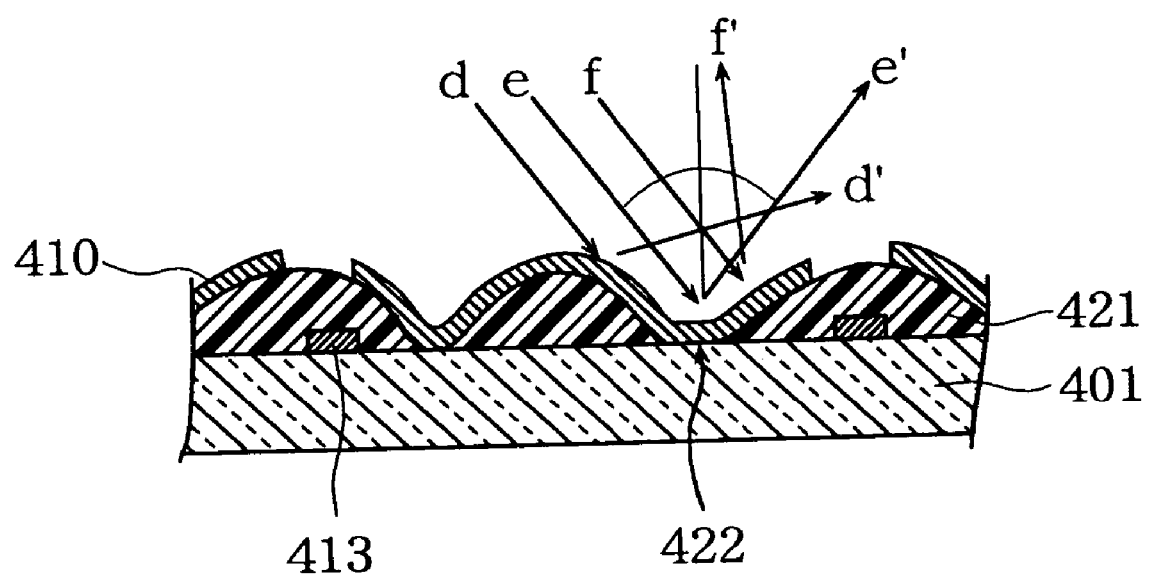
FIG. 32 is a schematic cross sectional view showing incident light d, e, and f and the direction of movement of reflected light d', e', and f'.
Figure 33:
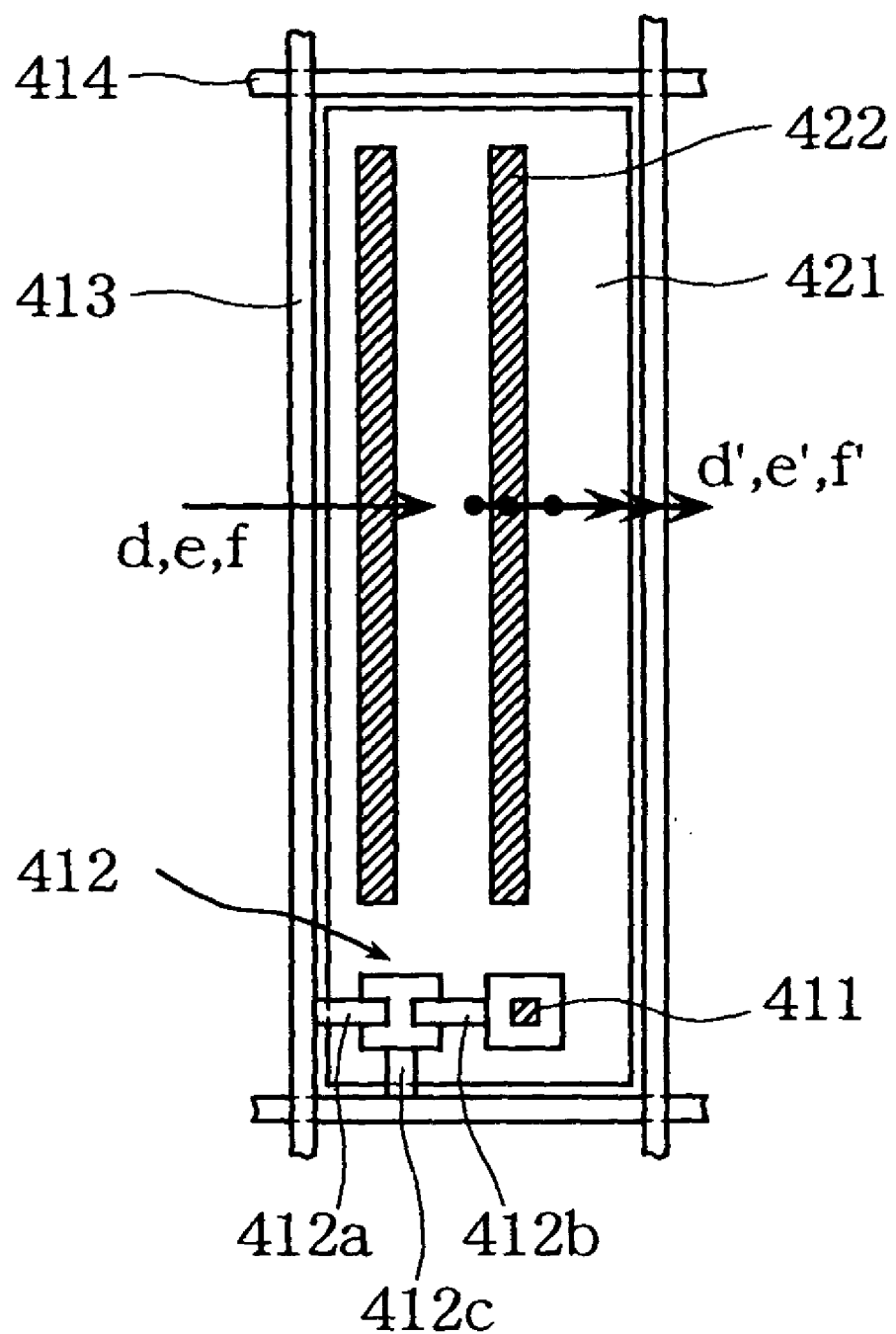
FIG. 33 is a plan view showing incident light d, e, and f incoming along the line B—B from the left (as viewed in FIG. 33), and showing the direction of movement of reflected light d', e', and f'.

On the other hand, reflective properties in the case where the gap portion has a straight-lined shape with a predetermined width are as follows. FIG. 32 is a schematic cross sectional view showing the progress directions of reflected light when incident light d, e, and f come in. FIG. 33 is a plan view showing the progress directions of reflected light when incident light d, e, and f come from the left as viewed in the figure along the line B—B.

As shown in FIG. 32, protrusions 421 are provided in a straight-lined shape in Y direction, and the gap portion 422 formed between the protrusions 421 is also provided in a straight-lined shape with a predetermined width. When the incident light d, e, and f reach the surface of the reflective film 410, they are respectively back-dispersed, regularly reflected, and forward-dispersed to be incident light d', e', and f', respectively. This makes it seem as if dispersion properties are preferable even with a reflective plate which has a straight-lined gap portion with a predetermined width. However, as shown in FIG. 33, when the reflective film 410 is seen in a plan view, the incident light d', e', and f' are reflected only in a direction parallel to the same plane. This is because the tilted surface of each of the protrusions 421 is square to the progress directions of the incident light d, e, and f when seen in a plan view. Therefore, when the protrusions 421 are provided in a straight-lined shape in Y direction, light diffusion properties are not sufficiently secured.

Thus, the direction at which the protrusion-depression curved surface of each of the protrusions is pointed with respect to the progress direction of incident light is an important factor for securing preferable reflective properties. The direction of the protrusion-depression curved surface of each of the protrusions depends on the border line between each of the protrusions and the gap portion, that is to say, the frame line of each of the protrusions. Therefore, preventing each part of the frame line from pointing in a constant direction to the best possible degree is conducive to an improvement in dispersion properties. In view of this, in the present embodiment, the protrusion 408 is formed such that the shape of the border line between the protrusion 408 and the gap portion 409 comprises a bay-like shape or a peninsula-like shape in order to realize preferable reflective properties.

Figure 34:
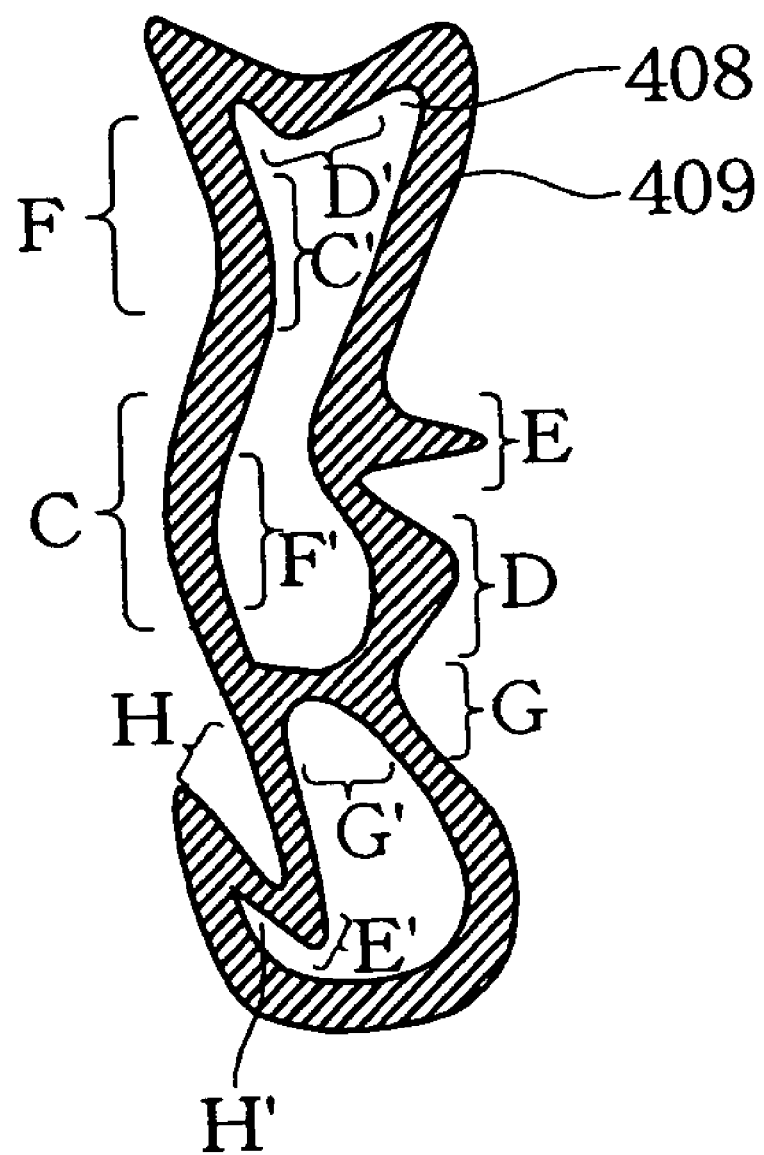
FIG. 34 is an enlarged plan view showing the protrusion and a gap portion.

A further description on the protrusion 408 and the gap portion 409 is as follows. FIG. 34 is a plan view showing the protrusion 408 and the gap portion 409.

A bay-like curved line stands for a depressed part of the protrusion 408 on a plane. Specifically, as shown in FIG. 34, the bay-like curved line may be such that the protrusion is smoothly depressed along an arc as shown as symbols C and C', the gap portion is widely depressed inward as shown as symbols D and D', or the gap portion is sharply depressed inward as shown as symbols E and E'.

A peninsula-like curved line stands for a protruding part of the protrusion on the surface of the substrate. Specifically, as shown in FIG. 34, the peninsula-like curved line may be such that the protrusion smoothly protrudes along an arc as shown as symbols F and F', the protrusion widely protrudes as shown as symbols G and G', or the protrusion sharply protrudes as shown as symbols H and H'. Thus, when the shape of the frame line of the protrusion 408 comprises such a bay-like curved surface or a peninsula-like curved surface, the protrusion-depression curved surface of the protrusion 408 points in various directions, enabling an improvement in dispersion properties. In addition, a combination of a bay-like shape and a peninsula-like shape realizes a reflective type liquid crystal display device having preferable reflective properties.

Figure 35:
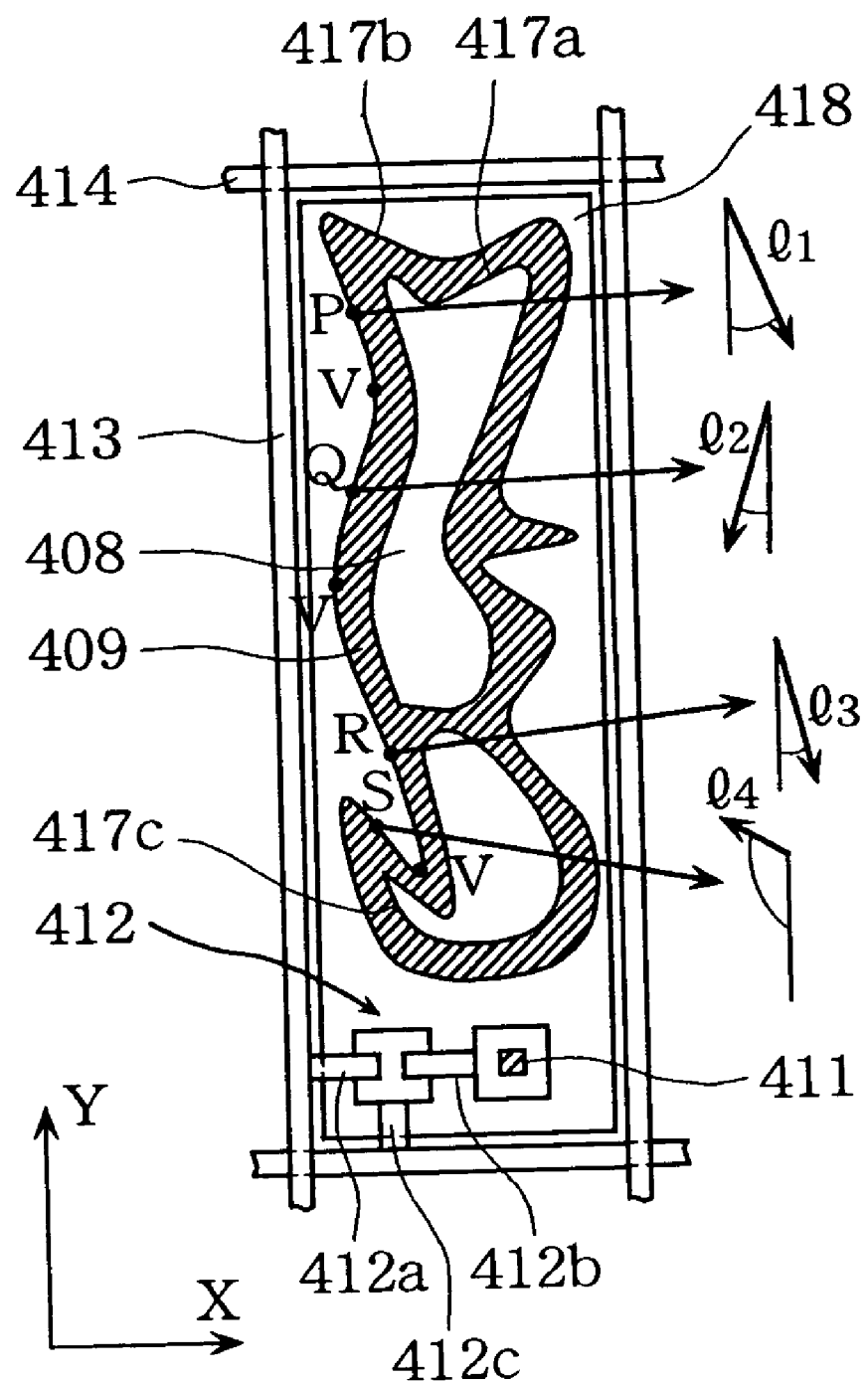
FIG. 35 is a plan view of the protrusion of Embodiment 13.

The planar shape of the protrusion 408 also can be specified as follows. As shown in FIG. 35, on the frame line 417 of the protrusion 408, tangent lines $l_1$, $l_2$, $l_3$, and $l_4$ of respective arbitrary contact points P, Q, R, and S are provided. When each of these tangent lines $l_1$–$l_4$ is represented by an angle in which Y direction (a longitudinal direction of the pixel) is taken to be 0 degrees, the angle changes from increase to decrease or from decrease to increase at least three times or more when the frame line 417 is circled. When the protrusion 408 has such a planar shape, preferable reflective properties are secured.

In addition, the frame line has a bending point T in which the angle with respect to Y direction changes from a plus sign to a minus sign, a bending point U in which the angle changes from a minus sign to a plus sign, and a bending point V in which the angle changes from a plus sign to a minus sign.

When the frame line 417 has three or more of such bending points in which the angle with respect to Y direction changes from increase to decrease or from decrease to increase, the protrusion 408 that has a planar shape in which a bay-like shape and a peninsula-like shape are combined is formed.

The bay-like shape or the peninsula-like shape comprises a curved line or a straight line that is angled with respect to a direction parallel or perpendicular to a longitudinal side of the pixel. This enables it to diffuse reflected light in various directions instead of constant directions, and to secure preferable reflective properties.

At least one of frame lines between the protrusion and a part of the surface of the substrate on which the protrusion is not provided may form an indefinite two-dimensional closed region having a curved line or a straight line. In FIG. 35, three curved frame lines 417a, 417b, and 417c form indefinite two-dimensional closed regions. This configuration enables it to diffuse reflected light in various directions instead of constant directions and to secure preferable reflective properties.

As shown in FIG. 35, a driving element 412 provided in each pixel, and a source signal line 413 and a gate signal line 414 both electrically connected to the driving element 412 are provided. In a configuration having the protrusion 408, the protrusion 408 is preferably provided continuously on each of the signal lines in order to enhance insulation properties between a reflective film 418 on the protrusion 408 and the source signal line 413 and the gate signal line 414. In this case, if the frame line 417c which is a border between the protrusion 408 and the gap portion 409 is pointed in a direction parallel or perpendicular to the source signal line 413 and the gate signal line 414, the surface of the protrusion 408 is pointed in constant directions. This makes it impossible to secure preferable reflective properties. In view of this, the shape of the frame line 417c comprises a curved line or a straight line that is angled with respect to the source signal line 413 and the gate signal line 414. This enables it to secure preferable reflective properties.

Figure 36:
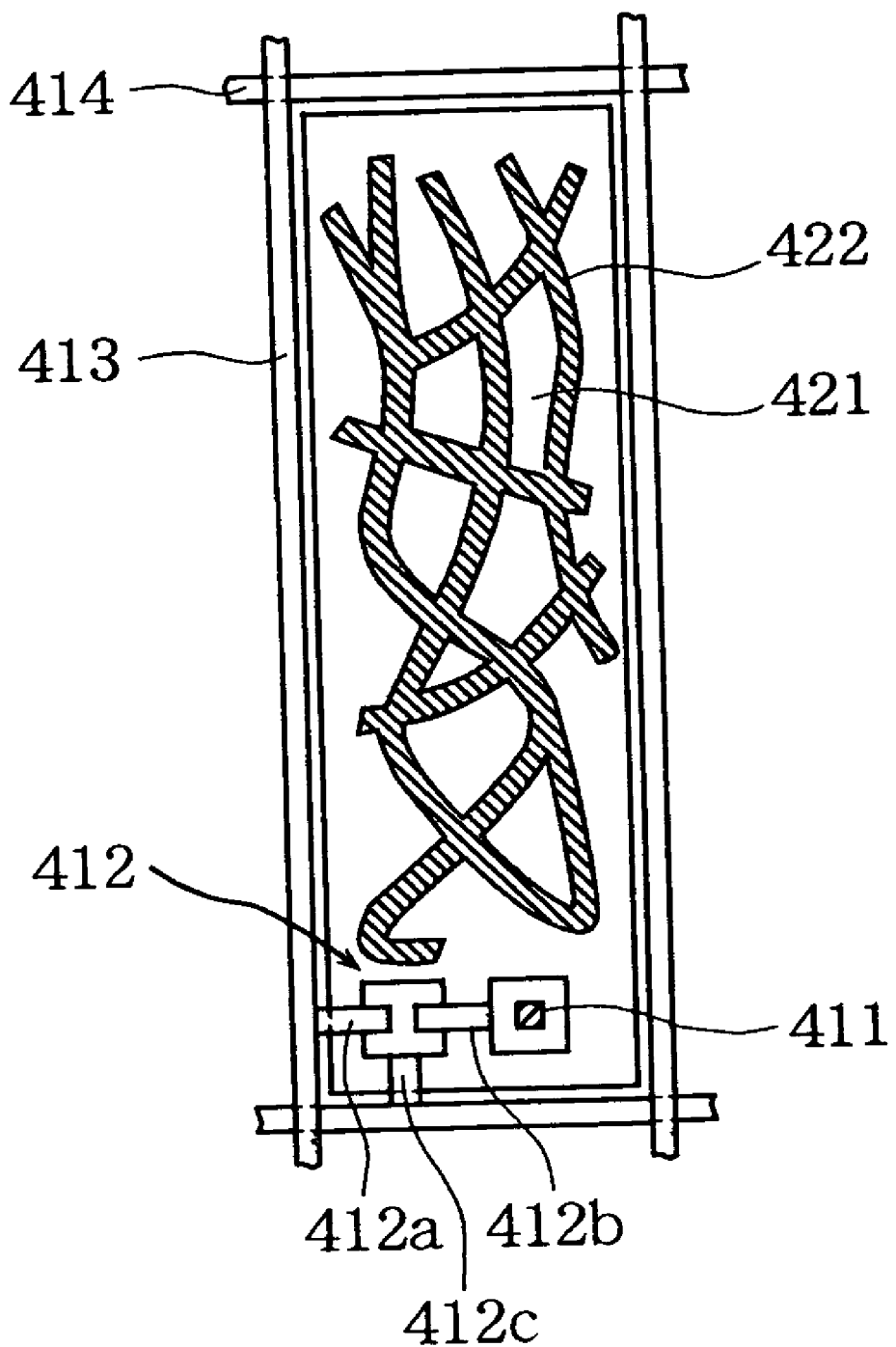
FIG. 36 is a plan view of other protrusions of Embodiment 13.

In addition, at least a part of the gap portion 409 formed between the protrusion 408 and the protrusion 408 may have a mesh-like shape or an indefinite shape (an amebic shape). As shown in FIG. 36, a mesh-like shape is such that a plurality of indefinitely shaped protrusions 421 are provided on a substrate, and gap portions 422 formed between the protrusions 421 are provided in a mesh-like pattern with a predetermined width. With such protrusions 421, border lines between the protrusions 421 and the gap portions 422 are pointed in various directions, making it possible to realize preferable reflective properties.

Figure 37:
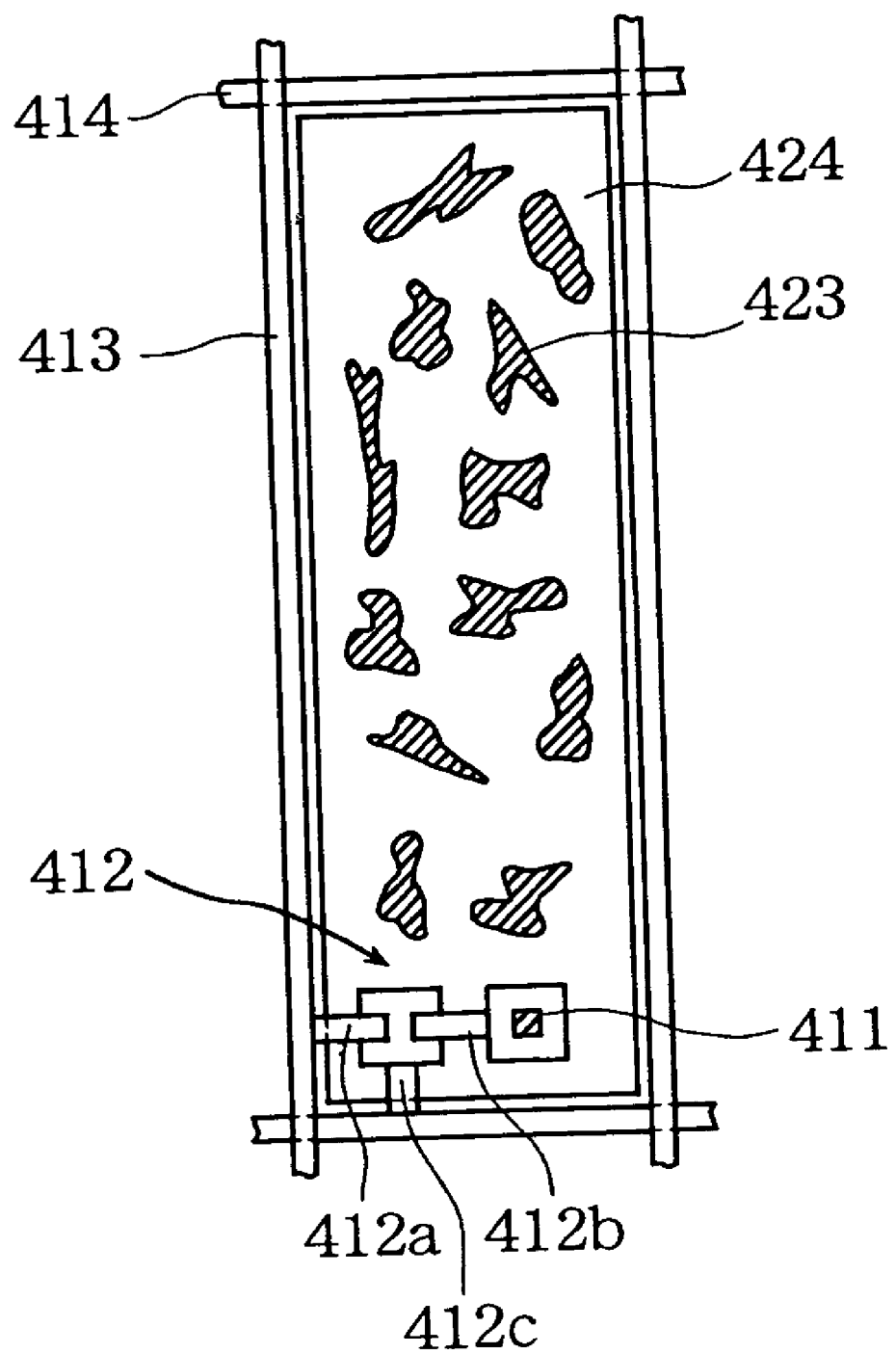
FIG. 37 is a plan view of still other protrusions of Embodiment 13.

As shown in FIG. 37, being an amebic shaped is a state in which a certain parts of each of gap portions 423 extend like the movements of an ameba. Even when the gap portions 423 are amebic shaped, the same reflective properties are obtained.

A method of fabricating a reflective type liquid crystal display device of the present embodiment will be now described based on a drawing. FIGS. 38A-38F are cross sectional views taken along the line A—A in FIG. 27 in order to illustrate the method of fabricating the reflective plate of the present embodiment.

Figure 38A:
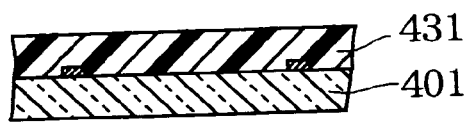
FIGS. 38A–38F are cross sectional views showing the process of fabricating a reflective plate of Embodiment 13.
Figure 38B:
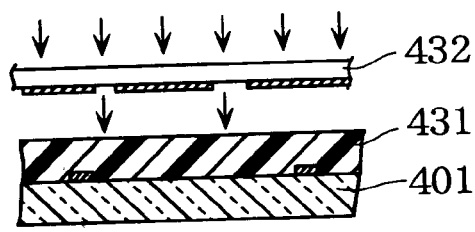

As shown in FIG. 38A, an acrylic p-type photosensitive material was spin-coated on a substrate 401 and pre-baked to form a resist layer 431. The thickness of the resist layer 431 was made 2 μm. Next, as shown in FIG. 38B, the resist layer 431 was light-exposed through a photo-mask 432. The mask that was used as the photo-mask 432 had a predetermined pattern such that only regions having the shapes of the gap portions 409 and the contact hole 411 were light-exposed.

Figure 38C:
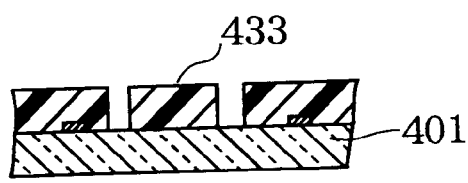

Subsequently, using a developer which is a photosensitive material, the light-exposed resist layer 431 was developed, and patterning was conducted to remove portions of the resist layer 431 corresponding to the gap portions 409 and the contact hole 411 as shown in FIG. 38C. By this patterning, regions of the resist layer corresponding to the gap portions 409 were removed according to the patterned shape of the light transmitting portion on the photo-mask 432. As a result, resist columns 433 remained on portions on which the protrusions 408 were provided.

Figure 38D:
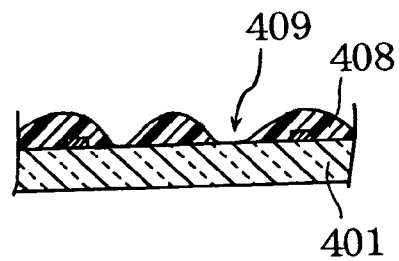

Next, the substrate 401 was heated on a hot plate of 140° C. for 5 minutes to heat-deform the resist columns 433. As a result, the protrusions 408 each having a curved surface and the gap portions 409 were formed as shown in FIG. 38D. To harden the protrusions 408, the substrate 401 was further heated for one hour in an oven of 200° C. at which photosensitive materials are hardened.

Figure 38E:
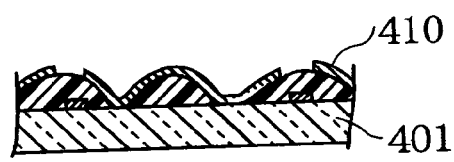
Figure 38F:
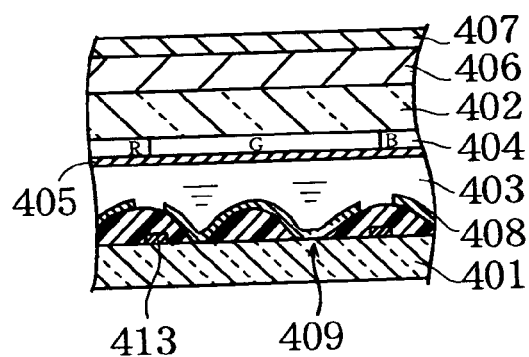

Subsequently, as shown in FIG. 38E, an aluminum film of 0.2 μm thick was deposited and formed on the protrusions 408, and then patterned to be the shape of the pixel to form a reflective film 410. The reflective film 410 was formed along the protrusion-depression curved surface of each of the protrusions 408. Thus, the reflective plate having dispersion properties was formed.

In the formation of the reflective film 410, a reflective film 410 for each pixel and the drain terminal 412b of a driving element 412 were electrically interconnected at a contact hole 411 in each pixel. In the step of photolithography and etching, when the reflective film 410 is patterned to be the shape of the pixel, the driving element 412 can control the potential of the reflective film 410 above each pixel. As a result, it was made possible for the reflective film 410 to also act as a pixel electrode. Further over the substrate having thereon the reflective film 410, an alignment film was formed.

On a counter substrate 402, a color filter 404 was provided so that each color of red (R), green (G), and blue (B) correspond to each pixel. On the color filter 404, a common electrode (transparent electrode) 405 made of ITO (indium tin oxide) was formed. On the common electrode 405, an alignment film was formed.

Next, the substrate 401 and the counter substrate 402 were adhered to each other with a predetermined gap (about 4 μm) so that each of the alignment films faced each other. Between the gap, a liquid crystal material was enclosed to form a liquid crystal layer 403.

Further, on the outside of the counter substrate 402, an optical retardation plate 406 and a polarizing plate 407 were adhered in this order. Thus, the reflective type liquid crystal display device was completed.

As a display portion, this reflective type liquid crystal display device can compose display devices for computers, mobile information terminals, mobile phones, and the like.

In addition, in the present embodiment, although heating was employed to control the shape of a material that forms the protrusions, other methods may be employed to control the shape of the protrusion-depression curved surface of each of the protrusions. For example, when such a resin is used that a crosslinking between molecules can be severed by light exposure, a film is softened and flows on the substrate. This phenomenon similar to that obtained by melt flow can also be obtained by light exposure, making it possible to control the shape of the protrusions.

Embodiment 14

Figure 39:
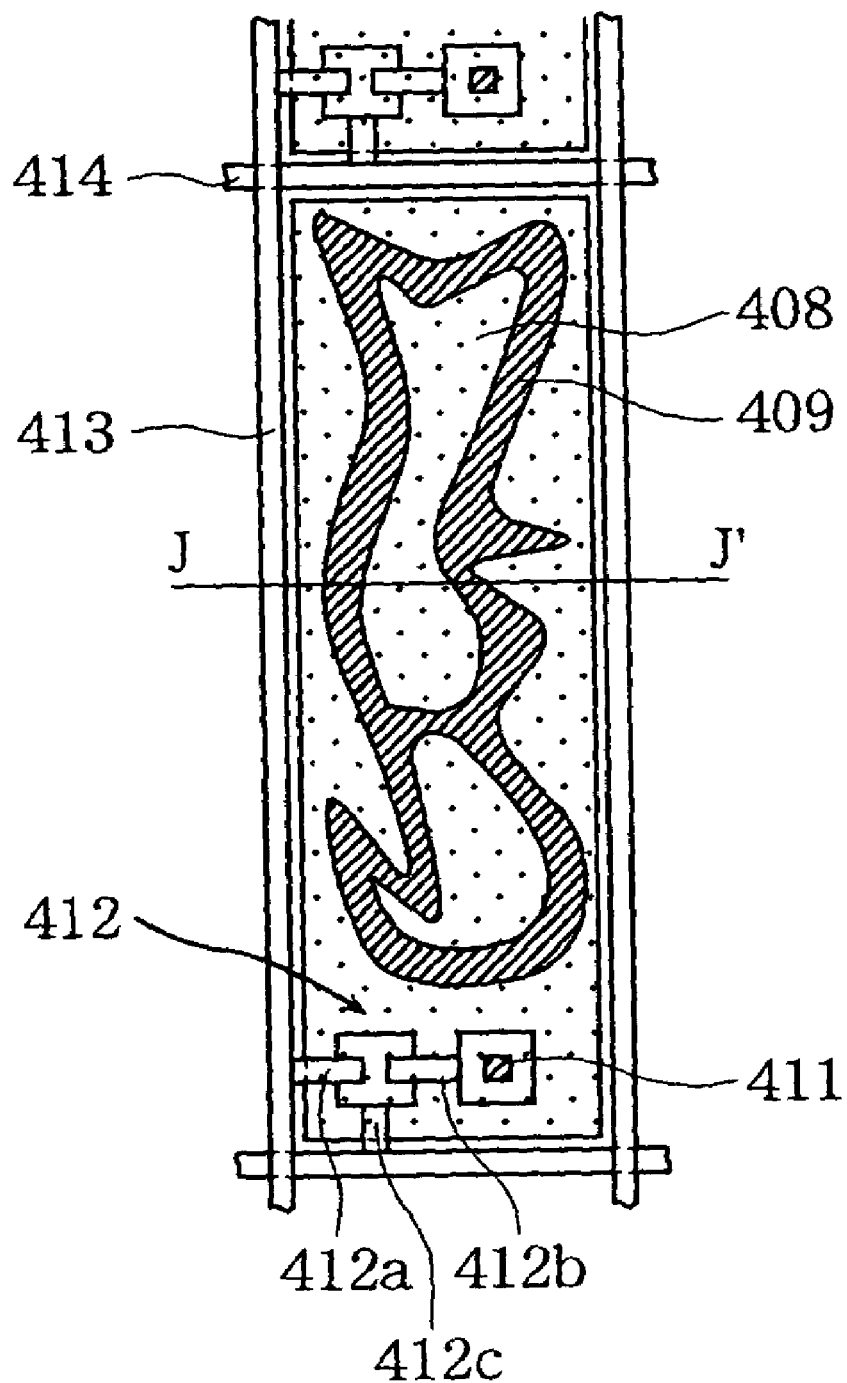
FIG. 39 is a cross sectional view of a pixel region of a transflective type liquid crystal display device of Embodiment 14.
Figure 40:
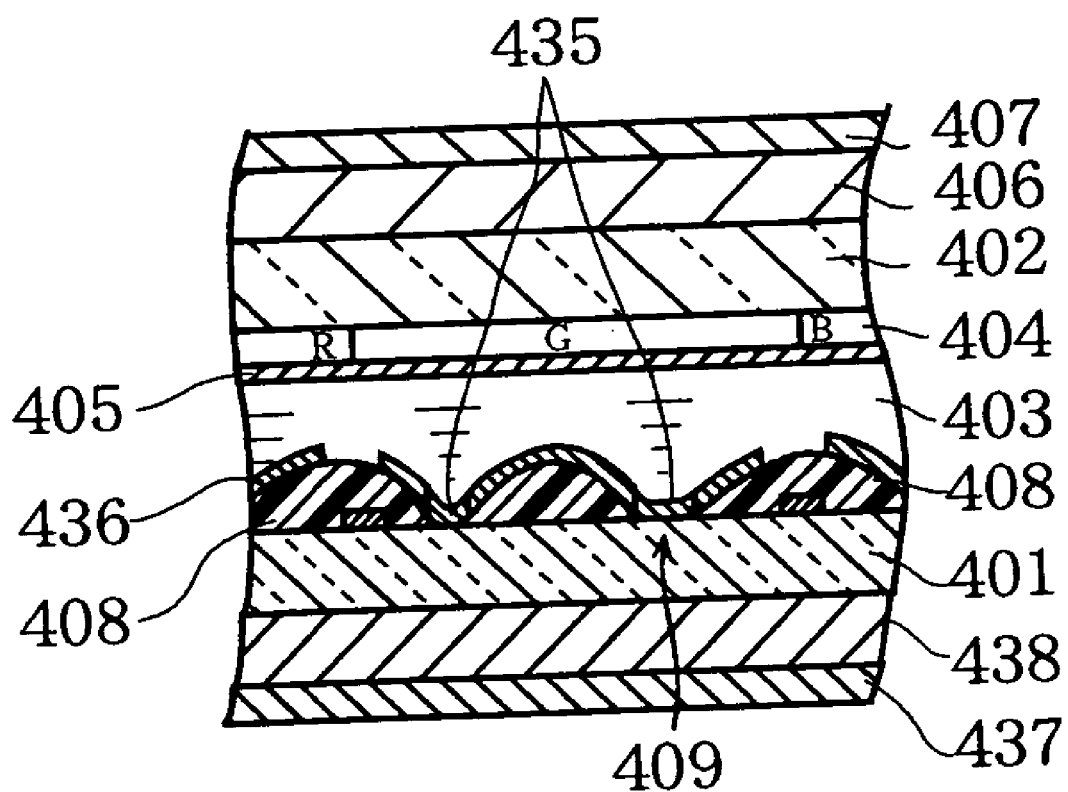
FIG. 40 is a cross sectional view taken along the line J–J' shown in FIG. 39.

The present embodiment will be described with reference to drawings. FIG. 39 is a plan view of a pixel region of a transflective type liquid crystal display device of the present embodiment. FIG. 40 is a cross sectional view of the transflective type liquid crystal display device taken along the line J–J' shown in FIG. 39.

The transflective type liquid crystal display device of the present embodiment is not a transflective type liquid crystal that uses a transflective film, but employs a system in which a part of the pixel region has a reflective film for reflection display and the rest part of the pixel region performs light-transmission display. In the present embodiment, the pixel region is a region that contributes to displaying as a pixel, and a region that does not contribute to display operation in a pixel pitch is not considered as the pixel region. Therefore, the pixel region is composed of a reflective region and a transmitting region, both contributing to display operation.

The transflective type liquid crystal display device of the present embodiment and the reflective type liquid crystal display device of Embodiment 13 have a lot in common. Therefore, only their difference will be described. In the transflective type liquid crystal display device of the present embodiment, the substrate 401 and the protrusions 408 are the same as in Embodiment 1. A reflective film 436 is different from that in Embodiment 13 in that the reflective film 436 is not provided on the gap portion 409 on which a protrusion 408 among the protrusions 408 is not provided. On the gap portion 409, a transparent electrode 432 made of ITO is formed. The transparent electrode 432 may be made of a transparent conductive film other than ITO. The transparent electrode 432 is also provided on the reflective film 436 so that the transparent electrode 432 and the reflective film 436 have the same potential. Thus, the reflective film 436 is provided only on the protrusions 408 to make them reflective portions, and the gap portion 409 on which the protrusion 408 is not provided acts as a light transmitting portion. This enables the effective use of the flat gap portion 409 which does not diffuse reflected light as a light transmitting portion. As a result, preferable reflective properties and light-transmission properties are realized.

Display is operated by reflection in the same manner as the reflective type liquid crystal display device. As shown in FIG. 40, for display operation at the light transmitting portion, an optical retardation plate 406 and a polarizing plate 407 are provided on the outside of the substrate 401. At the time of light-transmission display, incident light from outside a polarizing plate 437 passes through an optical retardation plate 438, the substrate 401, the transparent electrode 432, a liquid crystal layer 403, a common electrode 405, a color filter 404, a counter substrate 402, the optical retardation plate 406, and the polarizing plate 407, and finally reaches the viewer of the transflective type liquid crystal display device. During this while, by controlling a voltage between the transparent electrode 435 and the common electrode 405, liquid crystal is controlled and thus display is operated. Note that a back light is omitted in the transflective type liquid crystal display device shown in FIG. 40.

In the transflective type liquid crystal display device of the present embodiment, the reflective film 436 is provided on the protrusions 408. The protrusions 408 and those in Embodiment 13 have the same features to obtain preferable reflective properties.

Specifically, to secure preferable reflective properties, the gap portion 409 or a border line (frame line 417) between one of the protrusions 408 and the gap portion 409 on which the protrusion 408 is not provided have the following configurations. 1) The shape of the border line comprises a bay-like shape or a peninsula-like shape. 2) The border line forms at least one closed curved-line, and when a tangent line drawn along the curved line on the substrate is represented by an angle in which a longitudinal direction of the pixel is taken to be 0 degrees, the angle changes from increase to decrease or from decrease to increase at least three times when the curved line is circled. 3) At least one border line forms indefinite two-dimensional closed regions having a curved line or a straight line. 4) The shape of the border line comprises a curved line or a straight line that is angled with respect to a direction parallel or perpendicular to a longitudinal side of a pixel. 5) The shape of the border line comprises a curved line or a straight line, both angled with respect to the signal lines. In addition, a part of the pixel in which the protrusion is not provided may be mesh-like shaped or indefinitely shaped (ameba-like shaped).

Embodiment 15

Figure 41:
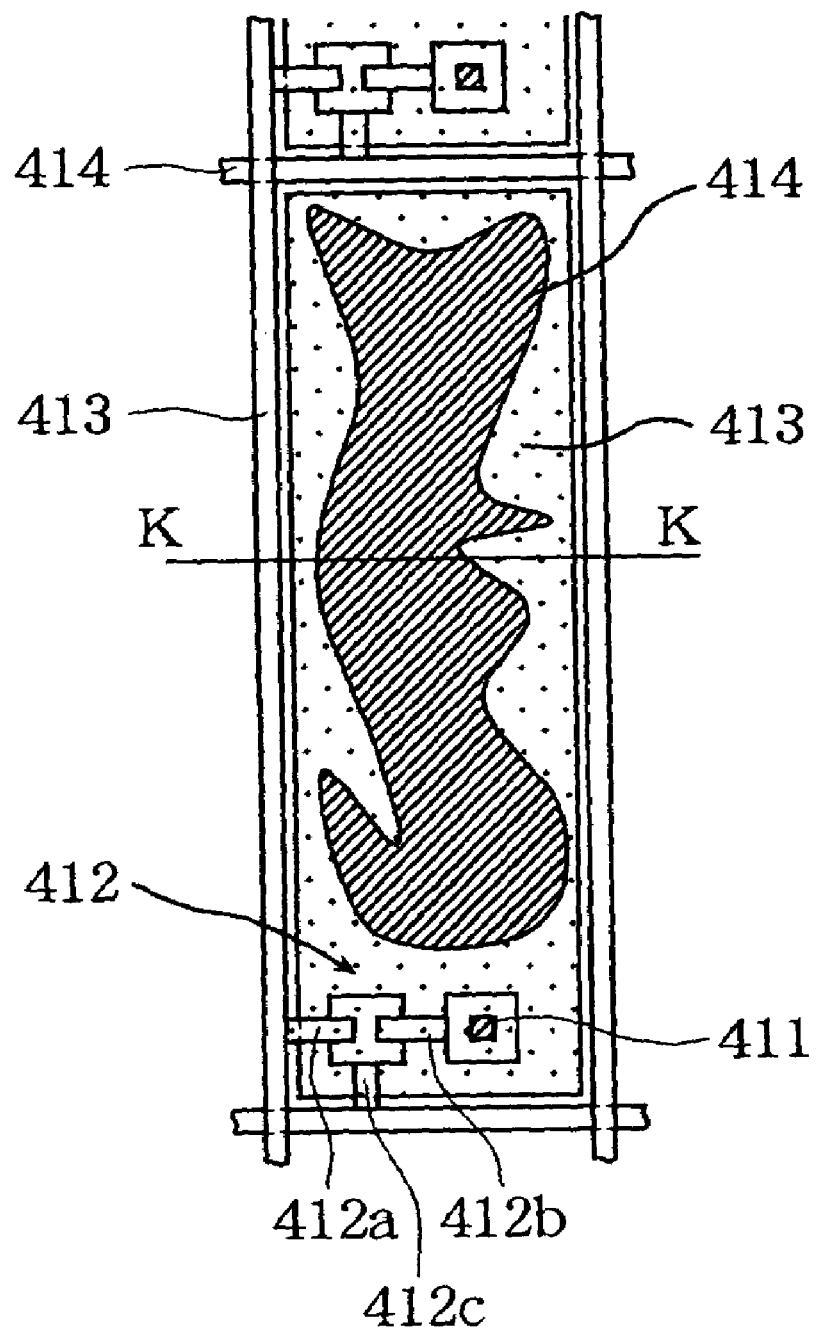
FIG. 41 is a plan view of a protrusion of Embodiment 15 of the present invention.
Figure 42:
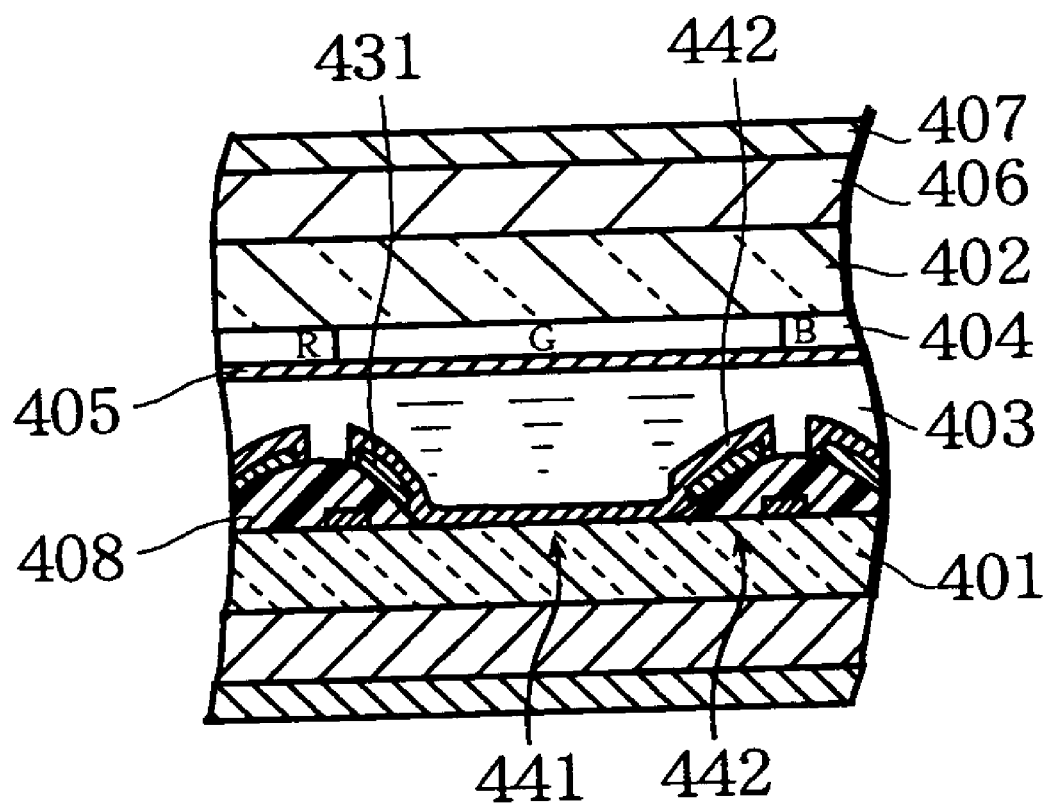
FIG. 42 is a cross sectional view taken along the line K–K' shown in FIG. 41.

In a transflective type liquid crystal display device of the present embodiment, a reflective portion and a light transmitting portion have respective regions in a pixel. By adjusting the area of the reflective film, each area of the reflective portion and the light transmitting portion is changed. This enables a design in which either transmissivity or reflectivity is emphasized. In FIG. 41, the transflective type liquid crystal display device of the present embodiment is shown that has higher transmissivity than that in Embodiment 14. FIG. 41 is a plan view of a pixel. FIG. 42 is a cross sectional view taken along the line K—K shown in FIG. 41.

As shown in FIG. 41, around the center of a pixel region, a light transmitting portion 442 to transmit light from a back light is provided. This light transmitting portion 442 corresponds to a part of the pixel region in Embodiment 14 in which the protrusion around the center of the pixel region and the reflective film on the protrusion are removed (see FIGS. 39 and 40). That is to say, the light transmitting portion 442 is a region formed such that the protrusion around the center of the pixel region is removed to have a large light transmission region.

In the periphery of the light transmitting portion 442, a protrusion the surface of which has a reflective film is provided. The region in which the protrusion is provided acts as a reflective portion 441.

It is to be noted that the present embodiment has the same features as those of Embodiment 14 to have preferable reflective properties. For example, a border between a reflective portion 441 and a light transmitting portion 442 is bay-like shaped or peninsula-like shaped. Therefore, preferable reflective properties are obtained in the present embodiment.

Embodiment 16

Figure 43:
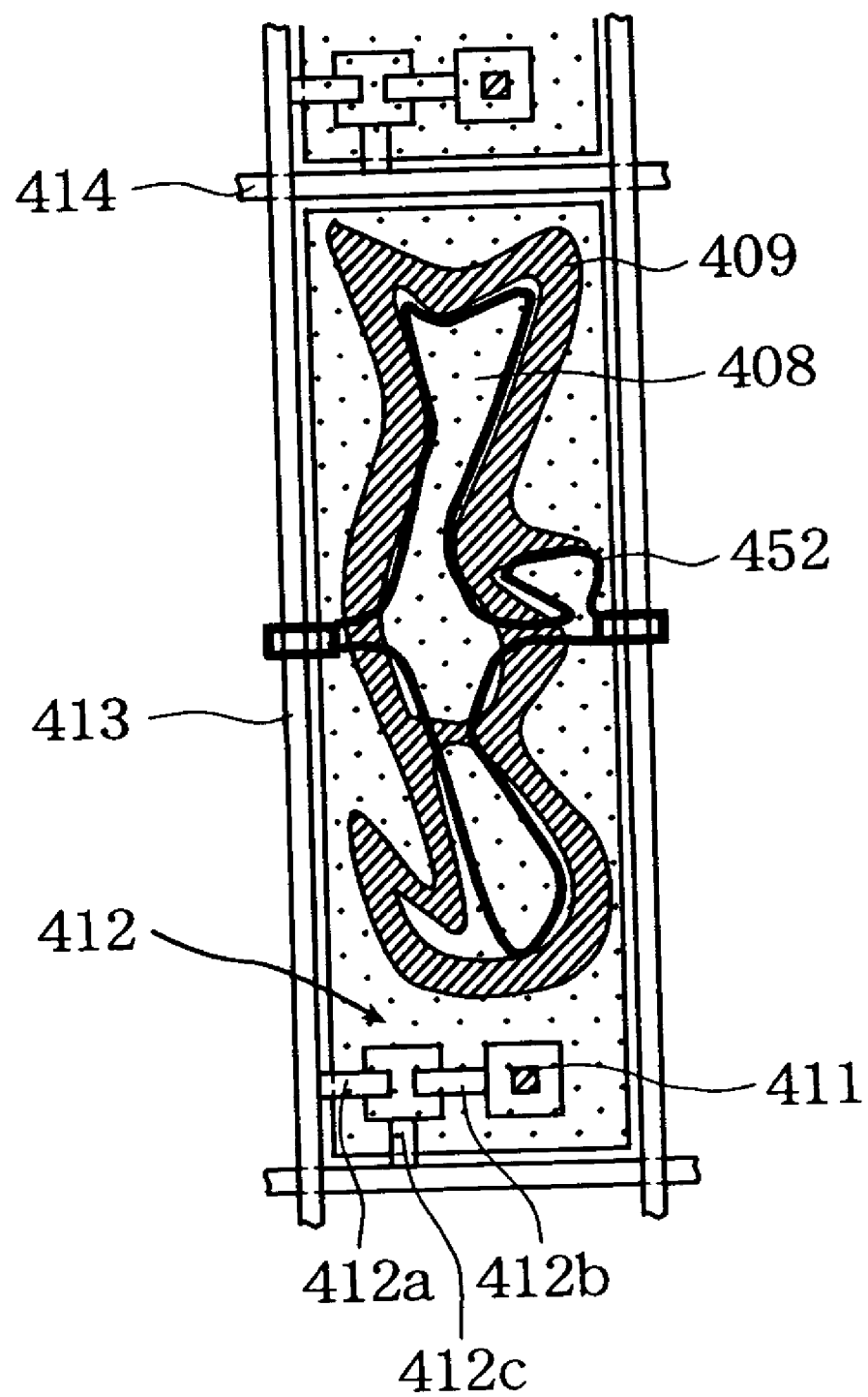
FIG. 43 is a plan view of protrusions of Embodiment 16 of the present invention.
Figure 44:
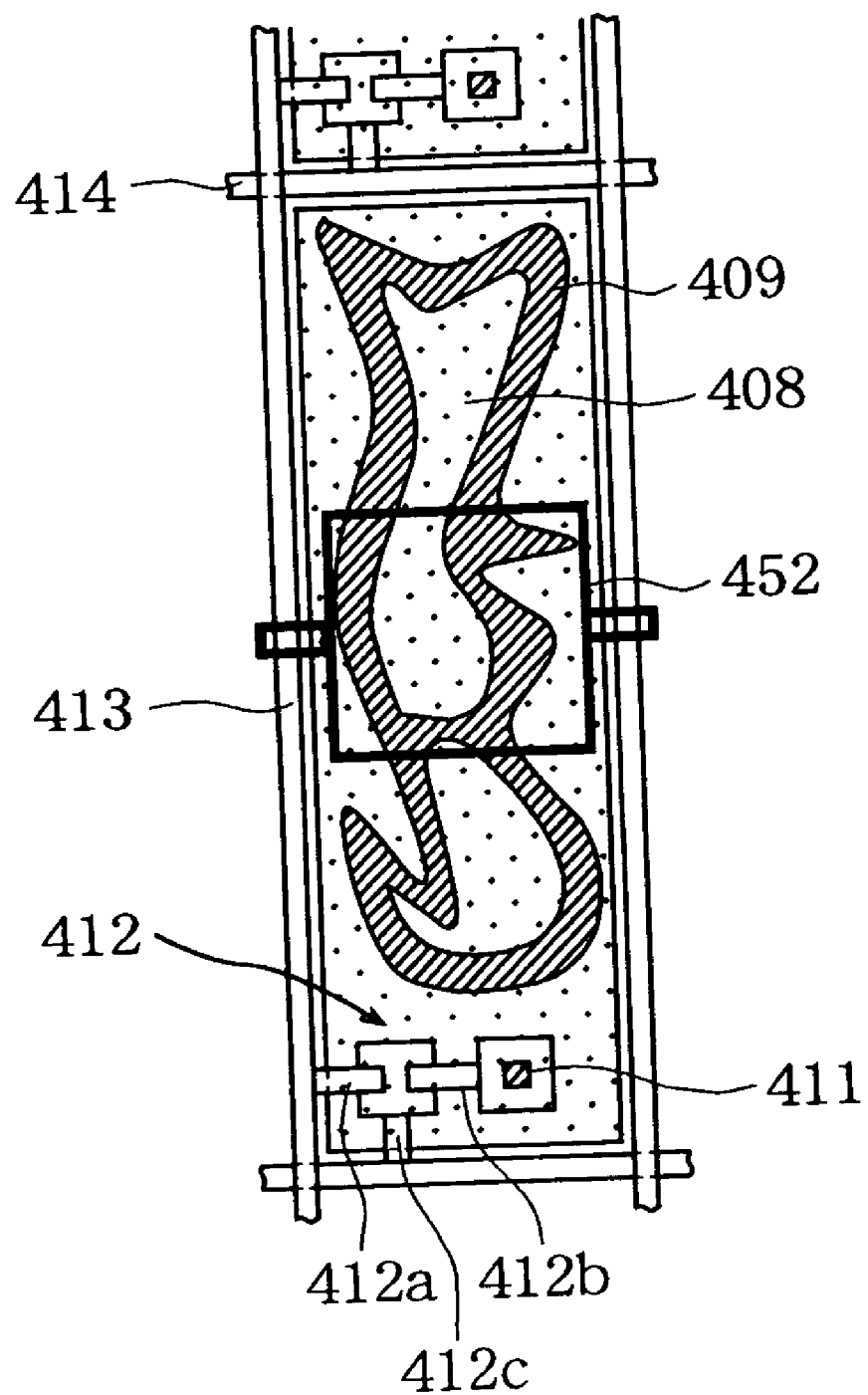
FIG. 44 is a plan view of other protrusions of the present invention.

When a transflective type liquid crystal display device comprises an active matrix substrate in which a pixel has an auxiliary capacitor electrode therein, a metal film is usually used as the auxiliary capacitor electrode. Therefore, portions of the auxiliary capacitor electrode can not be used as light transmitting portions. In view of this, to make the most of the regions of the auxiliary capacitor electrode as reflective portions, it is preferable that at least a part of the planar shape of the auxiliary capacitor electrode is closely analogous to the planar shape of each of the protrusions. An example of the transflective type liquid crystal display device having such a configuration is shown in FIG. 43. FIG. 43 is a plan view of the transflective type liquid crystal display device of the present embodiment. FIG. 44 shows a pixel having a common quadrangle auxiliary capacitor electrode.

As shown in FIG. 44, above an auxiliary capacitor electrode 451, there are many regions of a gap portion 409. Accordingly, incident light is specular-reflected by the auxiliary capacitor electrode 451, creating a tendency for display to be dark. On the other hand, as shown in FIG. 43, when the planar shape of the auxiliary capacitor electrode 452 is changed according to the shape of the protrusion 408, the auxiliary capacitor electrode 452 is not exposed to the gap portion 409. This enables it to prevent the specular reflection of light and utilize the periphery of the auxiliary capacitor electrode 452 for obtaining preferable reflective properties. As a result, a transflective type liquid crystal display device having further improved display performance is realized.

Embodiment 17

To appropriately control reflectivity and transmissivity in a transflective type liquid crystal display device, adjusting the area of the reflective film is effective. In Embodiment 13, the height of each of the protrusions 408 was represented by contour lines 415 and 416. As thus described, each of the contour lines of the protrusion is almost along a border line (frame line of the protrusion) between the protrusion and the gap portion. Therefore, when a part of a reflective film adjacent to the gap portion are removed along the contour lines, such a state is secured that the protrusion-depression curved surface of the protrusion is pointed in various directions. This state is the same as in Embodiments 13 and 14. This enables it to secure the same preferable dispersion properties as those in Embodiment 13, even if the area of the light transmitting portion is increased.

Figure 45:
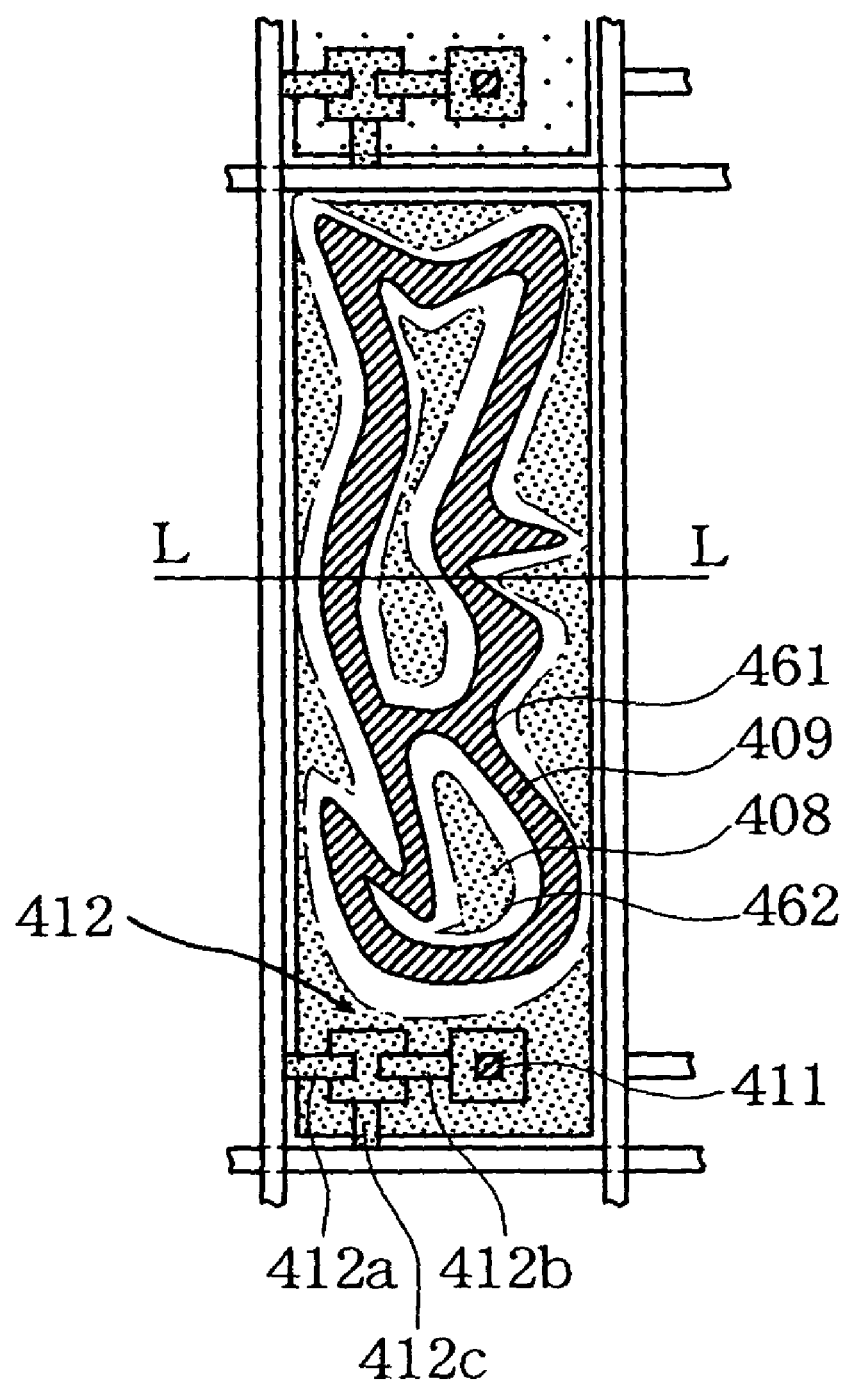
FIG. 45 is a plan view of protrusions of Embodiment 17 of the present invention.
Figure 46:
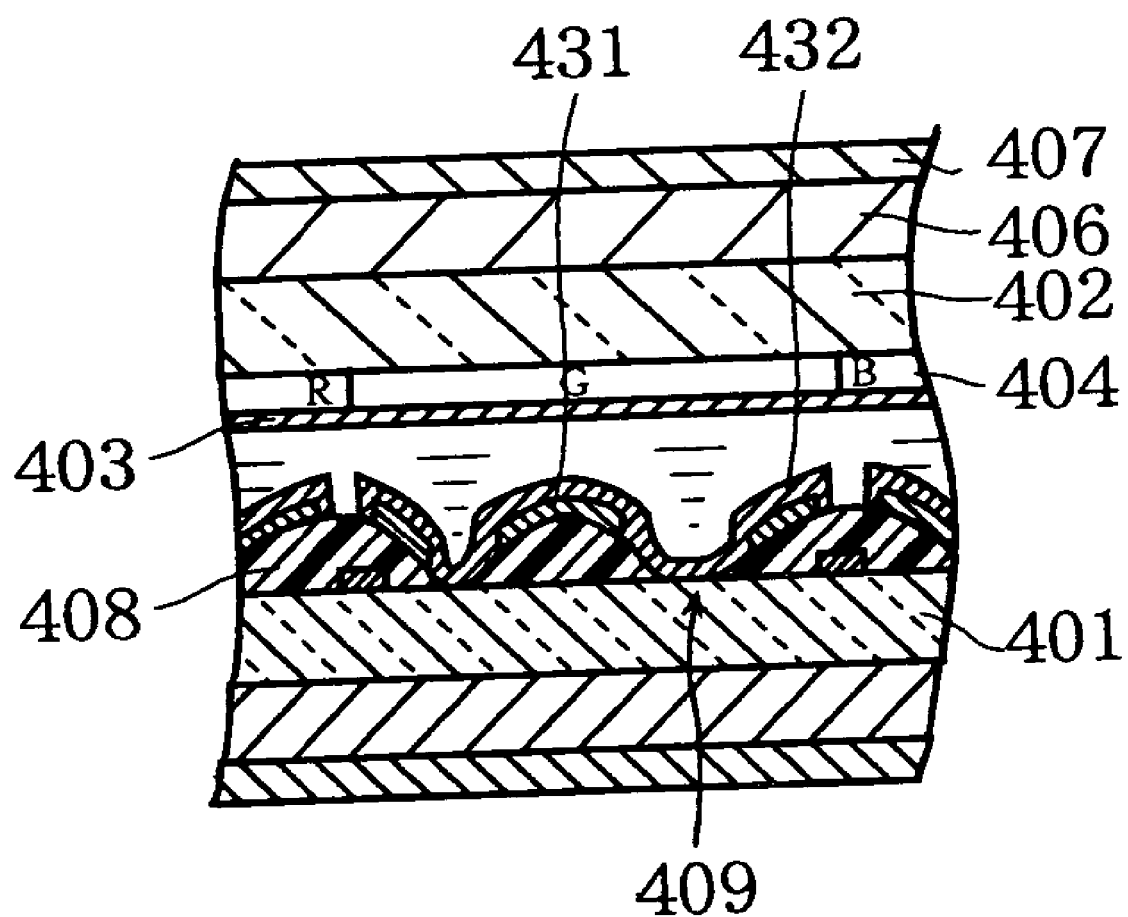
FIG. 46 is a plan view of a transflective type liquid crystal display device of Embodiment 17.

An example of a transflective type liquid crystal display device having such a configuration is shown in FIG. 45. FIG. 45 is a plan view of the transflective type liquid crystal display device. FIG. 46 is a cross sectional view taken along the line L—L shown in FIG. 45.

A border line 462 between the reflective film and a portion on which the reflective film is not provided is formed to be closely analogous to the shape of a border line 461 between the protrusion 408 and the gap portion 409. In FIG. 45, regions with slanted lines are the gap portion 409 on which the protrusion 408 is not provided, dotted regions are portions on which the reflective film is provided, and white regions between the two regions are portions of the protrusion 408 on which the reflective film is not provided.

The border line 462 between the reflective film and the portion on which the reflective film is not provided may be bay-like shaped and/or peninsula-like shaped, both closely analogous to the border line between the protrusion 408 and the gap portion 409. Or else, 1) The border line forms at least one closed curved-line, and when a tangent line drawn along the curved line on the substrate is represented by an angle in which a longitudinal direction of a pixel is taken to be 0 degrees, the angle changes from increase to decrease or from decrease to increase at least three times when the curved line is circled. 2) At least one border line forms indefinite two-dimensional closed regions having a curved line or a straight line. 3) The shape of the border line comprises a curved line or a straight line that is angled with respect to a direction parallel or perpendicular to a longitudinal side of a pixel. 4) The shape of the border line comprises a curved line or a straight line, both angled with respect to the signal lines. As a result, preferable reflective properties are realized.

Embodiment 18

Figure 47:
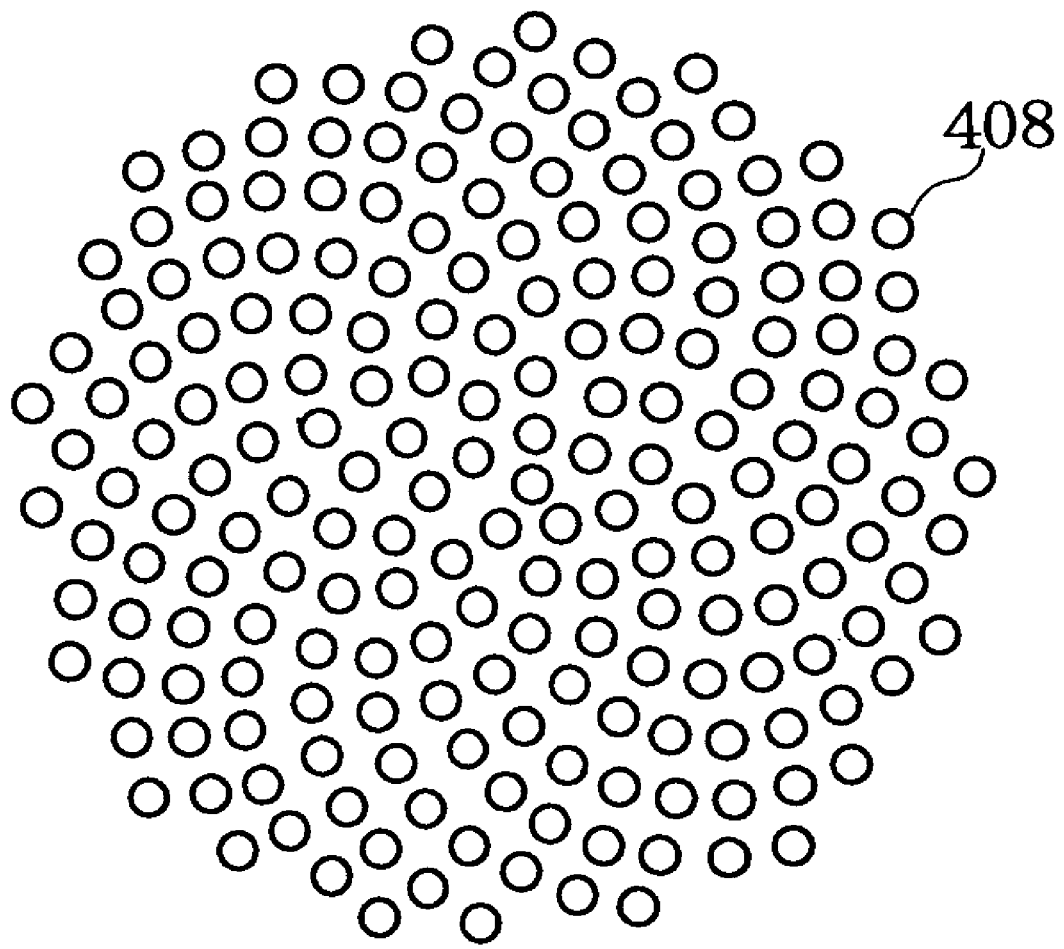
FIG. 47 is a plan view schematically showing the regular spiral alignment of protrusions of Embodiment 18 of the present invention.

In the above-described embodiments, although the protrusions were randomly disposed in a reflective plate, the present invention is not limited to this. FIG. 47 is a plan view schematically showing the protrusions aligned in a regular spiral pattern. As shown in the figure, the protrusions 408 are provided in positions of meeting the relation of Fibonacci series. Even when the protrusions 408 are aligned in such a manner, the shape of the gap portion between the protrusions 408 comprises a curved line with a predetermined width and/or a broken line with a predetermined width. When the reflective plate of the present embodiment is applied to a liquid crystal display device, the above-described alignment may be formed pixel by pixel or in each R-G-B unit.

Other Items

In the above-described embodiments, although a p-type photo-resist was used as a resist material, an n-type photo-resist may be used in the present invention.

In addition, in the above-described embodiments, although a photosensitive resin was used as a material to be formed into the protrusions, the present invention is not limited to this. For example, the protrusions can be formed as follows. A non-photosensitive resin layer is formed on a substrate, and a resist is formed over the substrate. Thereafter, photolithography is conducted and the resin is etched. Even with this method, the same advantageous effects as the above-described embodiments are obtained.

In addition, in the above-described embodiments, although a transparent glass was used as the substrate, the substrate may be made of a resin such as plastic. In addition, the substrate on the side of which a reflective plate of a reflective type liquid crystal display device is provided may be made of an opaque silicon.

In addition to reflective type color liquid crystal devices using a single polarizing plate, the above-described embodiments can be applied to other liquid crystal display devices such as guest-host type liquid crystal devices in which liquid crystal contains a dichroic dye. Similarly, the above-described embodiments can be applied to one-colored liquid crystal display devices that do not display images in color.

In addition to what is called an active matrix system in which a driving element on a substrate corresponding to each pixel controls a voltage applied on each pixel, the liquid crystal display device of the present invention may employ a passive system such as a super twisted nematic (STN) system, in which each pixel does not have a driving element.

In addition, in the above-described embodiments, a reflective type liquid crystal display device and a transflective type liquid crystal display device both using liquid crystal were used to describe how to control the transmission and absorption of light. However, the present invention is not limited to this. For example, electrophoresis displays may be employed in which the transmission and absorption of light is controlled such that fine particles dispersed in a solution are moved by a potential. The reflective plate of the present invention can be applied to other display devices than liquid crystal display devices.

In addition, the reflective film of the present invention can be made half mirrored if the film is appropriately thick. This makes it possible for the reflective film to be a transflective film capable of having both light reflectivity and light transmissivity. As a result, a transflective type display device is realized only by replacing a common reflective film with the transflective film.

INDUSTRIAL APPLICABILITY

The objects of the present invention are fully accomplished by the configurations of the invention described above.

Specifically, according to the reflective plate of the present invention, the shape of the gap portion comprises a curved line having a predetermined width and/or a broken line having a predetermined width, and therefore, the flat gap portion is made small in area by forming a single resist layer. As a result, reflective brightness is made constant irrespective of viewing directions, and dispersion properties are improved.

In addition, the display device having the reflective plate makes it possible to adjust viewing angles and reflective brightness according to application. This is realized by changing the tilt angle distribution of each of the protrusions of the reflective plate. As a result, display performance is improved.

In addition, the fabricating method of the present invention has smaller number of steps than conventional fabricating methods. This makes it possible to reduce fabrication costs and fabricate a reflective plate excellent in dispersion properties with improved yields.

The invention claimed is:

1. A display device comprising a substrate having a plurality of nonlinear elements and wirings formed on the substrate, a plurality of protrusions each formed on the substrate and having a curved surface, and a reflective film formed on the substrate having the protrusions, wherein a gap portion is provided between a pair of protrusions among the protrusions, the gap portion comprising a curved-line portion having an approximately uniform width, or a line portion containing an angle and having an approximately uniform width;

wherein, on the substrate, an auxiliary capacitor electrode electrically connected to the nonlinear elements is provided; and wherein a width of a part of a gap portion above the auxiliary capacitor electrode is narrower than a width of a rest part of the gap portion.

2. The display device according to claim 1, wherein the width of the gap portion is in a range of 1 to 10 µm.

3. The display device according to claim 1, wherein a maximum diameter of each of the protrusions is in a range of 15 to 40 µm.

4. The displace device according to claim 1, wherein a height of each of the protrusions is in a range of 1.2 to 4 µm.

5. The display device according to clam 1, wherein a maximum diameter of each of the protrusions is from 5 to 20 times larger than a height of each of the protrusions.

6. The display device according to claim 5, wherein the protrusions are light-transmissive, and a low position portion of each of the protrusions is not coated with the reflective film.

7. The display device according to claim 5, wherein, when an angle formed by the substrate and a tangent line in contact with a surface of each of the protrusions is taken to be a tilt angle, a low position portion has a tilt angle of 15 degrees or more.

8. The display device according to claim 5, wherein a width of the gap portion is in a range of 1 to 20 µm.

9. The display device according to claim 5, wherein a height of each of the protrusions is in a range of 1.2 to 4 µm.

10. The display device according to claim 5, wherein a contact angle formed by a surface of each of the protrusions and a surface of the substrate at a contact line is in a range of 10 to 40 degrees.

11. The display device according to claim 5, wherein the protrusions are provided 15 or less per area of $1 \times 10^4$ µm$^2$.

12. The display device according to claim 1, wherein a contact angle formed by a surface of the protrusion and a surface of the substrate at a contact line is in a range of 10 to 25 degrees.

13. The display device according to claim 1, wherein the protrusions are provided 30 or less per area of $1 \times 10^4$ µm$^2$.

14. The display device according to claim 1,
wherein, above the auxiliary capacitor electrode, at least one of the protrusions is provided so that at least a part of the gap portion overlaps with a periphery of the auxiliary capacitor electrode.

15. The display device according to claim 1, wherein a planar shape of the auxiliary capacitor electrode is polygonal having at least one reentrant angle.

16. The display device according to claim 1,
wherein a maximum diameter of each of protrusions among the protrusions above the auxiliary capacitor electrode is smaller than a maximum diameter of each of a rest of the protrusions.

17. The display device according to claim 1,
wherein the substrate is light-transmissive; and
wherein the gap portion is not coated with the reflective film and is a light transmission region.

18. A display device comprising a substrate having a plurality of nonlinear elements and wirings formed on the substrate, a plurality of protrusions each formed on the substrate and having a curved surface, and a reflective film formed on the substrate having the protrusions,
wherein a gap portion is provided between a pair of protrusions among the protrusions, the gap portion comprising a curved-line portion having an approximately uniform width, or a line portion containing an angle and having an approximately uniform width;
wherein, on the substrate, an auxiliary capacitor electrode electrically connected to the nonlinear elements is provided; and
wherein a maximum diameter of each of protrusions among the protrusions above the auxiliary capacitor electrode is smaller than a maximum diameter of each of a rest of the protrusions.

19. The display device according to claim 18, wherein the width of the gap portion is in a range of 1 to 10 µm.

20. The display device according to claim 18, wherein a maximum diameter of each of the protrusions is in a range of 15 to 40 µm.

21. The display device according to claim 18, wherein a height of each of the protrusions is in a range of 1.2 to 4 µm.

22. The display device according to claim 18, wherein a maximum diameter of each of the protrusions is from 5 to 20 times larger than a height of each of the protrusions.

23. The display device according to claim 18, wherein a contact angle formed by a surface of the protrusion and a surface to the substrate at a contact line is in a range of 10 to 25 degrees.

24. The display device according to claim 18, wherein the protrusions are provided 30 or less per area of $1 \times 10^4$ µm$^2$.

25. The display device according to claim 18,
wherein, above the auxiliary capacitor electrode, at least one of the protrusions is provided so that at least a part of the gap portion overlaps with a periphery of the auxiliary capacitor electrode.

26. The display device according to claim 18, wherein a planar shape of the auxiliary capacitor electrode is polygonal having at least one reentrant angle.

27. The display device according to claim 18,
wherein a width of a part of a gap portion above the auxiliary capacitor electrode is narrower than a width of a rest part of the gap portion.

28. The display device according to claim 18,
wherein the substrate is light-transmissive; and
wherein the gap portion is not coated with the reflective film and is a light transmission region.

29. The display device according to claim 28, wherein the protrusions are light-transmissive, and a low position portion of each of the protrusions is not coated with the reflective film.

30. The display device according to claim 28, wherein, when an angle formed by the substrate and a tangent line in contact with a surface of each of the protrusions is taken to be a tilt angle, a low position portion has a tilt angle of 15 degrees or more.

31. The display device according to claim 28, wherein a width of the gap portion is in a range of 1 to 20 µm.

32. The display device according to claim 28, wherein a height of each of the protrusions is in a range of 1.2 to 4 µm.

33. The display device according to claim 28, wherein a contact angle formed by a surface of each of the protrusions and a surface of the substrate at a contact line is in a range of 10 to 40 degrees.

34. The display device according to claim 28, wherein the protrusions are provided 15 or less per area of $1 \times 10^4$ µm$^2$.

* * * * *